United States Patent [19]
Isobe

[11] Patent Number: 5,974,792
[45] Date of Patent: Nov. 2, 1999

[54] INTERNAL COMBUSTION ENGINE CONTROL WITH FAST EXHAUST CATALYST WARM-UP

[75] Inventor: Daiji Isobe, Toyohashi, Japan

[73] Assignee: Nippondenso Co., Ltd., Kariya, Japan

[21] Appl. No.: 09/168,321

[22] Filed: Oct. 8, 1998

Related U.S. Application Data

[62] Division of application No. 08/706,692, Sep. 6, 1996, Pat. No. 5,845,492.

[30] Foreign Application Priority Data

| Sep. 18, 1995 | [JP] | Japan | 7-238056 |
| Sep. 18, 1995 | [JP] | Japan | 7-238057 |
| Oct. 2, 1995 | [JP] | Japan | 7-254876 |
| Nov. 14, 1995 | [JP] | Japan | 7-295034 |

[51] Int. Cl.[6] ............................... F01N 3/20; F01N 3/30
[52] U.S. Cl. ............................... 60/278; 60/284; 60/285; 60/289
[58] Field of Search ............................... 60/274, 278, 284, 60/285, 289, 290

[56] References Cited

U.S. PATENT DOCUMENTS

| 4,007,590 | 2/1977 | Nagai et al. | 60/284 |
| 4,404,804 | 9/1983 | Tadokoro et al. | 60/602 |
| 4,534,173 | 8/1985 | Tsukamoto | 60/290 X |
| 4,702,219 | 10/1987 | Tadokoro et al. | 60/290 X |
| 5,211,011 | 5/1993 | Nishikawa et al. | 60/284 |
| 5,263,318 | 11/1993 | Oota et al. | 60/286 |
| 5,301,502 | 4/1994 | Oota et al. | 60/286 |
| 5,315,823 | 5/1994 | Nishikawa et al. | 60/286 |
| 5,357,928 | 10/1994 | Ohtsuka | 123/406.47 |
| 5,425,233 | 6/1995 | Ma et al. | 60/274 |
| 5,427,079 | 6/1995 | Andrepont, Jr. et al. | 60/290 X |
| 5,458,855 | 10/1995 | Gillbrand | 60/289 X |
| 5,460,784 | 10/1995 | Gillbrand et al. | 60/289 X |
| 5,462,039 | 10/1995 | Mamiya et al. | 60/284 X |
| 5,501,073 | 3/1996 | Miyashita et al. | 60/284 |

FOREIGN PATENT DOCUMENTS

| 60-88870 | 5/1985 | Japan . |
| 61-47479 | 3/1986 | Japan . |
| 4-136483 | 5/1992 | Japan . |
| 5-86847 | 4/1993 | Japan . |
| 5-133255 | 5/1993 | Japan . |
| 6-117304 | 4/1994 | Japan . |
| 6-257488 | 9/1994 | Japan . |
| 7-83148 | 3/1995 | Japan . |

*Primary Examiner*—Tony M. Argenbright
*Attorney, Agent, or Firm*—Nixon & Vanderhye P.C.

[57] ABSTRACT

In an engine exhaust catalyst warm-up control, an ignition timing is delayed than normal first to raise the catalyst temperature, and then a fuel injection amount is dithered to increase and decrease alternately from a normal amount until the catalyst temperature reaches the catalyst activation completion temperature. In place of the ignition delay control, afterburning control may be employed in which fuel cut for a cylinder and fuel increase for the other cylinders are executed. Further, the catalyst warm-up control may be performed by controlling a supercharging operation and an exhaust gas recirculation operation cooperatively.

6 Claims, 45 Drawing Sheets

INTERNAL COMBUSTION ENGINE CONTROL WITH FAST EXHAUST CATALYST WARM-UP

This is a divisional of application Ser. No. 08/706,692, filed Sep. 6, 1996, now U.S. Pat. No. 5,845,492.

BACKGROUND OF THE INVENTION

1. Field of the Invention

The present invention relates to an internal combustion engine control having an exhaust gas purifying catalyst and, more particularly, to a catalyst warm-up control.

2. Related Art

An exhaust gas purifying catalyst, as generally mounted on a vehicle, subjects the noxious components (HC, CO and $NO_x$) in the exhaust gas to oxidizing/reducing reactions in the state of a high temperature thereby to make them innoxious. In order to exhibit the exhaust gas purifying ability effectively, it is necessary to raise the temperature of the catalyst to an activation temperature (generally about 300 to 350° C.). As a result, till the catalyst temperature rises to the activation temperature level after the engine start, the exhaust gas purifying ability is so low that many noxious components in the exhaust gas are discharged.

In order to solve this problem, there is in the prior art a technique for executing a fast catalyst warm-up control when the cooling water temperature at the engine start is low. As the fast catalyst warm-up control, proposed is a technique in which the exhaust gas temperature is raised to raise the catalyst temperature by delaying the ignition timing of the engine and by increasing the idling rotation speed, as disclosed in Japanese Patent Laid-Open No. 88870/1985. According to this fast catalyst warm-up control, however, the ignition delay angle lowers the engine torque and degrades the drivability. In order to warm up the catalyst with the heat of the exhaust gas, moreover, the idling rotation speed has to be raised to increase the exhaust gas amount so as to shorten the catalyst warm-up time period. This causes a problem that the emission and fuel mileage during the fast catalyst warm-up are deteriorated.

As the technique for raising the catalyst temperature by raising the exhaust gas temperature, on the other hand, there is a technique which is disclosed in Japanese Patent Laid-Open No. 508409/1994 (or U.S. Pat. No. 5,425,233). According to this technique, the exhaust gas temperature is raised by enriching the fuel injection amount to increase the HC and CO in the exhaust gas, by mixing the exhaust gas with the secondary air, as introduced into the exhaust pipe upstream of the catalyst, and by igniting the mixture with the spark ignition device. According to this technique, there are necessary a secondary air introduction pipe for introducing the secondary air to burn the enriched exhaust gas, an electric pump and a solenoid valve. This necessity complicates the construction and causes a problem that the cost is raised.

As disclosed in Japanese Patent Laid-Open No. 308311/1992 (or U.S. Pat. No. 5,315,823 and U.S. Pat. No. 5,211,011), there is a technique in which the catalyst is warmed up with the heat of reaction by executing an injection dither control for correcting the increase/decrease in the fuel injection amount to enhance the oxidations of HC and CO in the catalyst. In the fast catalyst warm-up control according to this injection dither control, the oxidations of HC and CO in the catalyst are promoted to warm up the catalyst with the heat of reaction. As a result, the oxidations of the HC and CO in the catalyst are not promoted while the catalyst is cold, to delay the temperature rise of the catalyst. This delay causes a problem that the emission in the fast catalyst warm-up is deteriorated.

As the technique for warming up the catalyst by making use of the oxidations in the catalyst, moreover, the fuel injection amount is enriched or increased, and the secondary air is introduced from the outside into the exhaust pipe upstream of the catalyst, as disclosed in Japanese Patent Laid-Open No. 171973/1993 (or U.S. Pat. No. 5,315,823). According to this technique, too, the secondary air is required to provide the secondary air introduction pipe for introducing the secondary air, the electric pump and the solenoid valve. As a result, the construction is complicated to cause a problem that the cost is raised.

SUMMARY OF THE INVENTION

In view of the above-specified problems, therefore, it is an object of the present invention to provide a novel catalyst warm-up system.

Another object of the present invention is to provide a system capable of warming up the catalyst fast with a simple construction.

Still another object of the present invention is to provide a catalyst warm-up system capable of suppressing the deterioration in the emission and drivability during the fast catalyst warm-up and shortening the catalyst warm-up time period.

According to one aspect of the present invention, an ignition timing is delayed first and then fuel injection amount is changed so that a catalyst temperature may be raised as fast as possible after starting an engine. Preferably, the ignition timing delay control and the fuel injection dither control are overlapped at the time of switching from the farmer control to the latter control. More preferably, the ignition timing delay and the fuel injection amount change are effected gradually.

According to another aspect of the present invention, an afterburning control is effected first, in which fuel injection for a certain cylinder is cut off with increased fuel injection amount for other cylinders, and then a fuel injection dither control is effected. The afterburning is effected by igniting mixture of air from the certain cylinder and the unburned fuel from the other cylinders by the use of a glow plug.

According to a further aspect of the present invention, a supercharging operation and an exhaust gas recirculation operaton are controlled cooperatively to improve a catalyst warm-up characteristics.

BRIEF DESCRIPTION OF THE DRAWINGS

Other objects, features and advantages of the present invention will become more apparent from the following description when read in conjunction with the accompanying drawings, in which.

DETAILED DESCRIPTION OF PRESENTLY PREFERRED EMBODIMENTS

[FIRST EMBODIMENT]

Figure 1:
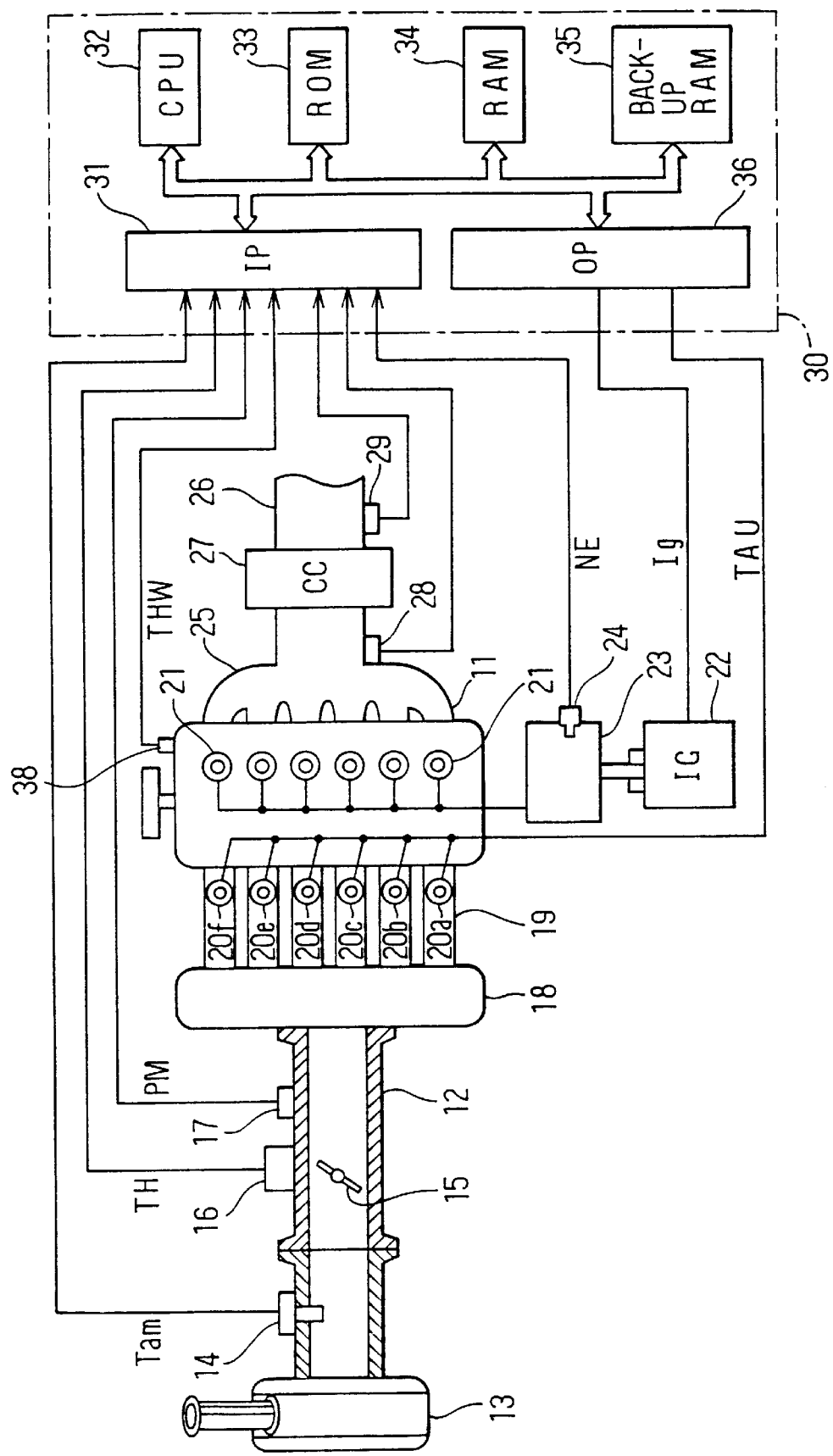
FIG. 1 is a schematic diagram showing an entire construction of an engine control system according to a first embodiment of the present invention.

A first embodiment of the present invention will be described with reference to FIGS. 1 to 7. First of all, the schematic construction of the entire engine control system will be described with reference to FIG. 1. An internal combustion engine 11 is equipped at the most upstream portion of its intake pipe 12 with an air cleaner 13, downstream of the air cleaner 13 with an intake air temperature sensor 14 for detecting an intake air temperature Tam, and downstream of the intake air temperature 14 with a throttle valve 15 and a throttle opening sensor 16 for detecting a throttle opening TH. Downstream of the throttle valve 15, there is further disposed an intake pipe pressure sensor 17 for detecting an intake pressure PM, and a surge tank 18 is disposed downstream of that intake pipe pressure sensor 17. To the surge tank 18, there is connected an intake manifold 19 for introducing air into the individual cylinders of the engine 11. The branches of the intake manifold 19 for the individual cylinders are equipped with injectors 20a to 20f for injecting a fuel individually.

On the other hand, the engine 11 is equipped for each cylinder with an ignition plug 21 which is to be fed with a high voltage current, as generated by an ignition circuit (IG) 22, through a distributor 23. This distributor 23 is equipped with a crank angle sensor 24 for outputting twenty four pulse signals, for example, in every 720° CA (or every two rotations of the crankshaft), so that an engine rotation speed NE is detected in terms of the output pulse interval of the crank angle sensor 24. The engine 11 is further equipped with a water temperature sensor 38 for detecting an engine cooling water temperature THW.

To the exhaust port (not-shown) of the engine 11, on the other hand, there is connected through an exhaust manifold 25 an exhaust pipe (or exhaust passage) 26, which is equipped midway thereof with a catalyst (CC) 27 of ternary or three-way type for reducing the noxious components (e.g., CO, HC or $NO_x$) in the exhaust gas. Upstream of the catalyst 27, there is disposed an air/fuel ratio sensor 28 for outputting a linear air/fuel ratio signal according to the air/fuel ratio of the exhaust gas. Downstream of the catalyst 27, on the other hand, there is disposed an oxygen sensor 29 for outputting a signal to be inverted depending upon whether the air/fuel ratio in the exhaust gas is rich or lean.

The outputs of the aforementioned various sensors are read in an electronic control circuit 30 through an input port (IP) 31. This electronic control circuit 30 is constructed mainly of a microcomputer and equipped with a CPU 32, a ROM 33, a RAM 34 and a backup RAM 35 for computing a fuel injection amount TAU and an ignition timing Ig by using engine running state parameters, as obtained from the various sensor outputs as will be described hereinafter, to output signals according to the computed results from an output port (OP) 36 to the injectors 20a to 20f and the ignition circuit 22.

Figure 2:
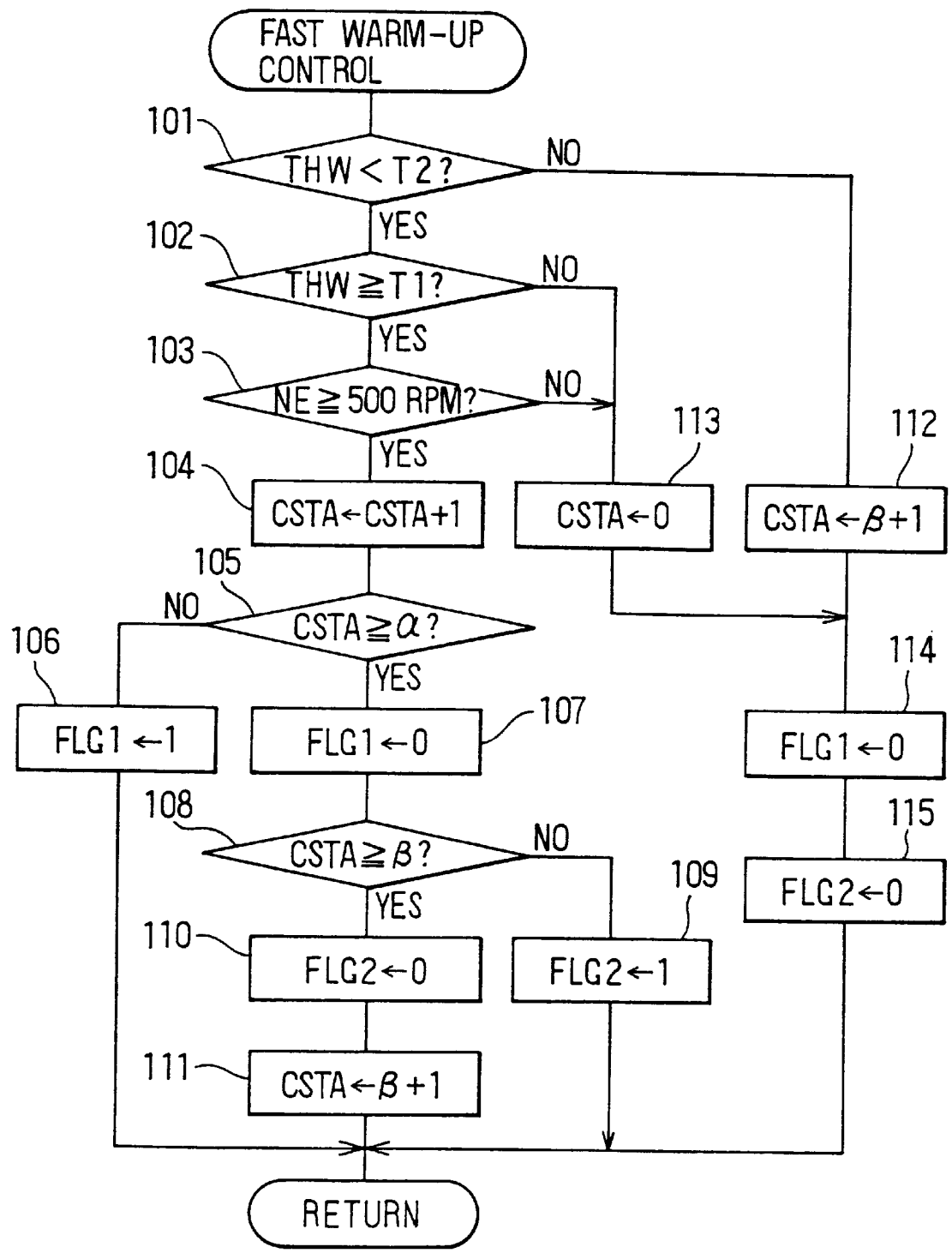
FIG. 2 is a flow chart showing the processing flow of a fast catalyst warm-up control routine to be used in the first embodiment.

Moreover, the electronic control circuit 30 executes the program, as shown in FIG. 2, to warm up the catalyst 27 as fast as possible after the engine start. This fast catalyst warm-up control period is divided into a first catalyst heating period (or ignition delay angle control period) for promoting the temperature rise of the catalyst 27 by delaying the angle of the ignition timing from the start of the fast catalyst warm-up control, and a second catalyst heating period (or injection dither control period) for further raising the temperature of the catalyst 27 by effecting a fuel injection dither control to increase/decrease the fuel injection amount zigzag midway from the fast catalyst warm-up control period.

Here will be described a processing flow of a fast catalyst warm-up control routine, as shown in FIG. 2. The present routine is executed at every constant time periods (e.g., every 40 ms). At first step 101, it is decided whether or not the engine cooling water temperature THW, as read from the water temperature sensor 38, is below a predetermined warm-up completion temperature T2 (that is, whether or not the fast catalyst warm-up control is necessary). Here, the warm-up completion temperature T2 is a temperature, at which it is decided that both the engine 11 and the catalyst 27 are completely warmed up, and is exemplified by T2=60° C. If the engine cooling water temperature THW is below the warm-up completion temperature T2, the routine advances to step 102, at which it is decided whether or not the engine cooling water temperature THW is below a predetermined warm-up control lower limit temperature T1. Here, this warm-up control lower limit temperature T1 is a temperature, which will not affect the drivability adversely at the time of executing the fast catalyst warm-up control, and is exemplified by T1=20° C.

If the engine cooling water temperature THW≧T1, the routine advances to step 103, at which whether or not the engine start has been completed is decided depending upon whether or not the engine rotation speed NE≧500 RPM. If the start is completed, the routine advances to step 104, at which a post-start elapsed time counter CSTA for counting the fast catalyst warm-up time period is incremented. At next step 105, it is decided whether or not the post-start elapsed time counter CSTA has reached a first predetermined time period α. Here, this first predetermined time period α is an ignition delay angle control time period which is taken for the catalyst 27 to be warmed up to such a state by the ignition delay angle control after the start that the CO and HC components can be efficiently oxidized by the catalyst 27.

If the post-start elapsed time counter CSTA has not yet reached the predetermined time period α, the routine advances to step 106, at which a first catalyst heating allowance flag FLG1 to a value "1" indicating the execution of the ignition delay angle control, and the present routine is ended by executing/continuing the ignition delay angle control.

When the post-start elapsed time counter CSTA reaches the first predetermined time period α, it is decided that the catalyst is warmed up enough by the ignition delay control to an effective temperature, and the routine advances to step 107, at which the first catalyst heating allowance flag FLG1 is set to a value "0" indicating the end of the ignition delay angle control, thus ending the ignition delay angle control. At next step 108, it is decided whether or not the post-start elapsed time counter CSTA has reached a second predetermined time period β. Here, this second predetermined time period β is such a lapse time (i.e., an time period for executing the fast catalyst warm-up control) as is required for raising the catalyst temperature to the activation temperature by the injection dither control).

If the post-start elapsed time counter CSTA has not yet reached the second predetermined time period β, the routine advances to step 108 to step 109, at which a second catalyst heating allowance flag FLG2 is set at the value "1" indicating the execution of the injection dither control, and the present routine is ended by executing/continuing the injection dither control. After this, when the post-start elapsed time counter CSTA reaches the second predetermined time period β, it is decided that the catalyst temperature has reached the activation temperature, and the routine advances from the step 108 to step 110, at which the second catalyst heating allowance flag FLG2 is set to the value "0" indicating the end of the injection dither control, to end the injection dither control. At next step 111, the post-start elapsed time counter CSTA is subjected to an overflow prevention (CSTA−β+1) to end the present routine.

If, on the other hand, it is decided at step 101 that the engine cooling water temperature THW is above the warm-up completion temperature T2, it is decided that both the engine 11 and the catalyst 27 are completely warmed up. Then, the routine advances to step 112, at which the post-start elapsed time counter CSTA is subjected to the overflow prevention as at step 111. At subsequent steps 114 and 115, both the first catalyst heating allowance flag FLG1 and the second catalyst heating allowance flag FLG2 are reset to the value "0" to inhibit the fast catalyst warm-up control, and the present routine is ended. In short, if the engine stop time period before the start is short or if the vehicle is started with the engine 11 or the catalyst 27 being already warmed up, the fast catalyst warm-up control is not required, or the warm-up time period can be shortened. As a result, the emission, drivability or fuel mileage can be improved by comparing the engine cooling water temperature THW with the predetermined warm-up completion temperature T2 to inhibit the fast catalyst warm-up control if THW≧T2.

On the other hand, if the decision of step 102 or 103 is "No", that is, if the engine cooling water temperature THW is lower than the warm-up control lower limit temperature T1 (=20+ C.) or if the engine rotation speed NE<500 RPM, the engine rotation is so unstable as to affect the drivability adversely if the fast catalyst warm-up control is executed. Hence, the routine advances to step 113 at which the post-start elapsed time counter CSTA is reset, and at the next steps 114 and 115, both the first catalyst heating allowance flag FLG1 and the second catalyst heating allowance flag FLG2 are reset to the value "0" to inhibit the fast catalyst warm-up control, and the present routine is ended.

Figure 3:
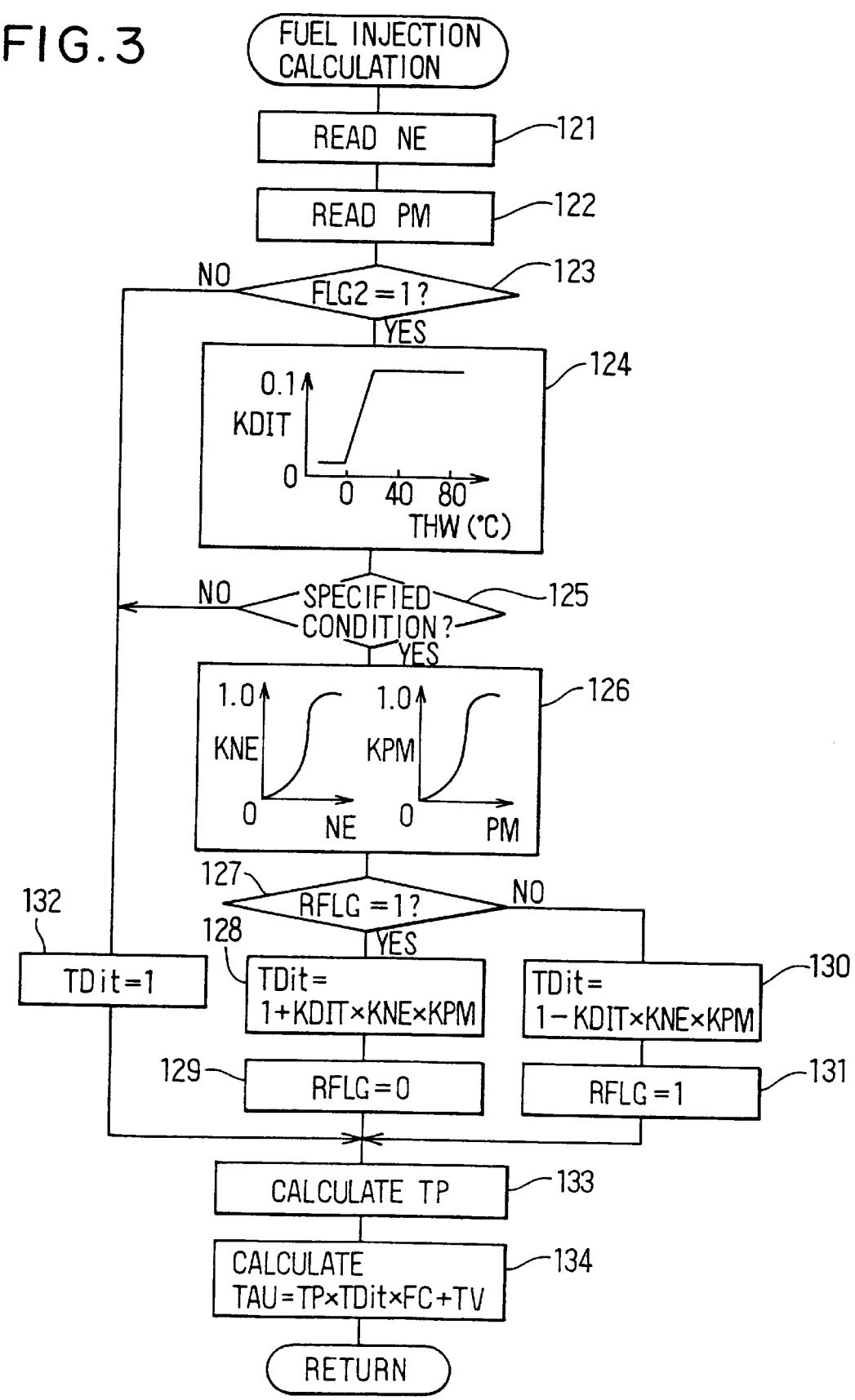
FIG. 3 is a flow chart showing the processing flow of a fuel injection calculating routine to be used in the first embodiment.

Here will be described the processing flow of a fuel injection calculating routine of FIG. 3 for calculating the final fuel injection amount TAU. The present routine is executed at each top dead center TDC of each cylinder. At first steps 121 and 122, the engine rotation speed NE and the intake pressure PM are read. At next step 123, it is decided whether or not the second catalyst heating allowance flag FLG2 is set at the value "1" indicating the execution of the injection dither control. If FLG2=1, the routine advances to step 124, at which a dither coefficient KDIT is calculated from the map which is so stored in the ROM 33 as to correspond to the engine cooling water temperature THW. In this case, the dither coefficient is in the range of 0 to 0.1 and is set to take the larger value for the higher engine cooling water temperature THW. This is because the air-fuel mixture misfire region against the air/fuel ratio is wider for the lower engine cooling water temperature THW so that the air/fuel ratio cannot be shifted at a low temperature more than the stoichiometric value to the rich/lean side but can shifted more than at the low temperature as the engine cooling water temperature THW rises.

At next step 125, it is decided whether a specified condition is satisfied. Here, the specified condition is other than either a high load or rotation region, in which the fuel injection amount is set at a richer side than the stoichiometric air/fuel ratio (λ=1), or a low rotation or load region in which the combustion is unstable. If this specified condition is satisfied, the routine advances to step 126, at which dither corrections KNE and KPM for correcting the dither coefficient KDIT are calculated, respectively, from a map corresponding to the engine rotation speed NE and a map corresponding to the intake pressure PM. These maps are stored in the ROM 33.

When the dither corrections KNE and KPM are thus calculated at step 126, the routine advances to step 127, at which it is decided whether or not a dither confirmation flag RFLG indicating the shift of the preceding air/fuel ratio to the rich or lean side is set at the value "1". If this dither confirmation flag RFLG is set at the value "1", that is, if the preceding air/fuel ratio is shifted to the lean side, the routine advances to step 128, at which a final dither coefficient TDit is so calculated from the dither coefficient KDIT and the dither corrections KNE and KPM by the following formula as to set the present air/fuel ratio to the rich side:

$$TDit=1+KDIT\times KNE\times KPM.$$

At subsequent step 129, the dither confirmation flag RFLG is inverted to the value "0", and the routine advances to step 133.

On the other hand, if the dither confirmation flag RFLG is at the value "0" at step 127, that is, if the preceding air/fuel ratio is shifted to the rich side, the routine advances to step 130, at which the final dither coefficient TDit is so calculated from the dither coefficient KDIT and the dither corrections KNE and KPM by the following formula as to set the present air/fuel ratio to the lean side:

$$TDit=1-KDIT\times KNE\times KPM.$$

At subsequent step 131, the dither confirmation flag RFLG is inverted to the value "1", and the routine advances to step 133.

On the other hand, if the decision of step 123 or 125 is "No", that is, if the second catalyst heating allowance flag FLG2 is set to the value "0" so that the injection dither control is inhibited, or if the specified condition is not satisfied, the routine advances to step 132, at which the final dither correction coefficient TDit is set to the value "1" indicating no dither control in effect, and the routine then advances to step 133.

At step 133, a basic fuel injection amount (time) TP corresponding to the present NE and PM is calculated from a two-dimensional map storing the relation between the engine rotation speed NE and intake pressure PM and the basic fuel injection amount TP. After this, at step 134, the final fuel injection amount (time) TAU is calculated by the following formula from the basic fuel injection amount TP, the final dither coefficient TDit, a basic fuel injection correction coefficient FC and an ineffective injection time TV, and the present routine is ended:

$$TAU=TP\times Tdit\times FC+TV.$$

Figure 4:
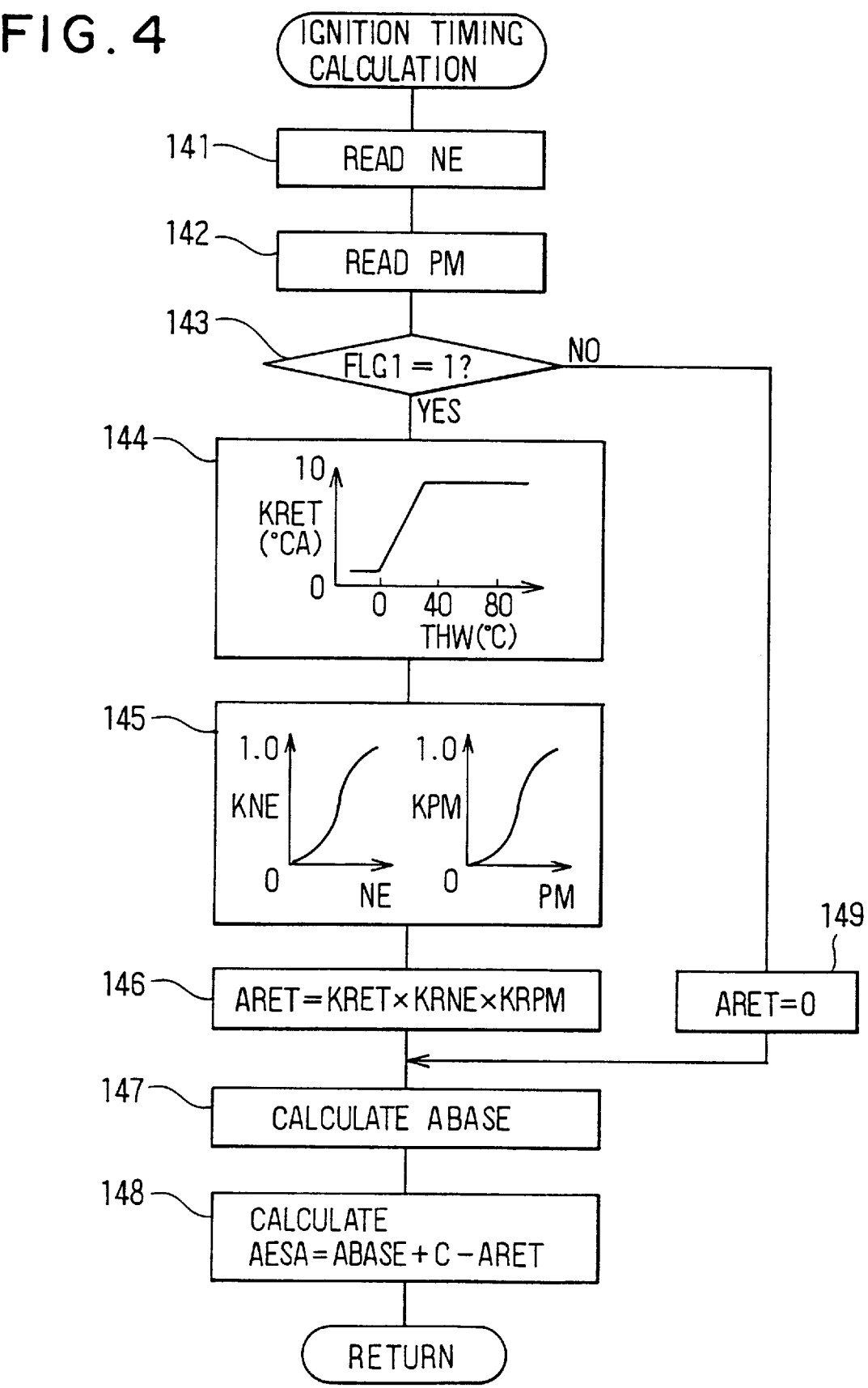
FIG. 4 is a flow chart showing the processing flow of an injection timing calculating routine to be used in the first embodiment.

Here will be described the processing flow of an ignition timing calculating routine of FIG. 4 for calculating a final ignition timing AESA. The present routine is executed at each top dead center of each cylinder. When the processing of the present routine is started, at first steps 141 and 142, the engine rotation speed NE and the intake pressure PM are read in. At subsequent step 143, it is decided whether or not the first catalyst heating allowance flag FLG1 is set at the value "1" indicating the execution of the ignition delay control. If this first catalyst heating allowance flag FLG1 is set at the value "1", the routine advances to step 144, at which a delay (retard) angle KRET is calculated from the map which is so stored in the ROM 33 as to correspond to the engine cooling water temperature THW. In this case, the delay angle KRET is in the range of 0 to 100° CA and is set to take the larger retard value for the higher engine cooling water temperature THW.

At next step 145, corrections KRNE and KRPM for correcting the delay angle KRET are calculated respectively from the map corresponding to the engine rotation speed NE and the map corresponding to the intake pressure PM. Incidentally, these maps are stored in the ROM 33. After subsequent step 146, a final delay angle ARET is calculated from the delay angle KRET and the corrections KRENE and KRPM by the following formula, and the routine advances to step 147:

$$ARET=KRET \times KRNE \times KRPM.$$

On the other hand, if it is decided at step 143 that the first catalyst heating allowance flag FLG1 is at the value "0", the routine advances to step 149, at which the final delay angle ARET is set to 0 to inhibit the correction, and the routine advances to step 147.

At next step 147, a basic ignition timing ABASE corresponding to the present NE and PM is calculated from the two-dimensional map of the engine rotation speed NE and the intake pressure PM. At subsequent step 148, the final ignition timing AESA is calculated from the basic ignition timing ABASE, the basic ignition timing correction C and the final delay angle ARET by the following formula, and the present routine is ended:

$$AESE=ABASE+C-ARET.$$

Here, the final ignition timing AESA is expressed in terms of the angle of the BTDC (before the top dead center).

Figure 5:
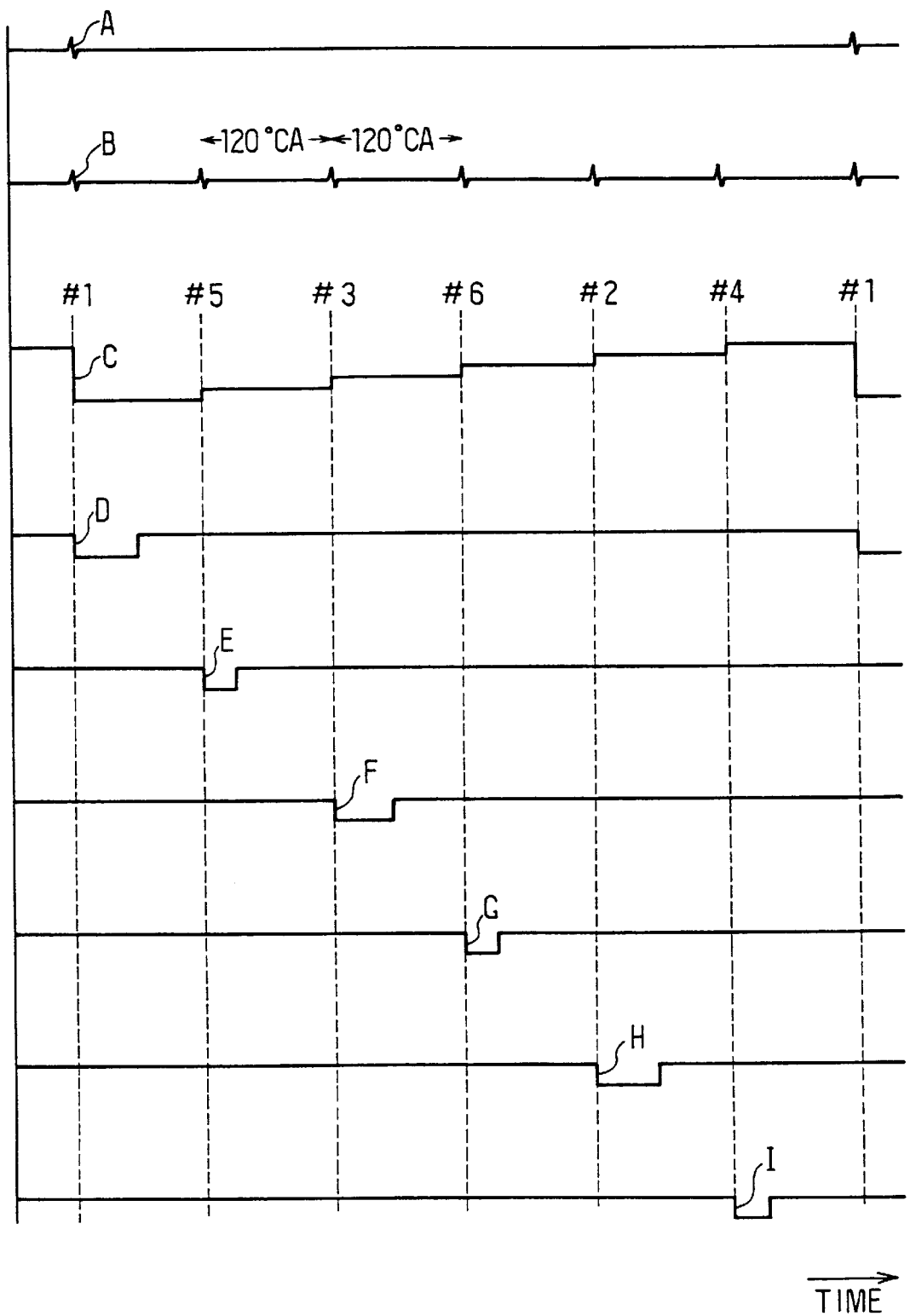
FIG. 5 is a time chart illustrating injection signals and a sequence of strokes of individual cylinders.

The fuel injection control operations, as described with reference to the flow chart of FIG. 3, will be described with reference a time chart (for an example of a 6-cylinder engine) of FIG. 5. Signal A is a top dead center (TDC) position signal of the first cylinder (#1) to be generated at every 720° CA and signal B is generated at every 120° CA rotation. Signal C indicates the count of cylinders. Signal D to I are injection pulse signals for driving the injectors 20a to 20f, which are individually disposed in first to sixth cylinders, so that the fuel injection calculation routine of FIG. 3 is started at each input of the signal B.

In this embodiment, the injection amount is shifted at each injection alternately to the rich side (signals D,F,H) and to the lean side (signals E,G,I) but may be shifted at every injections to the rich side and to the lean side. Alternatively, the fuel injection amount may be shifted to the lean side and to the rich side not only at every predetermined injections but also at every predetermined time periods.

In the injection dither control in which the catalyst is fast warmed up by shifting the fuel injection amount to the rich/lean side, the rich combustion and the lean combustion are repeated by increasing/decreasing the fuel injection amount at each combustion to shift the air/fuel ratio to the rich side and to the lean side with respect to the stoichiometric ratio, so that the carbon monoxide (CO) may be produced by the rich combustion whereas the oxygen ($O_2$) may be produced by the lean combustion. Moreover, the carbon monoxide and oxygen thus produced alternately and sequentially are subjected to an oxidation, as defined by the following formula, by the catalyzing action of the catalyst 27 to generate a calorie (Q):

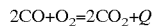

The calorie (Q), as produced by this oxidation, raises the temperature of the exhaust gas passing the catalyst 27, to promote the warm-up of the catalyst 27.

Figure 6:
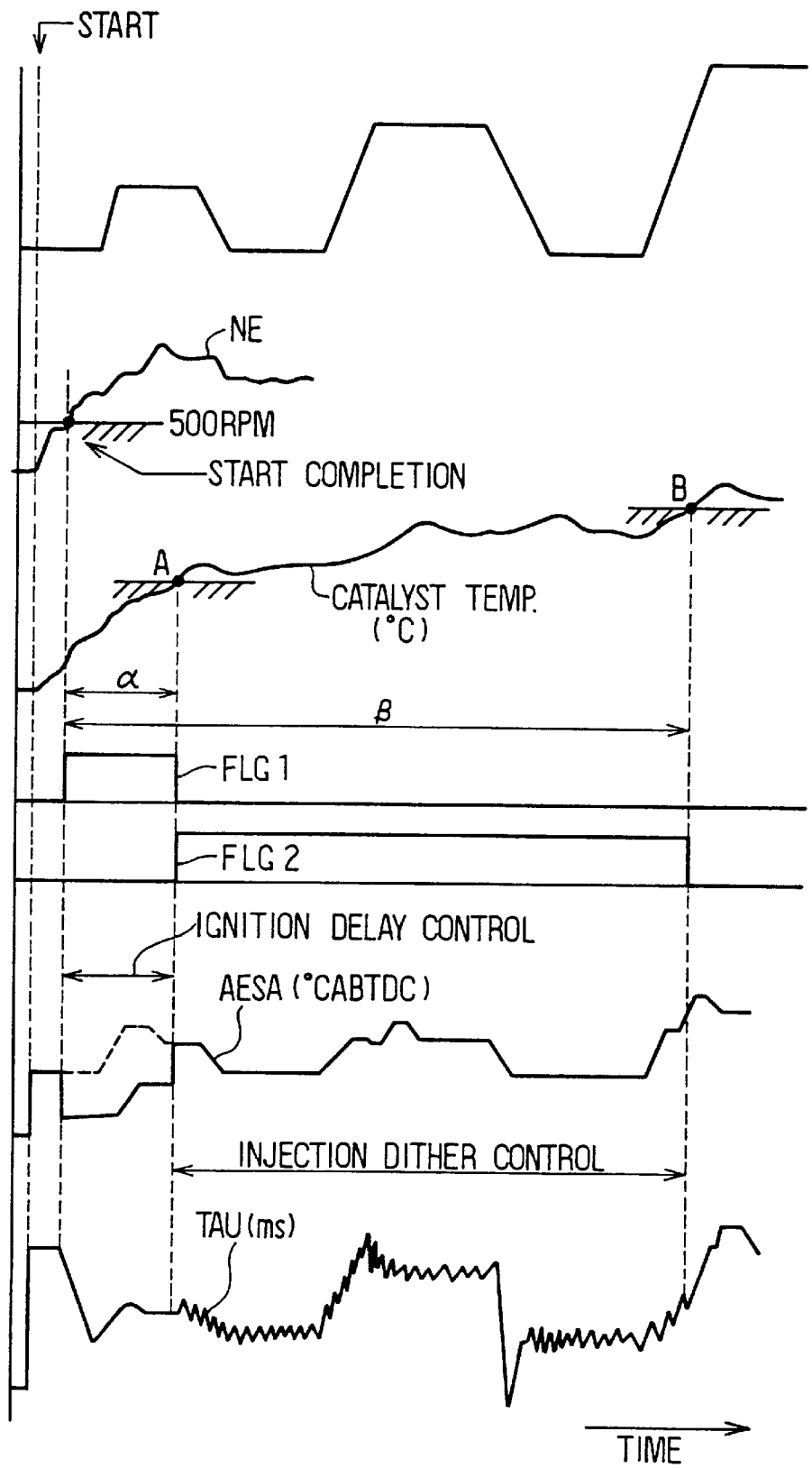
FIG. 6 is a time chart for explaining behaviors of the fast catalyst warm-up control according to the first embodiment.

The flow of the fast catalyst warm-up control thus far described will be explained with reference to the time chart of FIG. 6. As shown in FIG. 6, it is assumed that a run is made after the start (at an engine cooling water temperature of 25° C.). The engine rotation speed NE rises with the start, and this start is ended when the engine rotation speed NE reaches a predetermined value (e.g., 500 RPM).

After the end of the start, the lapse time counter CSTA is integrated, and the first catalyst heating allowance flag FLG1 is set at the value "1" indicating the execution of the ignition delay angle control, for the time period α for which it is estimated that the catalyst temperature is brought to the point A by the ignition delay angle control. In this period, the ignition delay angle control is executed. After this, when the time period α is elapsed from the start so that the catalyst 27 is estimated to have been warmed up to the temperature suited for the injection dither control, the first catalyst heating allowance flag FLG1 is reset to the value "0" to inhibit the first catalyst heating (or the ignition delay angle control), and the second catalyst heating allowance flag FLG2 is alternatively set to the value "1" indicating the execution of the injection dither control to warm up the catalyst 27 by the injection dither control.

After this, the injection dither control, in which fuel injection amount is changed to the rich and lean side alternately, is continued until the time period β for which it is estimated that the catalyst temperature is brought to the point B (or activation temperature) by the warm-up by the injection dither control. When the point B, at which it is estimated that the catalyst 27 is completely activated, is reached, that is, CSTA≧β, the second catalyst heating allowance flag FLG2 is reset to the value "0" to inhibit the second catalyst heating (or the injection dither control). After this, the ordinary fuel injection control and the ordinary ignition timing control are executed.

Figure 7:
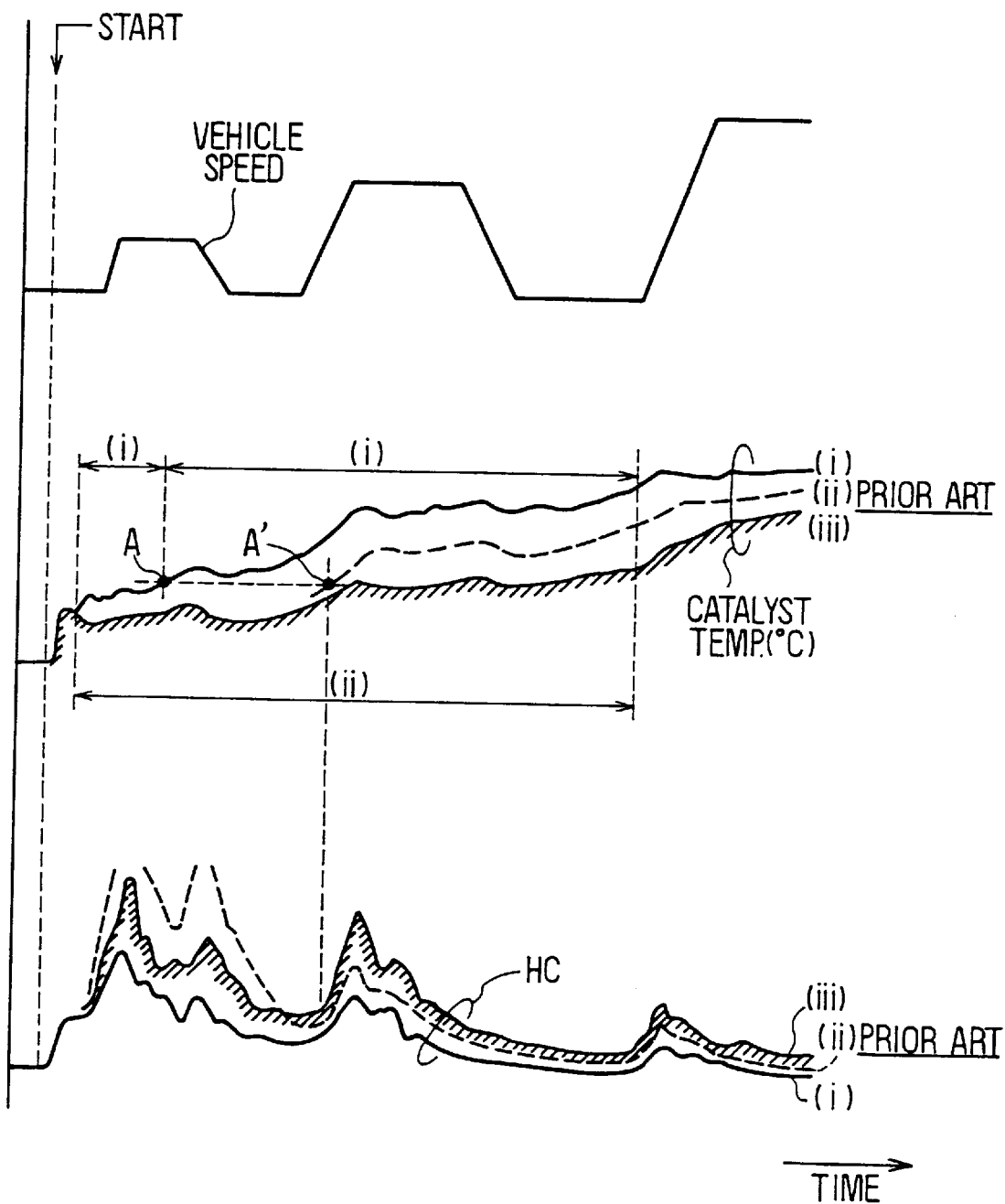
FIG. 7 is a time chart for explaining the effects by the fast catalyst warm-up control according to the first embodiment.

The effects of the first embodiment thus far described will be described in comparison with the prior art with a case of FIG. 7. In FIG. 7: (i) indicates the fast catalyst warm-up control of the aforementioned embodiment; (ii) indicates the fast catalyst warm-up control of the prior art for executing only the injection dither control after the start; and (iii) indicates the operation of no fast catalyst warm-up control.

In the operation (ii) of the fast catalyst warm-up control of the prior art for executing only the injection dither control after the start, the rise in the temperature of the catalyst is faster than the point A, as compared with the operation (iii) of the operation of no fast catalyst warm-up control. However, since the temperature of the catalyst is low for the time period from the start to a point A', the oxidations of CO and HC in the exhaust gas are not promoted in the catalyst even by the injection dither control, but the exhaust gas is discharged in an unreacted state from the tail pipe of the exhaust pipe so that the emission is deteriorated.

In this respect, according to the aforementioned embodiment, while the temperature of the catalyst 27 is low, the injection dither control, which will affect the emission adversely, is not executed, but the catalyst 27 is fast warmed up by the ignition delay angle control so that the temperature of the catalyst 27 is quickly raised (as indicated at the point A) to the level which can facilitate the oxidations of the CO and HC in the catalyst 27, thereby to reduce the noxious gas components such as HC or $NO_x$ in the exhaust gas to be discharged from the exhaust pipe 26.

After this, the injection dither control is not started before the temperature of the catalyst 27 reaches to the level for promoting the oxidations of CO and HC. At the start of the injection dither control, the catalyst 27 is efficiently warmed up from its inside by the reaction calorie of the oxidations of the HC and CO in the catalyst 27. If the ignition delay angle control is switched midway of the fast catalyst warm-up control to the injection dither control, the ignition delay angle, which will invite a reduction in the engine torque, can be suppressed within the necessary minimum time period to improve the drivability.

[SECOND EMBODIMENT]

If the ignition timing is abruptly returned from a large ignition delay angle to an advance angle side (normal ignition angle side) so as to enhance the catalyst warm-up effect by the fuel injection dither control, the engine torque fluctuates highly to affect the drivability adversely. On the other hand, if the injection dither amount (or the increase/decrease in the injection) is enlarged from the beginning of the switching to the injection dither control, the engine torque also fluctuates highly to affect the drivability adversely.

At the switching time from the ignition delay angle control to the injection dither control, there is established a switching period for which the ignition delay angle control and the injection dither control are overlapped before and after the switching operation. If the injection dither amount is gradually increased for the switching period while attenuating the ignition delay angle gradually, the fluctuation of the engine torque at the switching time is suppressed to improve the drivability.

Figure 8:
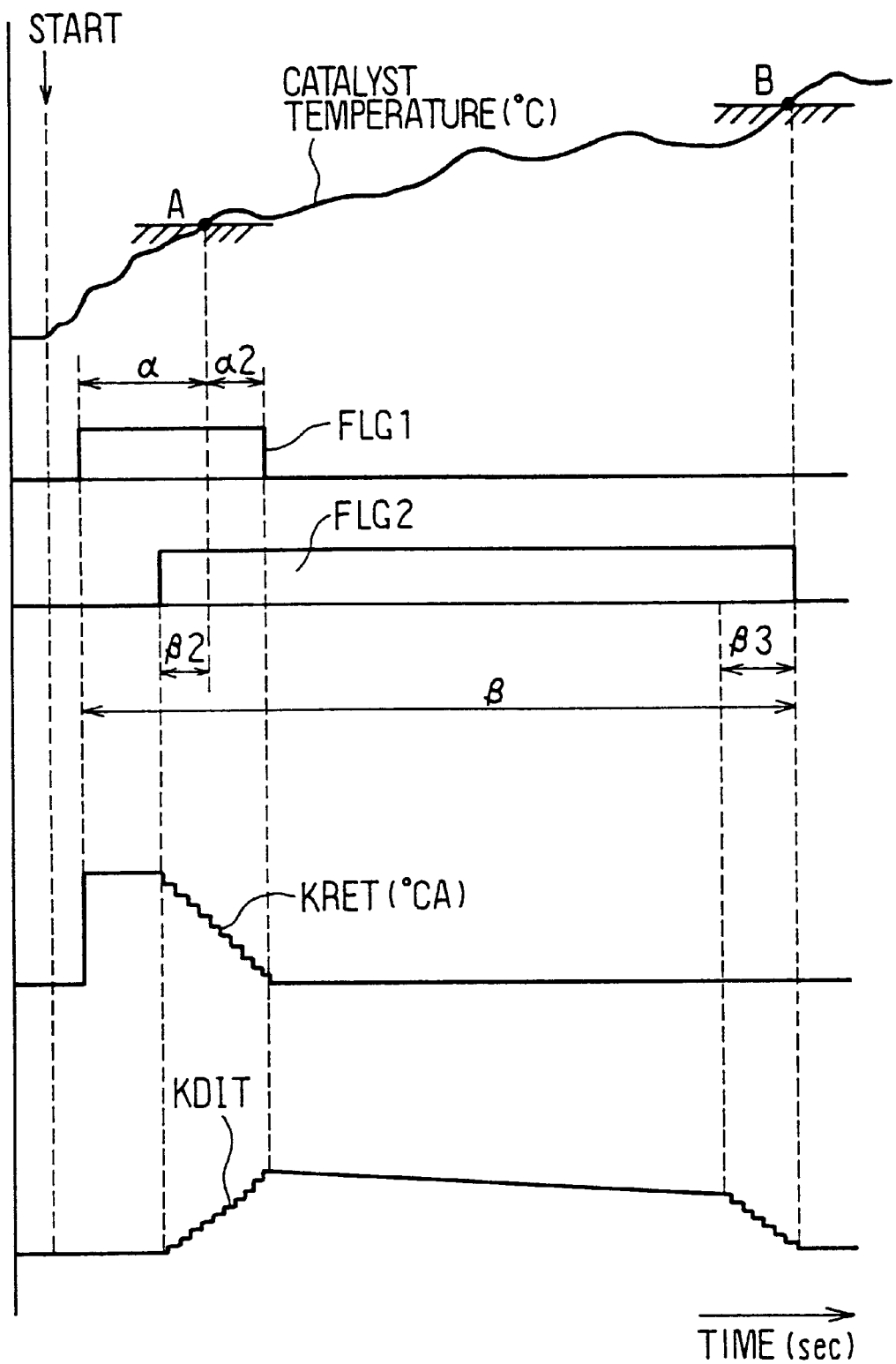
FIG. 8 is a time chart for explaining behaviors of the fast catalyst warm-up control according to a second embodiment of the present invention.

A second embodiment, as embodying this gradual change, will be described with reference to FIGS. 8 to 11. First of all, the summary of the fast catalyst warm-up control of the second embodiment will be described with reference to a time chart, as illustrated in FIG. 8. Specifically, time periods β2 and α2 are provided respectively before and after the time period α of the post-start elapsed time counter CSTA, as seems necessary for warming up the catalyst 27 to the temperature (at the point A) facilitating the oxidations of CO and HC in the catalyst 27. By setting the sum of (α2+β2) as the switching period, the injection dither amount is gradually increased while attenuating the ignition delay angle KRET gradually during the switching period, so that the switching from the ignition delay angle control to the injection dither control is smoothly effected to prevent the drivability and the emission from being deteriorated.

In order to effect this switching, the first catalyst heating allowance flag FLG1 is set to the value "0" at the point of (α+α2), and the second catalyst heating allowance flag FLG2 is set to the value "1" at the point of (α−β2). Moreover, the ignition delay angle KRET is so changed that it begins to be attenuated at the point of (α−β2) to zero at the point of (α+α2). On the other hand, the injection dither coefficient KDIT begins to gradually increase at the point of (α−β2) and takes the ordinary corrected value at the point of (α+α2).

In order to suppress the fluctuation of the engine torque at the end of the injection dither control thereby to improve the drivability better, according to the second embodiment, a time period β3 is provided immediately before the end of time period β of the post-start elapsed time counter CSTA which is thought to be necessary for warming up the catalyst 27 to the activation completion temperature (or the point B) for the catalyst 27, and the dither coefficient KDIT is gradually attenuated for the time period β3 to zero in the time period β. In short, the injection dither amount is gradually attenuated to improve the drivability, as the deviation between the target catalyst activation temperature and the temperature estimated in terms of the lapse time grows the smaller.

Figure 9:
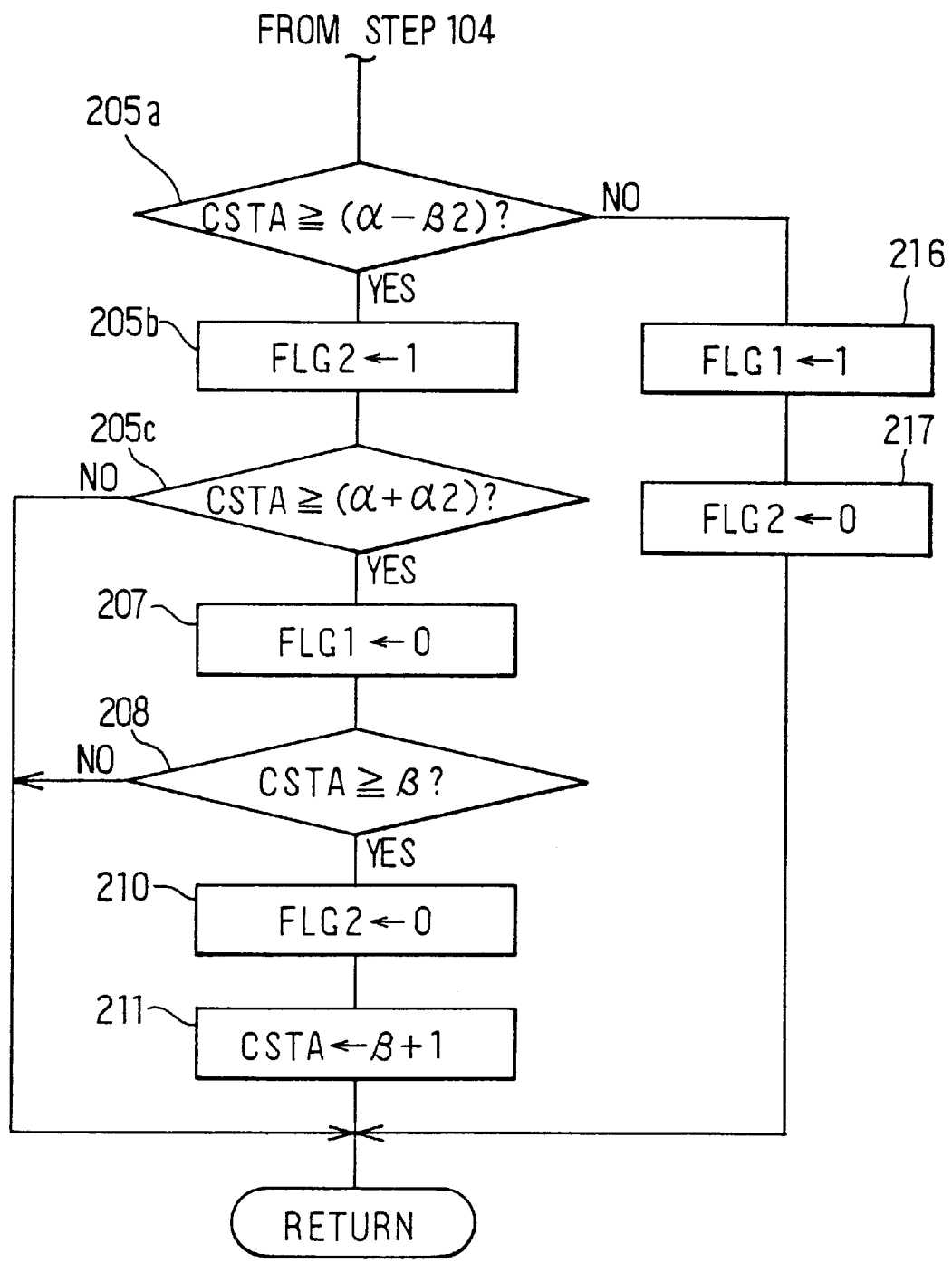
FIG. 9 is a flow chart showing the processing flow of the major portions of a fast catalyst warm-up control routine to be used in the second embodiment.

A specific control flow of the second embodiment will be described with reference to the flow charts of FIGS. 9 to 11. FIG. 9 shows a changing point of the fast catalyst warm-up control routine of FIG. 2, as used in the first embodiment. At step 205a subsequent to step 104, it is decided whether or not the post-start elapsed time counter CSTA has elapsed longer than (α−β2). If this decision is "No", the routine advances to step 216, at which the first catalyst heating allowance flag FLG1 is set to "1". At subsequent step 217, the second catalyst heating allowance flag FLG2 is reset to "0". As a result, only the ignition delay angle control is executed for CSTA<(α−β2).

When the post-start elapsed time counter CSTA reaches (α−β2), the routine advances from step 205a to step 205b, at which the second catalyst heating allowance flag FLG2 is set to "1" to start the injection dither control. At this time, the ignition delay angle control is also continuously executed with the first catalyst heating allowance flag FLG1 being set at "1" by the operation of step 216. At next step 205c, it is decided whether or not the post-start elapsed time counter CSTA has counted more than (α+α2). If this decision is "No", the present routine is ended without any subsequent operation. Thus, the ignition delay angle control and the injection dither control are executed together till the post-start elapsed time counter CSTA counts (α+α2). When CSTA≧(α+α2), the routine advances from step 205c to step 207, at which the first catalyst heating allowance flag FLG1 is reset to "0", and the ignition delay angle control is ended. From now on, the injection dither control is exclusively executed.

This injection dither control is executed for the time period β which is required for the catalyst 27 to rise to the activation temperature. When CSTA≧β, the routine advances from step 208 to step 210, at which the second catalyst heating allowance flag FLG2 is rest to "0" indicating the end of the injection dither control to end the injection dither control. At subsequent step 211, the overflow preventing operation (CSTA←β+1) of the post-start elapsed time counter CSTA is executed to end the present routine.

Figure 10:
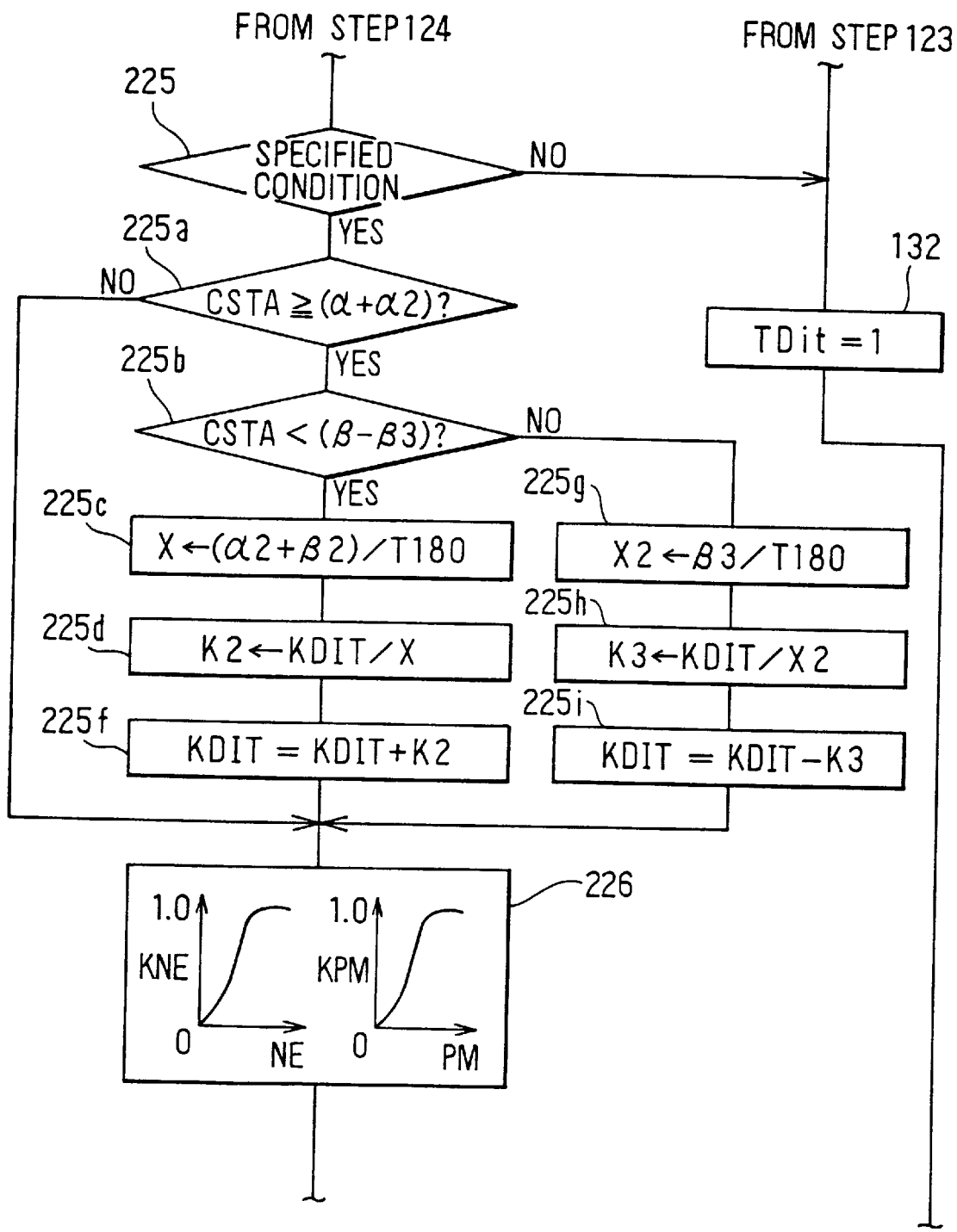
FIG. 10 is a flow chart showing the processing flow of the major portions of a fuel injection calculating routine to be used in the first embodiment.

On the other hand, FIG. 10 shows a major portion of the fuel injection calculation routine according to the second embodiment, and the description will be made upon the modifications from FIG. 3. If the specified condition is satisfied at step 225 subsequent to step 124, the routine advances to step 225a, at which it is decided whether or not the post-start elapsed time counter CSTA has counted (α+α2). If CSTA<(α+α2), the routine advances to step 226, at which the dither corrections KNE and KPM for correcting the dither coefficient KDIT are calculated respectively from the map corresponding to the engine rotation speed NE and the map corresponding to the intake pressure PM.

When CSTA≧(α+α2), the routine advances to step 225b, at which it is decided whether or not CSTA<(β−β3). If CSTA<(β−β3), the routine advances to step 225d, at which the number X of fuel injection a mount calculations to be executed for the time period (α2+β2) is calculated by the following formula:

$$X=(\alpha 2+\beta 2)/T180.$$

Here, T180 is a time period (the unit of which is assumed to be identical to that of CSTA) for the crankshaft to revolve by 180° CA.

At next step 225d, a dither coefficient increase K2 is determined by dividing the present injection dither coefficient KDIT by the fuel injection calculation number X. After this, at step 225f, the dither coefficient increase K2 is added to the present injection dither coefficient KDIT, and the routine advances to step 226. By repeating these operations, the injection dither coefficient KDIT is gradually increased but is kept away from having a large value added abruptly thereto.

After this, when $CSTA \geq (\beta - \beta 3)$, the routine advances from step 225b to step 225g, at which a fuel injection calculation time X2 for the time period $\beta$ is determined by dividing $\beta 3$ by T180. At subsequent step 225h, a dither coefficient attenuation K3 is determined by dividing the present injection dither coefficient KDIT by the fuel injection calculation number X2. At subsequent step 225i, the dither coefficient attenuation K3 is subtracted from the present injection dither coefficient KDIT, and the routine advances to step 226. By repeating these operations, the injection dither coefficient KDIT is gradually reduced to take zero when the $\beta$ time period elapses.

Figure 11:
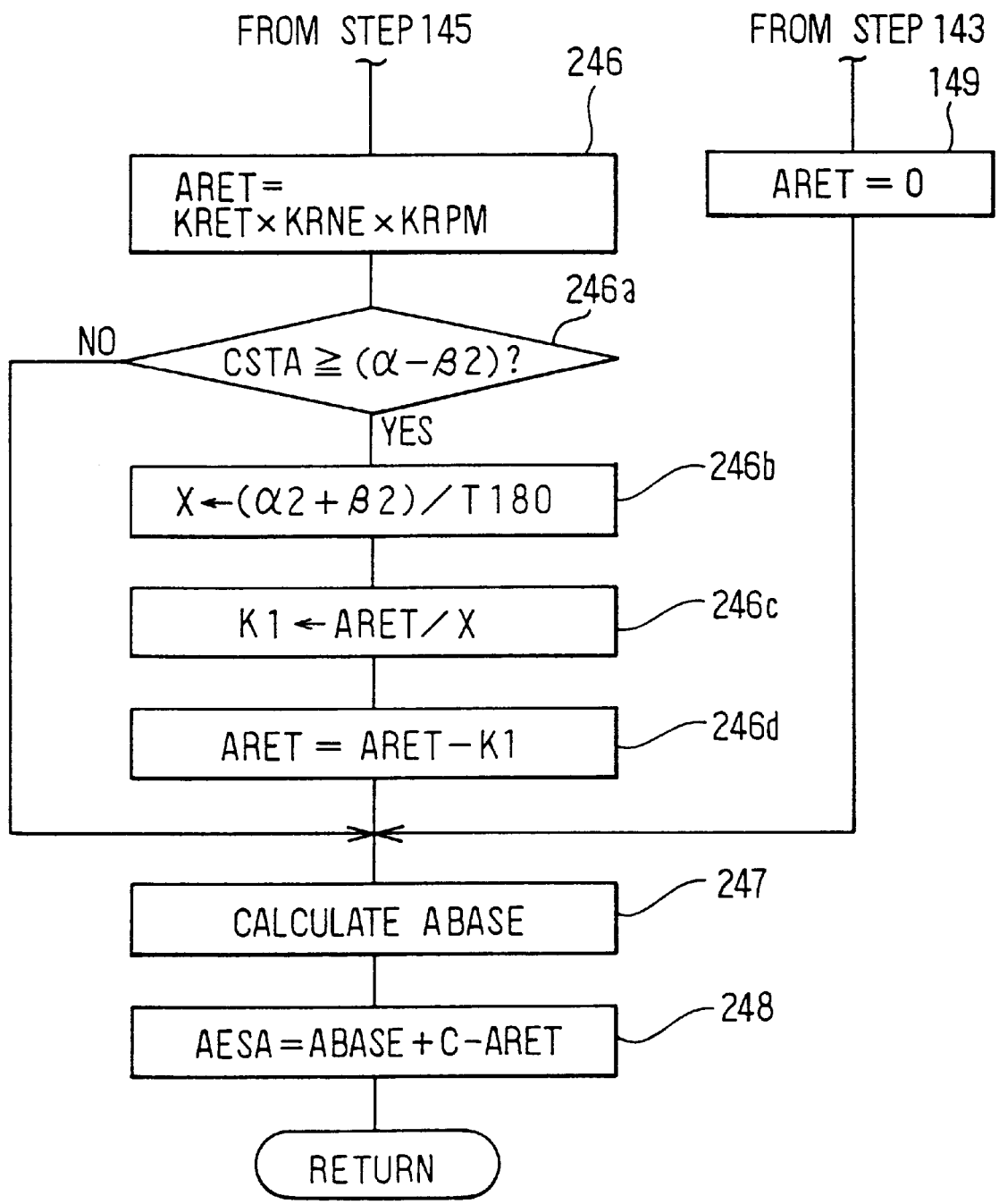
FIG. 11 is a flow chart showing the processing flow of the major portions of an injection timing calculating routine to be used in the second embodiment.

On the other hand, FIG. 11 shows a major portion of the ignition timing calculation routine according to the second embodiment, and the description will be made upon only the modifications from FIG. 4. At step 246 subsequent to step 145, the final delay angle ARET is calculated by using the delay angle KRET and the corrections KRENE and KRPM. After this, the routine advances to step 246a, at which it is decided whether or not the post-start elapsed time counter CSTA has counted more than $(\alpha - \beta 2)$. If this decision is "No", the routine advances to step 247, at which the basic ignition timing ABASE corresponding to the present NE and PM is calculated from the two-dimensional map of the engine rotation speed NE and intake pressure PM.

When $CSTA \geq (\alpha - \beta 2)$, the routine advances to step 246b, at which the ignition timing calculation number X for the $(\alpha 2 + \beta 2)$ is determined, as described in the fuel injection calculation routine of FIG. 10. At subsequent step 246c, a delay angle attenuation K1 is determined by dividing the present delay angle ARET by the ignition timing calculation number X, and the delay angle attenuation K1 is subtracted (at step 246d) from the delay angle ARET of this time at each execution of the present routine. By these operations, the delay angle ARET is gradually reduced to take zero when the start lapse time reaches $(\alpha + \alpha 2)$.

[THIRD EMBODIMENT]

In the first and second embodiments thus far described, the lapse time after the start is counted by the post-start elapsed time counter CSTA, and the temperature of the catalyst 27 is estimated depending upon the lapse time after the start so that the control is switched from the ignition delay angle control to the injection dither control. In this switching based upon the time, however, the catalyst temperature after lapse of the "predetermined time period" is different with the catalyst temperature after the start. As a result, it may be impossible to avoid the fact that the warm-up effect by the injection dither control immediately after the switching from the ignition delay angle control to the injection dither control fluctuates with the catalyst temperature at the start.

Figure 12:
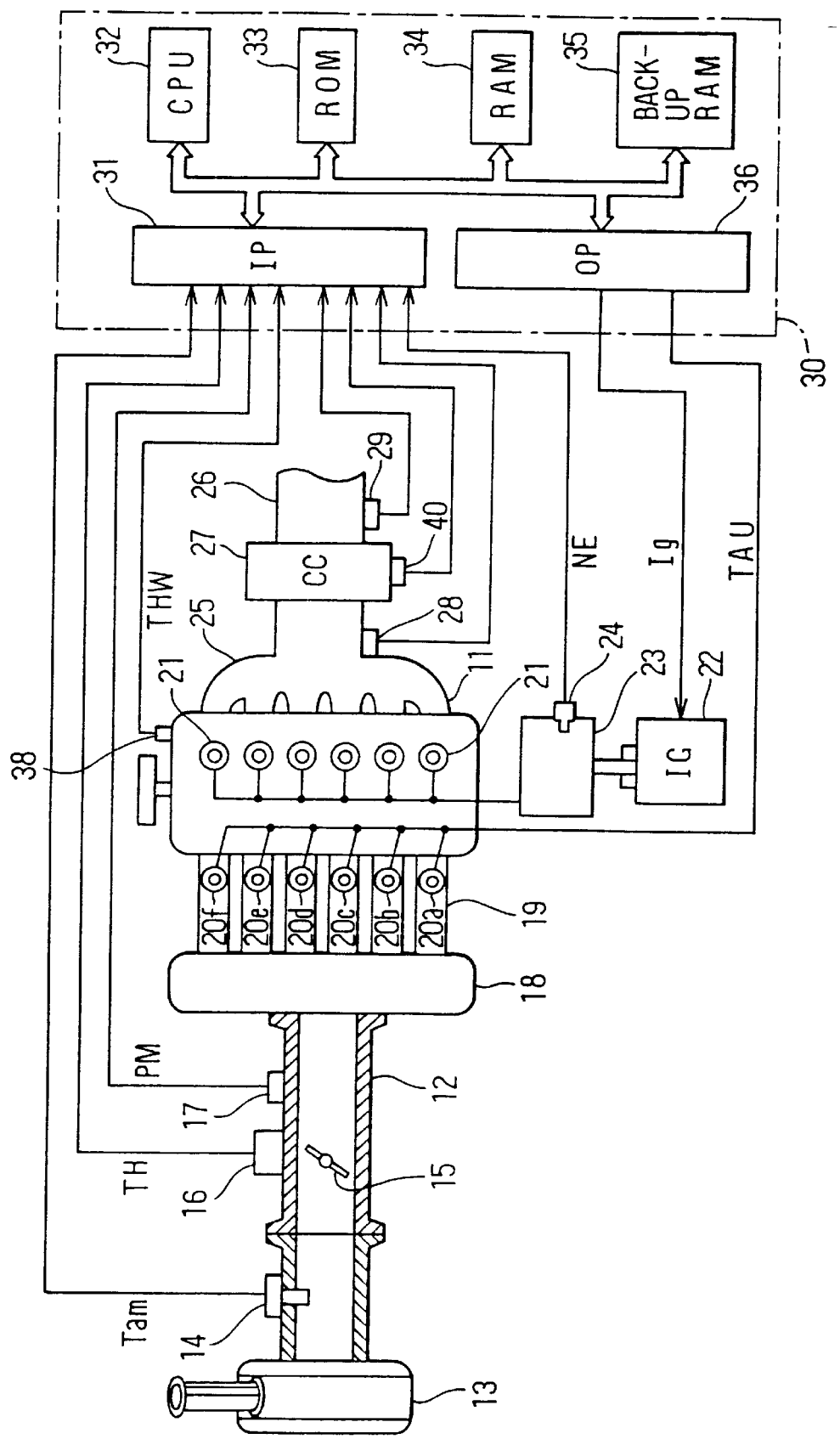
FIG. 12 is a schematic diagram showing a third embodiment of the present invention.

In the third embodiment shown in FIG. 12, the catalyst 27 is equipped with a catalyst temperature sensor 40 for detecting the catalyst temperature so that the catalyst temperature is determined from an output signal of the catalyst temperature sensor 40. When the catalyst temperature comes to the point A (i.e., the temperature for promoting oxidations of HC and CO in the catalyst 27) of FIG. 6, the control is switched from the ignition delay angle control to the injection dither control. After this, the injection dither control is ended when the catalyst temperature comes to the point B (i.e., the temperature for activating the catalyst 27 completely) of FIG. 6.

According to this third embodiment, the ignition delay angle control is switched to the injection dither control when the catalyst temperature detected by the catalyst temperature sensor 40 reaches the predetermined level (at the point A). As a result, the warm-up effect immediately after the switching is not influenced by the catalyst temperature at the start to provide an advantage of a stable warm-up effect. Moreover, the injection dither control is ended when the catalyst temperature detected by the catalyst temperature sensor 40 reaches the predetermined temperature (at the point B). As a result, the fast catalyst warm-up can be executed with neither excess nor shortage but without being influenced by the catalyst temperature at the start.

In this third embodiment, too, there may be provided as in the second embodiment the switching period for which the ignition delay angle control and the injection dither control are overlapped before and after the switching from the ignition delay angle control to the injection dither control, so that the injection dither amount may be gradually increased while attenuating the ignition delay angle gradually in the switching time period. Alternatively, the injection dither amount may be gradually attenuated when the injection dither control is ended. In this modification, the attenuation of the delay angle ARET and the increase/decrease of the injection dither coefficient may be changed according to the deviation between the target catalyst temperatures A and B and the catalyst temperature detected by the catalyst temperature sensor 40.

[FOURTH EMBODIMENT]

Figure 13:
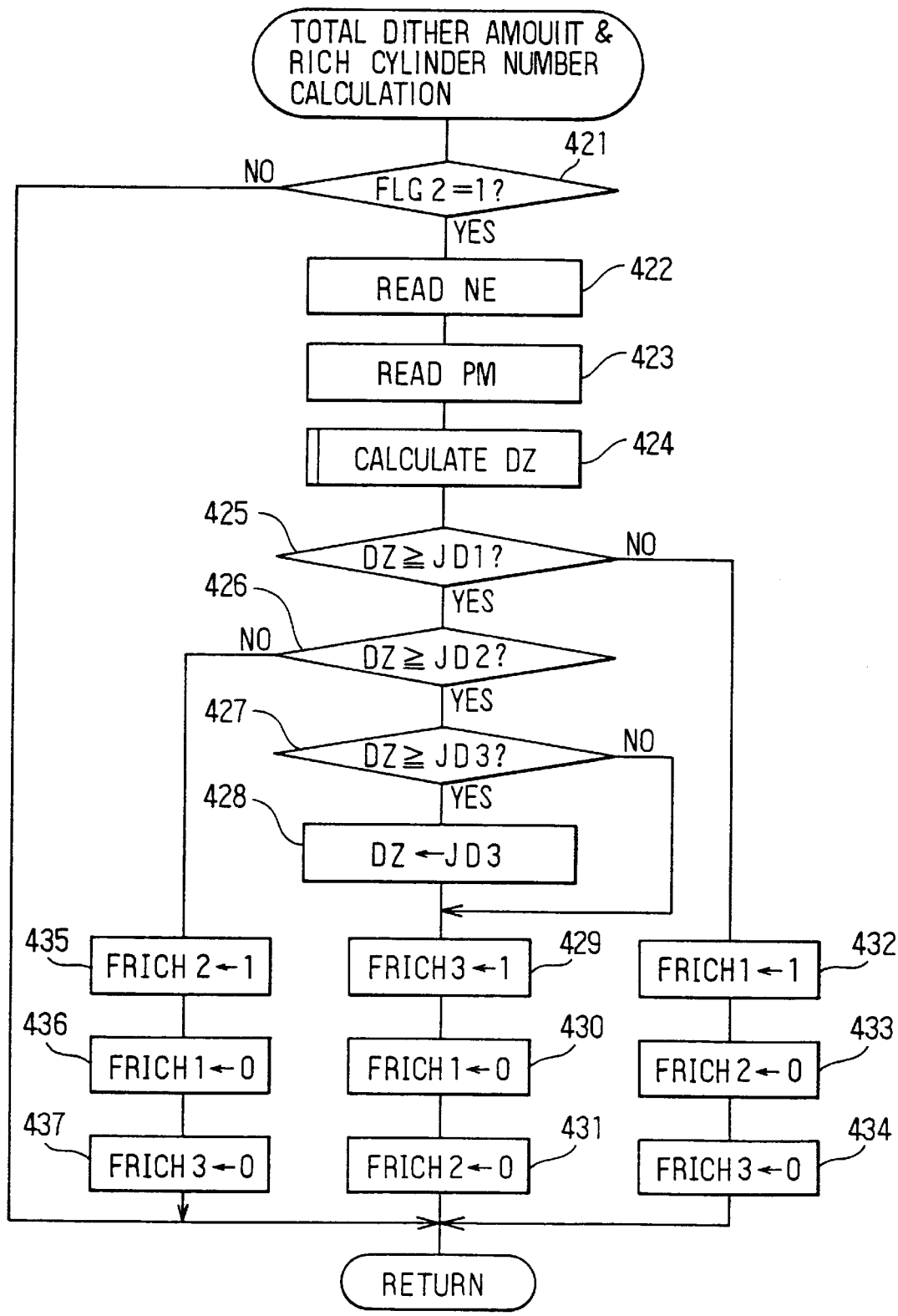
FIG. 13 is a flow chart showing the processing flow of a total injection dither amount and rich cylinder number calculating routine to be used in a fourth embodiment.

In the fourth embodiment to follow, the total injection dither amount and the rich cylinder number are calculated. FIG. 13 shows the processing flow of a routine for calculating the total injection dither amount and the rich cylinder number. The present routine calculates the total injection dither amount and the rich cylinder number for the 6-cylinder engine 11 and is executed at every 120° CA (at each top dead center of each cylinder). When the routine is started, at first step 421, it is decided whether or not the catalyst heating (or injection dither control) allowance flag FLG2 is at "1" indicating the execution of the injection dither control. If FLG2=0 (indicating the inhibition of the injection dither control), the present routine is ended without executing any subsequent operation.

Figure 14:
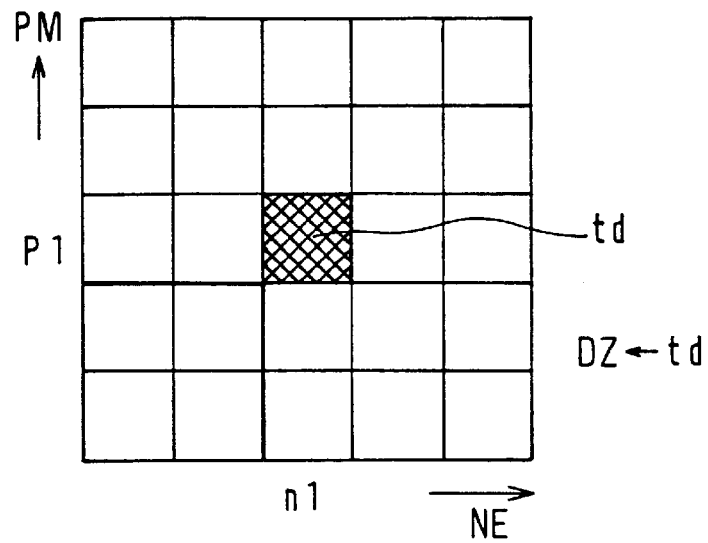
FIG. 14 is a characteristic diagram showing a two-dimensional map for determining the total injection dither amount DZ from an engine rotation speed NE and an intake pressure PM.

If FLG2=1 (indicating the execution of the ignition dither control) at step 421, the routine advances to steps 422 and 423, at which the engine rotation speed NE and the intake pressure PM are read in. At next step 424, a total injection dither amount DZ, as corresponding to a demanded carbon monoxide (CO) amount, is calculated from the total injection dither amount, as shown in FIG. 14, on the basis of the present NE and PM data. Here, the total injection dither amount DZ is determined as the increase in the injection amount corresponding to the CO amount, i.e., the plus side dither value×the rich cylinder number. For NE=n1 and PM=P1, for example, as shown in FIG. 14, the td value is calculated from the total injection dither amount map to set DZ=td. Thus, by calculating the total injection dither amount DZ in accordance with the engine running state (e.g., the engine rotation speed NE or the intake pressure PM), the total injection dither amount DZ can be set without deteriorating the drivability to effect the injection dither control preferring to the drivability.

At next step 425, it is decided whether or not the total injection dither amount DZ is over a first decision value JD1. Here, this first decision value JD1 is a limit value for the injection dither control with three rich cylinders and three lean cylinders. If DZ<JD1 at step 425, that is, if the injection dither control can be executed with the three rich cylinders and three lean cylinders, the routine advances to steps 432, 433 and 434, and the present routine is ended by setting a three rich cylinder/three lean cylinder control allowance flag FRICH1 to "1" and by resetting other flags FRICH2 and FRICH3.

If DZ≧JD1 at step 425, on the other hand, the routine advances to step 426, at which it is decided whether or not the total injection dither amount DZ is over a second decision value JD2. Here, this second decision value JD2 is a limit value for the injection dither control with two rich cylinders and four lean cylinders. If DZ<JD2 at step 426, that is, the injection dither control can be executed with the two rich cylinders and four lean cylinders, the routine advances to steps 435, 436 and 437, and the present routine is ended by setting the two rich cylinder/four lean cylinder allowance flag FRICH2 to "1" and by resetting the remaining flags FRICH1 and FRICH3.

If DZ≧JD2 at step 426, on the other hand, the routine advances to step 427, at which it is decided whether or not the total injection dither amount DZ is over a third decision value JD3. Here, this third decision value JD3 is a limit for the injection dither control with one rich cylinder and five lean cylinders, or a limit of the total injection dither amount DZ. If DZ<JD3 at step 427, that is, if the injection dither control can be executed with one rich cylinder and five lean cylinders, the routine advances to steps 429, 430 and 431, and the present routine is ended by setting the one rich cylinder/five lean cylinder control allowance flag FRICH3 to "1" and by resetting the remaining flags FRICH1 and FRICH2.

If DZ≧JD3 at step 427, that is, if the total injection dither amount calculated at step 424 exceeds the limit value, a serious influence such as a misfire will occur in the engine, and the routine advances to step 428, at which a guard treatment is executed to suppress the total injection dither amount DZ less than the third decision value JD3. The routine then advances to steps 429, 430 and 431, and the present routine is ended by setting the one rich cylinder/five lean cylinder allowance flag FRICH3 to "1" and by resetting the remaining flags FRICH1 and FRICH2.

Figure 17:
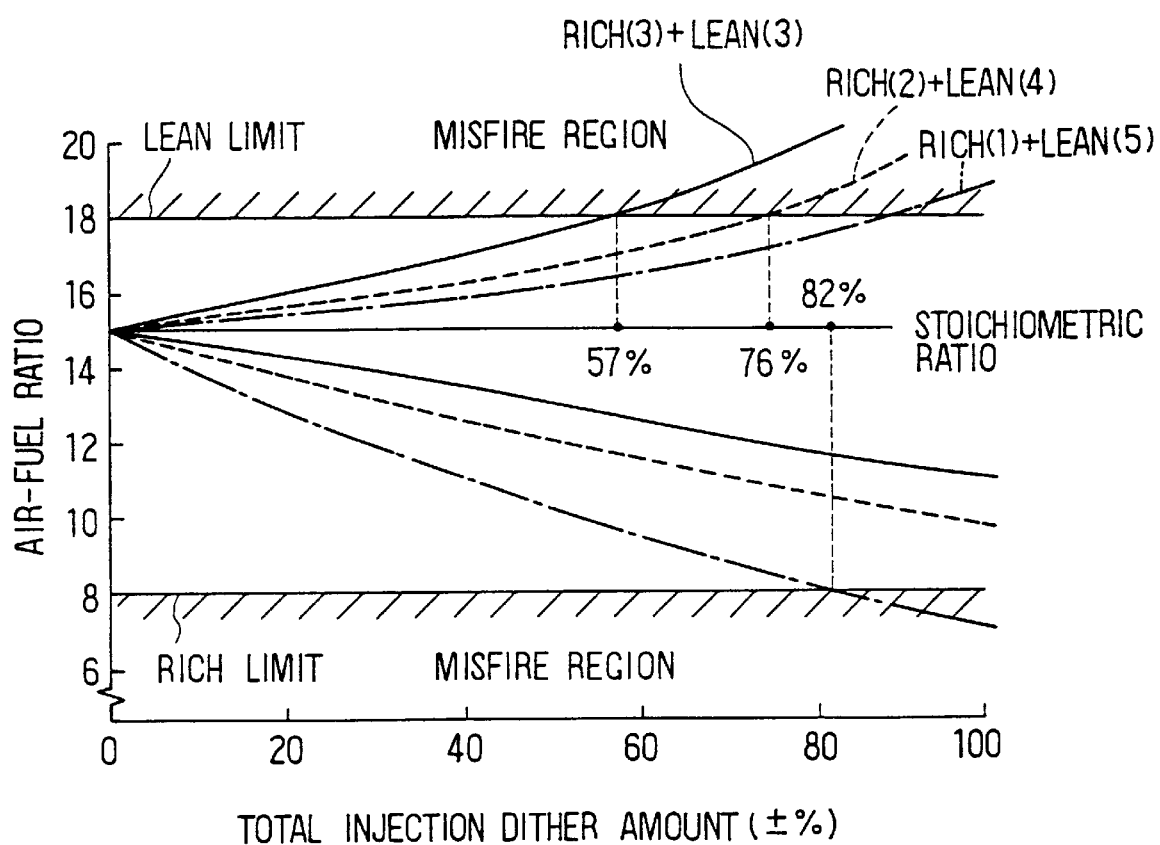
FIG. 17 is a characteristic graph illustrating the air/fuel ratios (A/F) at rich and lean sides when the rich cylinder number/the lean cylinder number are switched for the total cylinder stoichiometric (at an air excess ratio λ=1) control.

Here will be described the switching control of the rich cylinder number/lean cylinder number according to the first to third decision values JD1 to JD3, as executed at step 425 to 434. FIG. 17 is a characteristic diagram illustrating rich and lean air/fuel ratio (A/F) when the rich cylinder number/lean cylinder number is switched, for all the cylinders being stoichiometric (i.e., an air excess ratio λ=1) for the 6-cylinder engine 11. If the air/fuel ratio (A/F) range for combustion without any misfire is set to 8≦A/F≦18, the injection dither control may be executed with the three rich cylinders/three lean cylinders as in the art, if the total injection dither amount is small. In the three rich cylinder/three lean cylinder case, the shift width (of the injection dither) of the air/fuel ratio is limited by the lean cylinders within 19% (A/F=12.3 to 18) for each cylinder. As a result, the total injection dither amount of the three rich cylinders/three lean cylinders is limited by 19×3=57%. If this value of 57% is exceeded, the lean cylinders come into the misfire region, and the cylinder numbers are switched to two rich cylinders/four lean cylinders.

If the limit of 19×4=76% is exceeded even in the injection dither control of the two rich cylinders/four lean cylinders, the lean cylinders also reach the misfire region, and the cylinder numbers are switched to one rich cylinder/five lean cylinders. In this one rich cylinder/five lean cylinder mode, the total injection dither amount is limited by the rich cylinder to 82% (i.e., A/F=14.6 to 8). If this limit 82% is exceeded, the rich cylinder comes into the misfire region.

By thus switching the ratio of the rich cylinder number and the lean cylinder number in accordance with the total injection dither amount, the limits of the total injection dither amount DZ can be far more widened than the prior art to improve the warm-up capacity of the catalyst 27. Here, the aforementioned first decision value JD1 of FIG. 13 is 57% in FIG. 17; the second decision value JD2 is 76%; and the third decision value JD3 is 82%.

Figure 15:
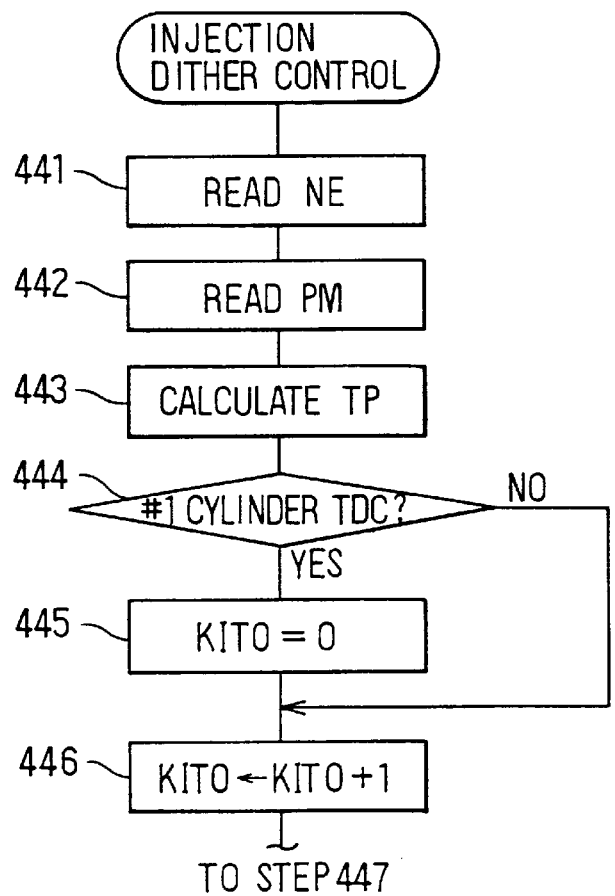
FIG. 15 is a part of a flow chart showing the processing flow of an injection dither control routine.
Figure 16:
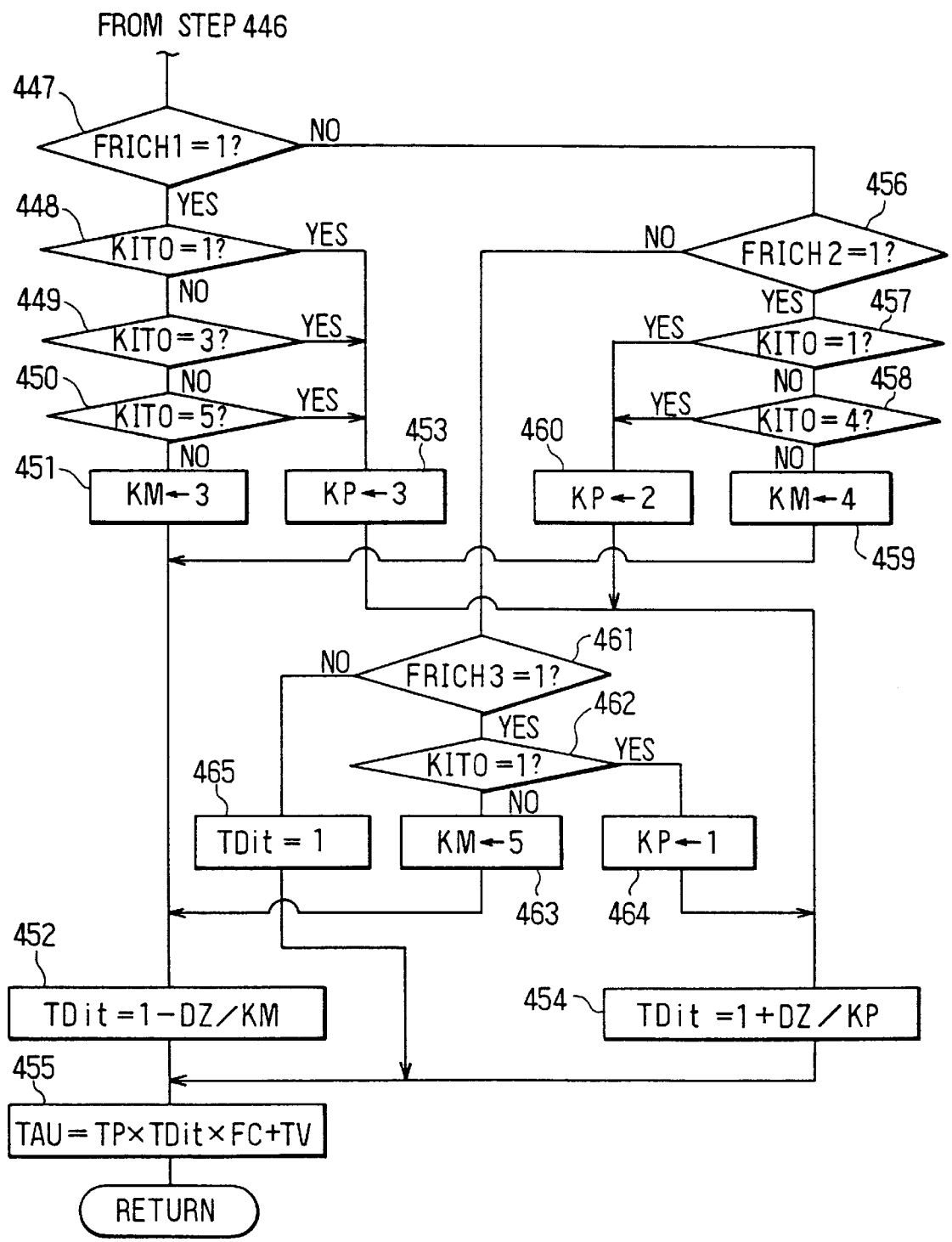
FIG. 16 is the other part of flow chart showing the processing flow of the injection dither control routine.

Here will be described the processing flow of the injection dither control execution routine, as shown in FIGS. 15 and 16. The present routine is executed at every 120° CA (at each top dead center of each cylinder). When the routine is started, the engine rotation speed NE and the intake pressure PM are read in at first steps 441 and 442, and the basic fuel injection amount TP is calculated at subsequent step 443 by using the values NE and PM. At next step 444, it is decided whether or not the first cylinder is at the top dead center (TDC). If the first cylinder TDC, the routine advances to step 445, at which a cylinder counter KITO is reset to "0". At subsequent step 446, the cylinder counter KITO for discriminating the injection cylinder is incremented. Here, KITO=1 indicates the first cylinder; KITO=2 indicates the second cylinder; . . . ; and KITO=6 indicates the sixth cylinder.

Unless the first cylinder TDC at step 444, on the other hand, the cylinder counter KITO is not cleared, but the routine advances to step 446, at which the cylinder counter KITO is incremented.

At next step 447 (FIG. 16), it is decided whether or not the three rich cylinder/three lean cylinder control allowance flag FRICH1 is at "1" indicating the allowance. If FRICH1=1 (for allowance), it is decided at steps 448, 449 and 450 whether or not the cylinder counter KITO takes any of 1, 3 and 5. Since the cylinders corresponding to KITO=1, 3 and 5 are assigned to the rich cylinders, the routine advances to step 453, at which a rich cylinder number setting value KP is set to 3. At subsequent step 454, the final dither coefficient TDit is calculated by the following formula (1) at the injection timings of the rich cylinders:

$$TDit=1+DZ/KP \qquad (1).$$

Since the cylinders corresponding to KITO=2, 4 and 6 are assigned likewise to the lean cylinders, a lean cylinder number setting value KM is set to 3 at step 451. At subsequent step 452, the final dither coefficient TDit is calculated by the following formula at the injection timings of the lean cylinders:

$$TDit=1-DZ/KM.$$

If, on the other hand, the three rich cylinder /three lean cylinder control allowance flag FRICH1 is at "0" indicating the inhibition at step 447, the routine advances to step 456, at which it is decided whether or not the two rich cylinder/four lean cylinder control allowance flag FRICH2 is at "1" indicating the allowance. If FRICH=1 (for allowance), the cylinders are assigned at steps 457 to 460 to the two rich cylinder/four lean cylinders like before. In other words, the cylinders corresponding to KITO=1 and 4 are assigned to the rich cylinders, and the routine advances to step 460, at which the rich cylinder number setting value KP is set to 2. At subsequent step 454, the final dither coefficient TDit is calculated by the above-specified formula (1). Since the cylinders corresponding to KITO=2, 3, 5 and 6 are assigned to the lean cylinders, the lean cylinder number setting value KM is set to 4 at Step 459. At subsequent step 452, the final dither coefficient TDit is calculated by the above-specified formula at the injection timings of the lean cylinders.

If both the FRICH1 and FRICH2 are at "0" indicating the inhibition, on the other hand, the routine advances to step 461, at which it is decided whether or not the one rich cylinder/five lean cylinder control allowance flag FRICH3 is at "1" indicating the allowance. If FRICH3=1 (for allowance), the cylinders are assigned at steps 462 to 464 like before to the one rich cylinder/five lean cylinders. In other words, since the cylinder corresponding to KITO=1 is assigned to the rich cylinder, the routine advances to step 464, at which the rich cylinder setting value KP is set to "1". At subsequent step 454, the final dither coefficient TDit is calculated by the above-specified formula (1). Since the cylinders corresponding to KITO=2 to 6 are assigned to the lean cylinders, the lean cylinder number setting value KM is set to 5 at step 463. At subsequent step 452, the final dither coefficient TDit is calculated by the above-specified formula at the injection timings of the lean cylinders.

If the decision of step 461 is "No", that is, if all the FRICH1, FRICH2 and FRICH3 are at "0" indicating the inhibition, the routine advances to step 465, at which the final dither coefficient TDit is set to 1.

After the final dither coefficient TDit has thus been calculated, the routine advances to step 455, at which the final fuel injection amount TAU is calculated from the following formula by using the basic fuel injection amount TP, the final dither coefficient TDit, the basic fuel injection correction coefficient FC and the ineffective injection time correction TV:

$$TAU=TP \times Tdit \times FC+TV.$$

Figure 18:
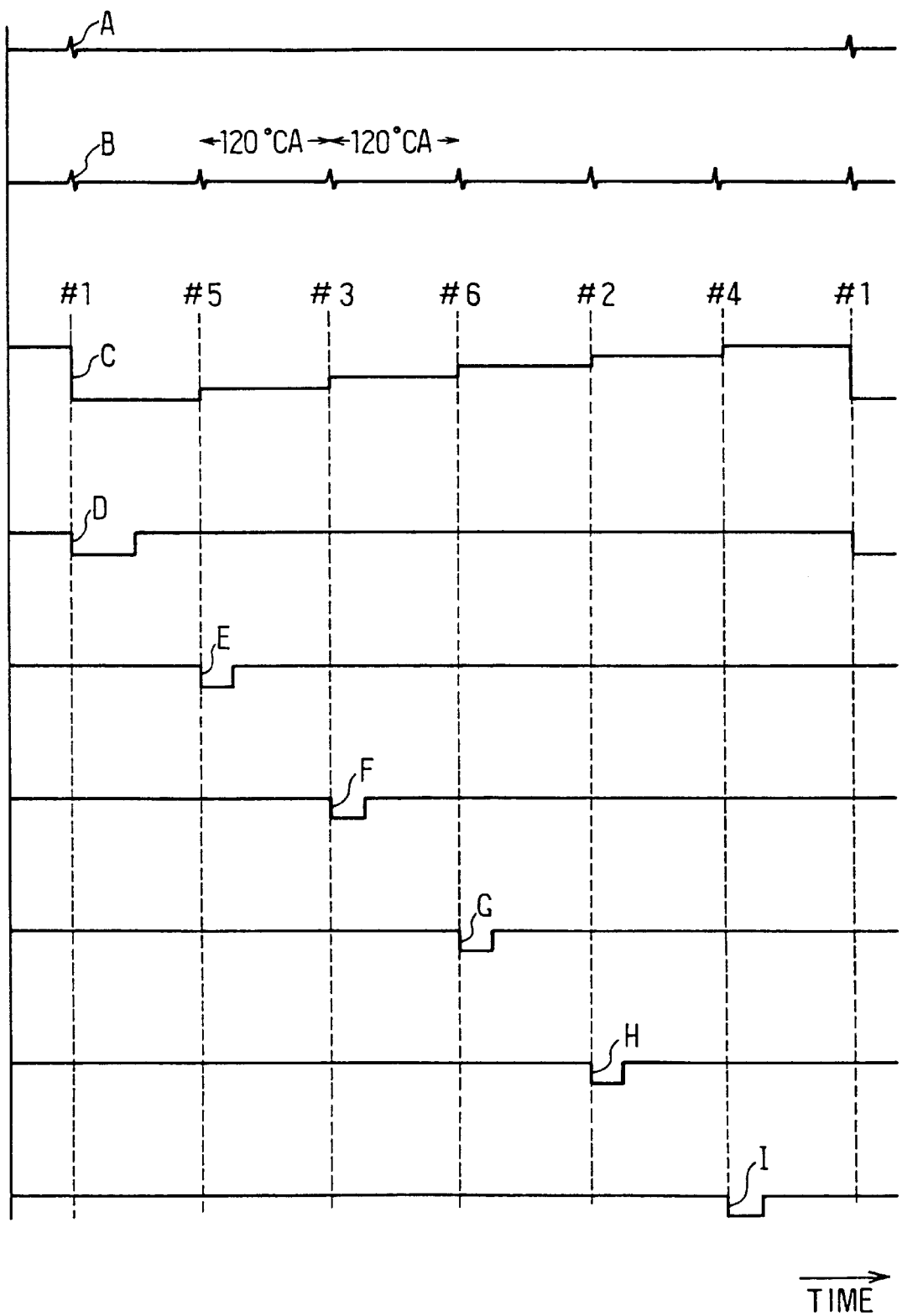
FIG. 18 is a time chart showing the various signals in the injection dither control and a sequence of strokes of individual cylinders.

On the other hand, FIG. 18 is a time chart for the injection dither control with the one rich cylinder/five lean cylinders. In this time chart, letter A indicates a first cylinder discrimination signal at every 720° CA, as outputted at the top dead center (TDC) of the first cylinder, and letter B indicates a 120° CA timing signal at every 120° CA, as outputted at the top dead center of each cylinder. Letter C indicates the cylinder counter KITO for incrementing at each production of the 120° CA timing signal B and for resetting at each production of the first cylinder discrimination signal A. Letters D to I indicate injection pulse signals for driving the injectors 20a to 20f which are disposed in the individual cylinders.

This time chart will be described on the case in which the one rich cylinder/five lean cylinder control allowance flag FRICH3 is set at "1" indicating the allowance. Only if the cylinder counter KITO is at 1 (i.e., the first cylinder), the first cylinder is subjected to the rich control whereas the other cylinders are subjected to the lean control at the value which is prepared by dividing the lean component corresponding to the rich dither equal to the remaining five cylinders. In the injection dither control, the rich combustion and the lean combustion are repeated by increasing/decreasing the fuel injection amount at every combustions to shift the air/fuel ratio to the rich side and to the lean side with respect to the stoichiometric air/fuel ratio, so that the carbon monoxide (CO) may be produced by the rich combustion whereas the oxygen ($O_2$) may be produced by the lean combustion. The carbon monoxide and oxygen thus produced are subjected to the oxidations, as expressed by the following formula, by the catalyzing action of the catalyst 27 to generate the calorie (Q):

$$2CO+O_2=2CO_2+Q.$$

The calorie (Q), as generated by this oxidation, will raise the temperature of the exhaust gas passing the catalyst 27 to promote the warm-up of the catalyst 27.

Figure 19A:
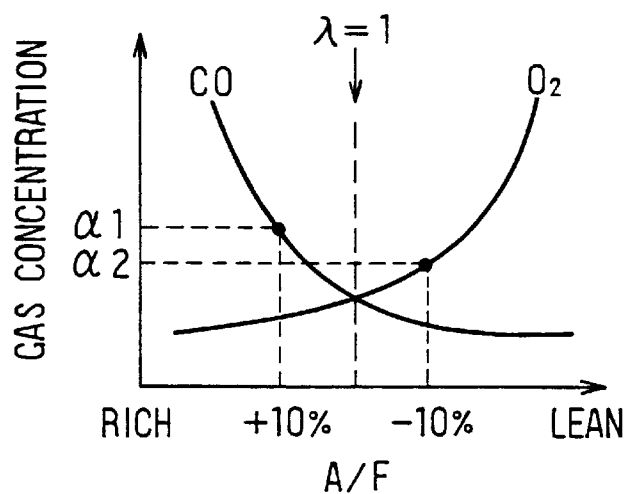
FIGS. 19A, 19B and 19C are a characteristic diagram plotting the changes in CO and $O_2$ concentrations when the air/fuel ratio is shifted by ±10%, a characteristic diagram plotting a relation between a total injection dither and a CO supply, and a characteristic diagram plotting a relation between a catalyst temperature rise and a CO supply.
Figure 19B:
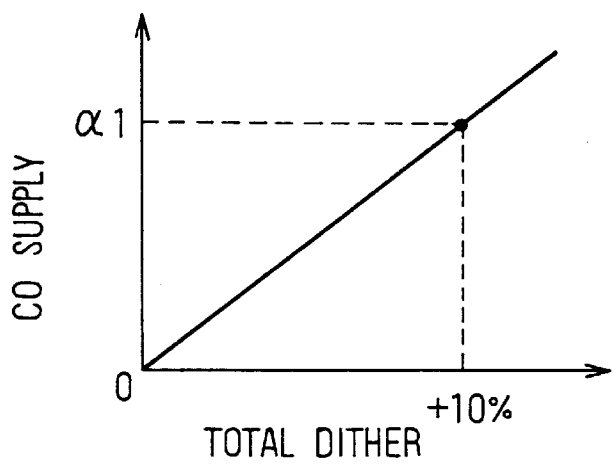
Figure 19C:
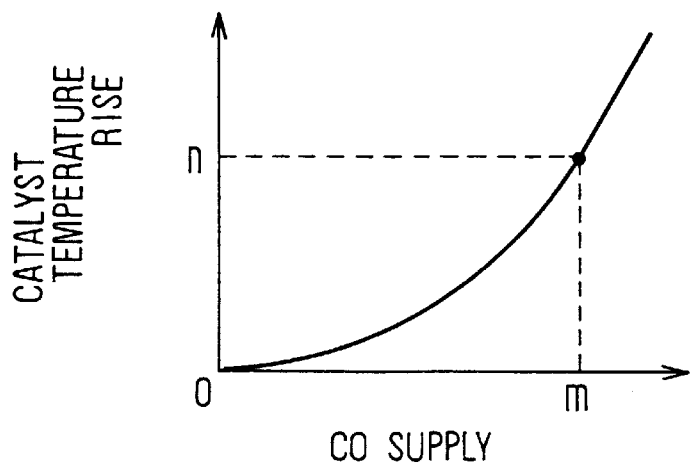

FIG. 19A presents the distributions of reactive gas concentrations of CO and $O_2$ to be supplied to the catalyst 27 when the air/fuel ratio is shifted by ±10% from the stoichiometric state (i.e., the air excess ratio λ=1). As shown in FIG. 19B, the CO supply linearly increases the more as the total injection dither amount increases the more to the plus side. As shown in FIG. 19C, the catalyst temperature rises to the higher level as the CO supply increases the more, and the catalyst temperature rise takes a value n when the CO supply is at m.

Figure 20:
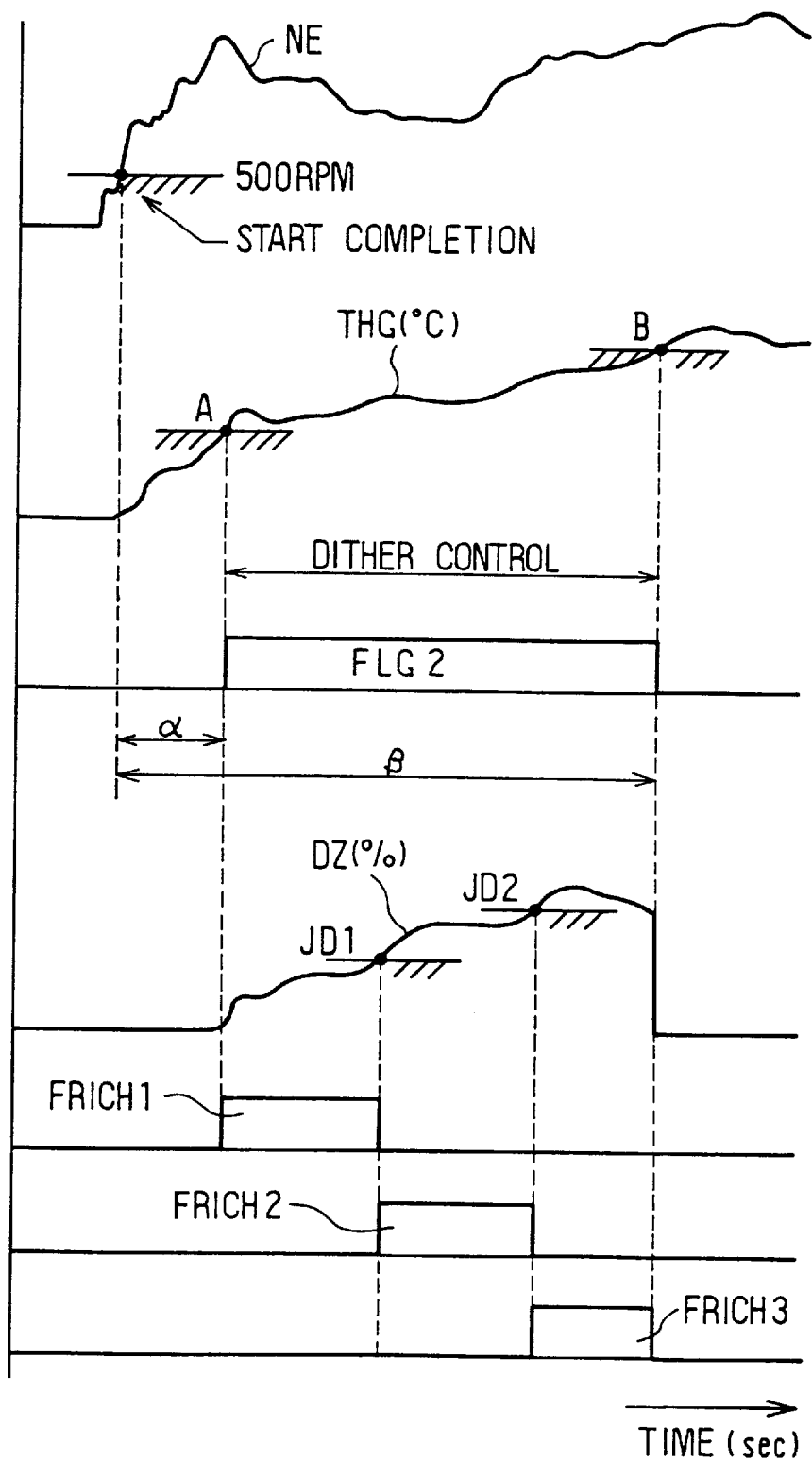
FIG. 20 is a time chart illustrating behaviors of an injection dither control of a fourth embodiment.

The flow of the fast catalyst warm-up control thus far described will be described with reference to the time chart of FIG. 20. It is assumed, as shown in FIG. 20, that the vehicle runs after the start (at an engine cooling water temperature of 25° C.). The engine rotation speed rises with the start, and this start is completed when the engine rotation speed reaches a predetermined value (e.g., 500 RPM).

After the end of the start, the lapse time counter CSTA is integrated, and the injection dither control allowance flag FLG2 is set to "1" to start the injection dither control when there elapses the time period α for which it is estimated that the catalyst temperature is caused to reach the point A (i.e., the temperature for promoting the oxidation of CO in the catalyst 27) by the ignition delay angle control. After this, the injection dither control is continued till the time period β for which it is estimated that the catalyst temperature is caused to reach the point B (or the activation temperature) by the warm-up of the injection dither control. After the time period β elapses, the injection dither control allowance flag FLG2 is reset to "0" to end the injection dither control.

During the execution of the injection dither control, moreover, the total injection dither amount DZ is calculated at every 120° CA and is compared with the first to third decision values JD1 to JD3 (although the third decision value JD3 is not used in FIG. 20). According to these comparison results, the allowance flags FRICH1 to FRICH3 are switched to apply the cylinder numbers of the rich cylinder group/lean cylinder group. As a result, the limit of the total injection dither amount DZ can be widened more than the prior art to improve the catalyst warm-up capacity by the injection dither control thereby to shorten the catalyst warm-up period and improve the emission.

According to this fourth embodiment, on the other hand, the total injection dither amount DZ is calculated from a predetermined map in accordance with the engine running state (e.g., the engine rotation speed NE or the intake pressure PM) so that the total injection dither amount DZ can be set without deteriorating the drivability thereby to effect the injection dither control preferring to the drivability.

[FIFTH EMBODIMENT]

Figure 21:
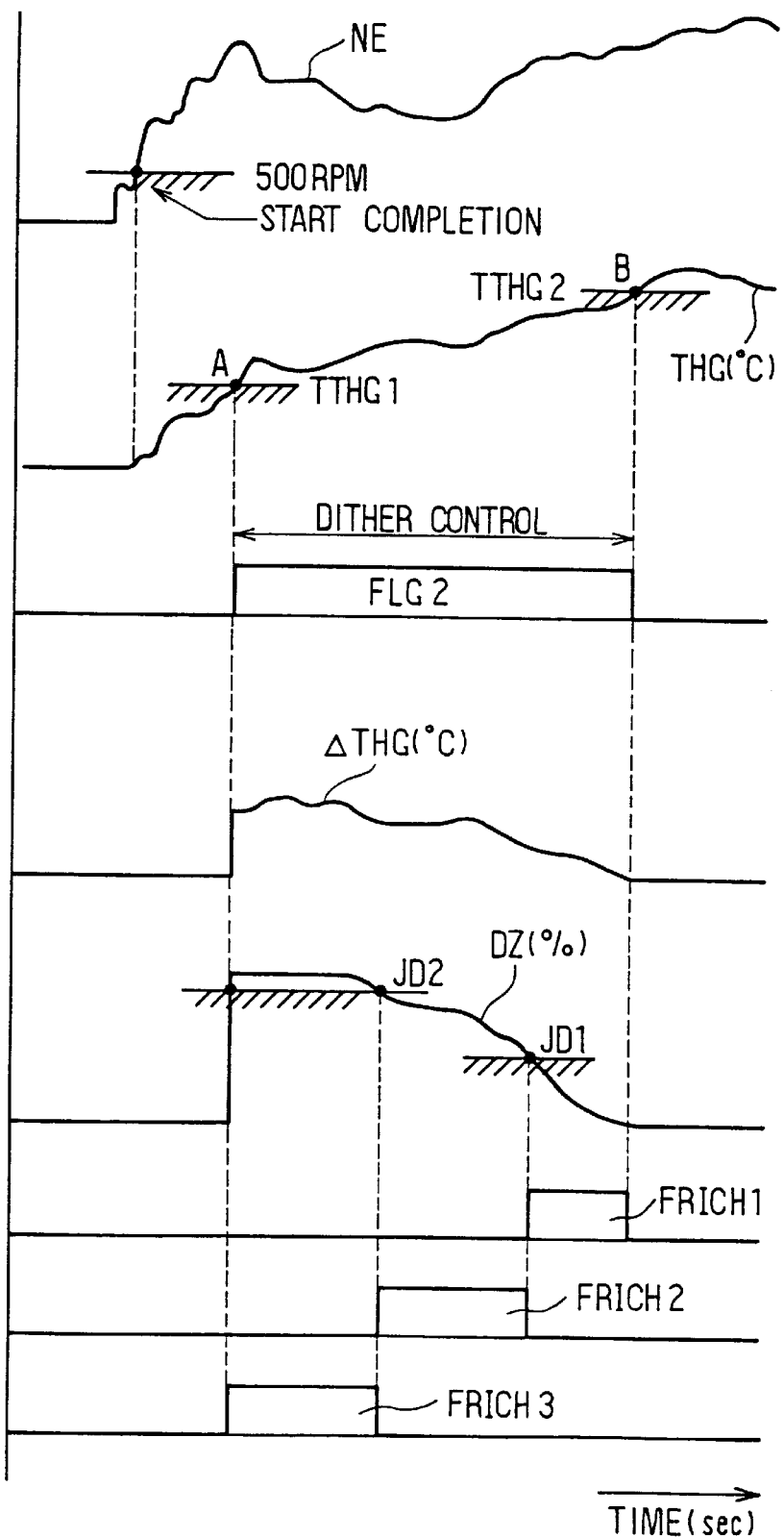
FIG. 21 is a time chart illustrating behaviors of an injection dither control of a fifth embodiment.

The summary of the control of the fifth embodiment or a modification of the fourth embodiment will be described with reference to the time chart of FIG. 21 (although the description is restricted to only the changes from the fourth embodiment). When a catalyst temperature THG, as detected by the catalyst temperature sensor 40, reaches the injection dither control starting temperature TTHG1 of the point A, for instance, by ignition timing delay control, the injection dither control allowance flag FLG2 is set to "1" to start the injection dither control. After this, the catalyst temperature is raised by the warm-up effect of the injection dither control. When the catalyst temperature reaches the catalyst activation temperature TTHG2 of the point B, the injection dither control allowance flag FLG2 is reset to "0" to end the injection dither control (or the catalyst warm-up).

According to the fifth embodiment, a deviation ΔTHG between the catalyst temperature THG detected by the catalyst temperature sensor 40 and the target catalyst activation temperature TTHG2 is calculated during the injection dither control so that the total injection dither amount DZ is determined from the predetermined map in accordance with the deviation ΔTHG. As a result, the total injection dither amount DZ can be set according to the rise in the catalyst temperature to effect the injection dither control preferring to the temperature rise of the catalyst 27. From now on, the total injection dither amount DZ is compared as in the fourth embodiment with the first to third decision values JD1 to JD3 (although the third decision value JD3 is not used in FIG. 21). In accordance with these comparison results, the allowance flags FRICH1 to FRICH3 are switched to assign the cylinder number of the rich cylinder group/lean cylinder group.

Here will be described a specific control flow of the fifth embodiment with reference to the flow chart of FIG. 22.

Figure 22:
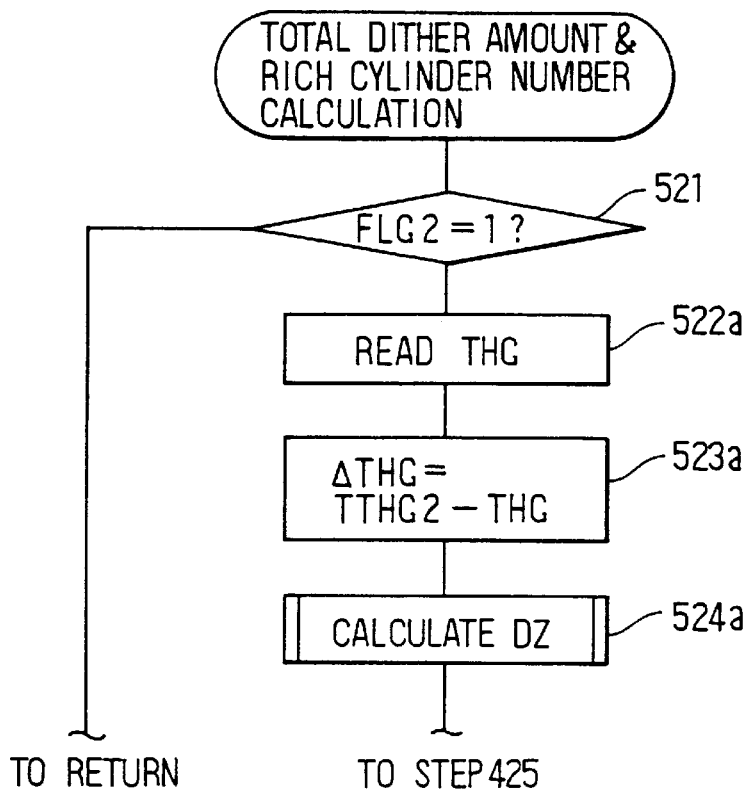
FIG. 22 is a flow chart showing the processing flow of major portions of a total injection dither amount and rich cylinder number calculating routine to be used in the fifth embodiment.

FIG. 22 shows the changing point of the total injection dither amount and rich cylinder number calculation routine of FIG. 13, as used in the fourth embodiment (that is, steps 422, 423 and 424 of FIG. 13 are changed).

Figure 23:
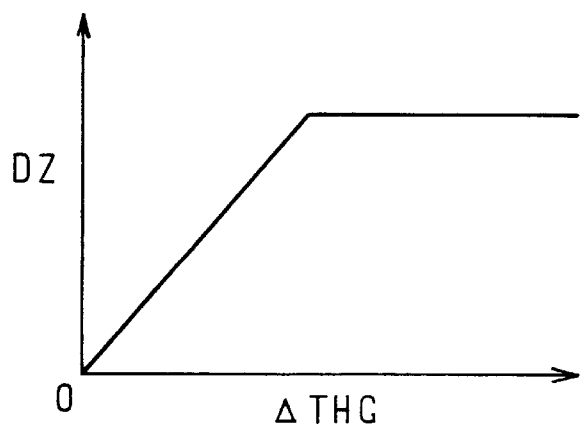
FIG. 23 is a characteristic diagram showing a map for calculating the total injection dither amount DZ from a deviation ΔTHG between an actual value of the catalyst temperature and a target catalyst activation temperature.

If in execution of the injection dither control (FLG2=1), the routine advances from step 521 to step 522a, at which the catalyst temperature THG detected by the catalyst temperature sensor 40 is read in. At next step 523a, a deviation ΔTHG between the catalyst activation temperature TTHG2 and the detected catalyst temperature THG is calculated. At subsequent step 524a, the total injection dither amount DZ is calculated from the map shown in FIG. 23 in accordance with the deviation ΔTHG. As a result, the total injection dither amount DZ can be set according to the rise in the catalyst temperature THG, to effect the injection dither control preferring to the temperature rise of the catalyst 27. The subsequent operations are identical to those of FIG. 13.

In the fifth embodiment, the catalyst temperature is detected directly by the catalyst temperature sensor 40. However, the catalyst temperature may be detected indirectly on the basis of the temperature data reflecting the catalyst temperature, such as the output signals of the various temperature sensors (e.g., the water temperature sensor 38, the exhaust temperature sensor, the element temperature sensor or the heater temperature sensor) for detecting the engine water temperature, the exhaust temperature, or the element temperature or heater temperature of the air/fuel ratio sensor 28 or the oxygen sensor 29.

In both the fourth and fifth embodiments thus far described, the injection dither control can be started after it can be awaited by setting the timing of starting the injection dither control in terms of the lapse time after the start or the catalyst temperature that the catalyst temperature rises to the level for promoting the oxidation of CO. As a result, it is possible to avoid the deterioration in the emission, as might otherwise be caused by effecting the injection dither control with the catalyst being cold. In the two embodiments, however, the injection dither control may be started immediately after the starting completion. In this modification, too, the catalyst could be warmed up to the activation temperature by the injection dither control if the timing of ending the injection dither control were decided in terms of the lapse time after the start or the detected value of the catalyst temperature. Thus, the desired object of the present invention can be sufficiently achieved.

For the time period after the engine start and before the start of the injection dither control, on the other hand, the exhaust gas temperature may be raised by the ignition delay angle control to warm up the catalyst 27. With a view to suppressing the engine torque fluctuation during the injection dither control, moreover, the ignition timing may be corrected to a delay angle when the injection dither is shifted to the rich side.

In the foregoing fourth embodiment, on the other hand, the predetermined time periods α and β for determining the timings of starting/ending the injection dither control may be corrected according to the engine cooling water temperature at the starting time. Then, it is possible to estimate the catalyst temperature accurately on the basis of the lapse time after the start.

Incidentally, in the foregoing embodiments, the present invention is applied to the 6-cylinder engine but may be applied to an engine having other numbers of cylinders (e.g., a 4-cylinder engine, a 5-cylinder engine or an 8-cylinder engine). In the 4-cylinder engine, for example, the engine modes may be switched between the two rich cylinders/two lean cylinders and the one rich cylinder/three lean cylinders in accordance with the total injection dither amount.

[SIXTH EMBODIMENT]

Figure 24:
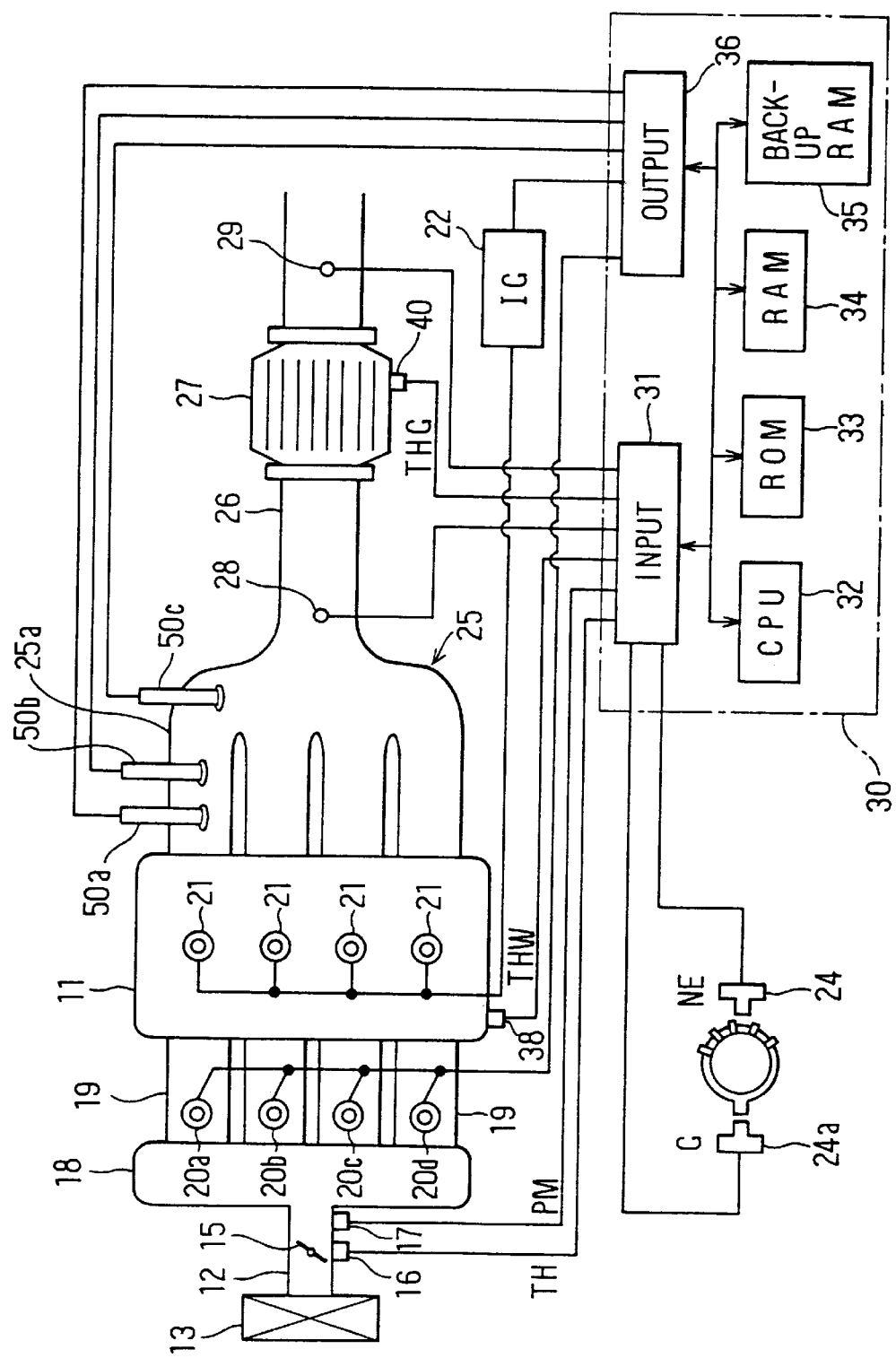
FIG. 24 is a schematic diagram showing a construction of an engine control system according to a sixth embodiment of the present invention.

A sixth embodiment, which adopts a system for warming up the catalyst by afterburning the exhaust gas to raise the exhaust gas temperature in place of the ignition delay angle control of the first embodiment, will be described with particular reference to the differences from the first embodiment. In this sixth embodiment, a 4-cylinder internal combustion engine 11 will be described in connection with the construction of the warm-up of the catalyst 27 with reference to FIG. 24. The engine 11 discharges the intake air as it is in an unburned state to the exhaust system by cutting the fuel injection into some cylinder (e.g., the #4 cylinder) during the warm-up of the catalyst 27, and discharges the (rich) exhaust gas having high HC and CO concentrations by increasing the fuel injections into the remaining cylinders #1 to #3 (as will be called the "rich combustion cylinders") within such a range as to invite no misfire. The rich gas is mixed with the aforementioned unburned air. Moreover, in three locations in an exhaust manifold 25a connected to the exhaust port of the #4 cylinder (as will be called the "fuel cut cylinder") from which the fuel injection is cut off, there are disposed glow plugs 50a to 50c acting as the exhaust burning means, and one of these glow plugs is selected and energized to the glow temperature. As a result, the mixture gas of the rich gas and the unburned air in the exhaust manifold 25a is ignited and burned to warm up the catalyst 27 with its combustion heat. The warm-up control by this exhaust combustion will be called the "afterburning control".

During this afterburning control, the rich gas to be discharged from the rich combustion cylinder spurts more vigorously than the unburned air to be discharged from the fuel cut cylinders, to cause a phenomenon that the rich gas flows back to the upstream in the exhaust manifold 25a of the fuel cut cylinder. As a result, the unburned air and the backward rich gas mix together so that they are mixed in the exhaust manifold 25a of the fuel cut cylinder.

Considering these circumstances, according to the present embodiment, the glow plugs 50a to 50c are arranged in the exhaust manifold 25a of the fuel cut cylinder and are ignited in the exhaust manifold 25a at position, where the unburned air and the rich gas are mixed, to enhance the ignitability.

If the catalyst temperature is raised to some extent by the afterburning control described above, the oxidations of HC and CO are gradually promoted in the catalyst 27 so that the heat of their reactions can warm up the catalyst 27 efficiently from the inside. In the present embodiment, therefore, the catalyst 27 is warmed up by the afterburning control after the engine start until the catalyst temperature reaches a predetermined temperature T2, and the injection dither control for correcting the increase/decrease in the fuel injection amount at each ignition is then executed till the catalyst temperature rises to the activation temperature T3, so that the catalyst 27 is efficiently warmed up from its inside by the calorie of the oxidations of HC and CO.

Figure 25:
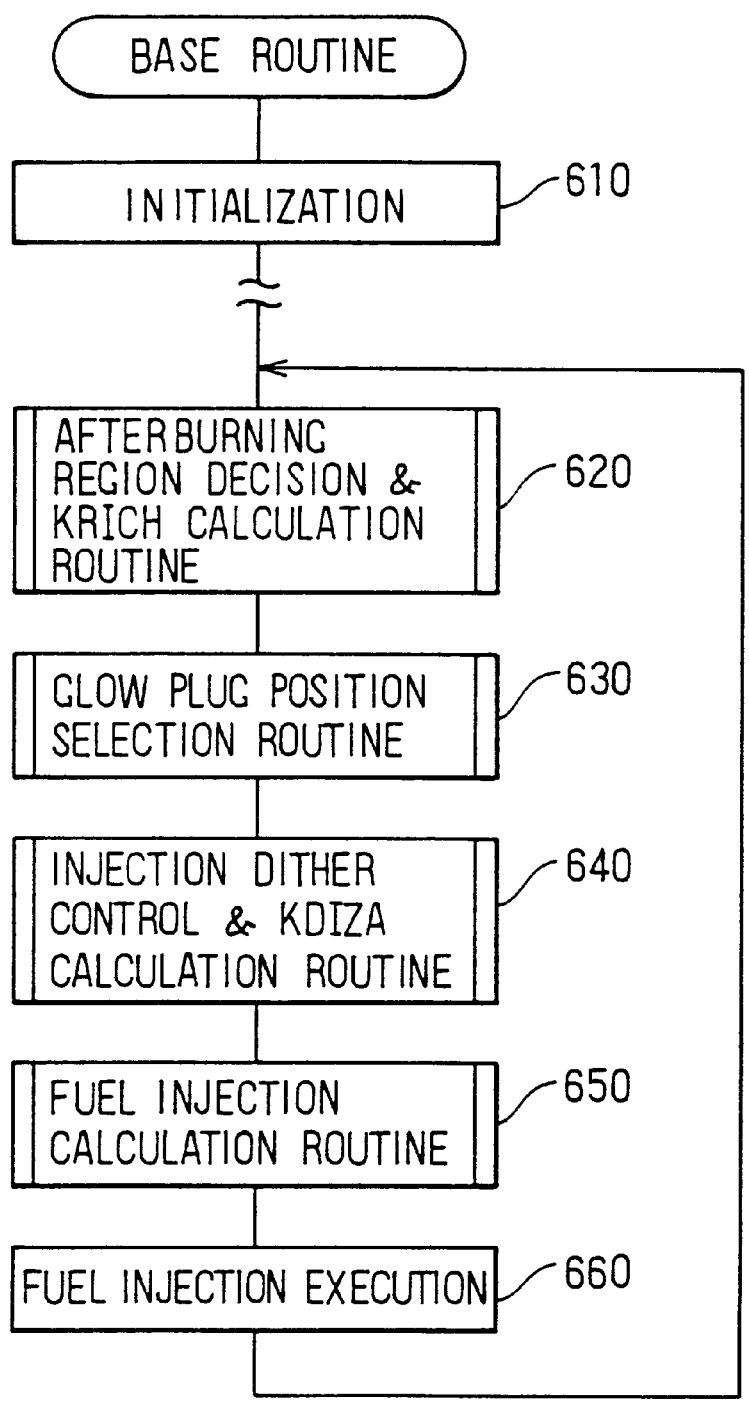
FIG. 25 is a flow chart showing a processing flow of a base routine.
Figure 26:
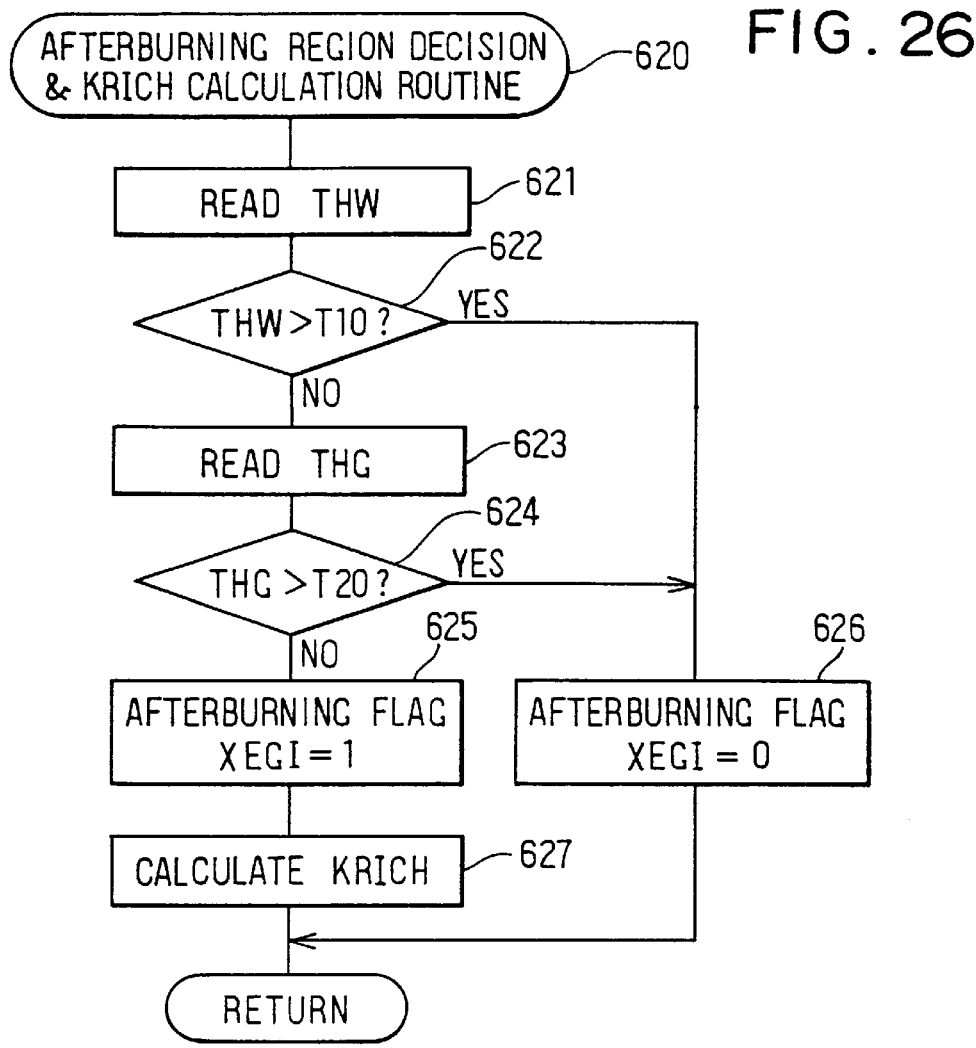
FIG. 26 is a flow chart showing a processing flow of an afterburning region deciding and KRICH calculating routine.

The catalyst warm-up control thus far described is executed by a base routine shown in FIG. 25. This base routine is started simultaneously as the ignition switch (IG) is turned ON and is then executed at every 4 msecs, for example, by an interrupt processing. When this base routine processing is started, at first step 610, an initialization is executed by initializing the RAM 34 or the like. At subsequent step 620, the later-described afterburning region decision/KRICH calculation routine of FIG. 26 is executed. If the temperature state of the catalyst 27 is in the afterburning region, the fuel increasing/decreasing ratio KRICH at the afterburning control is calculated.

Figure 28:
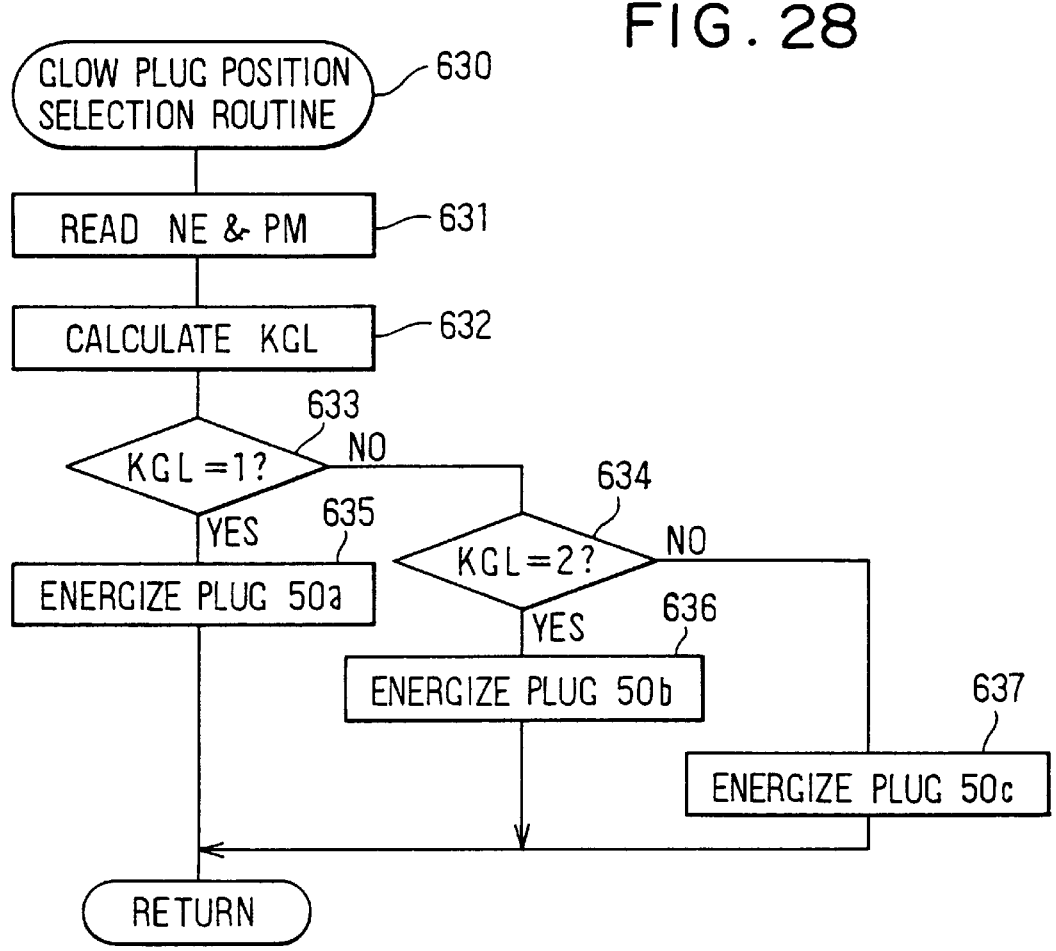
FIG. 28 is a flow chart showing a processing flow of a glow plug position selecting routine.
Figure 30:
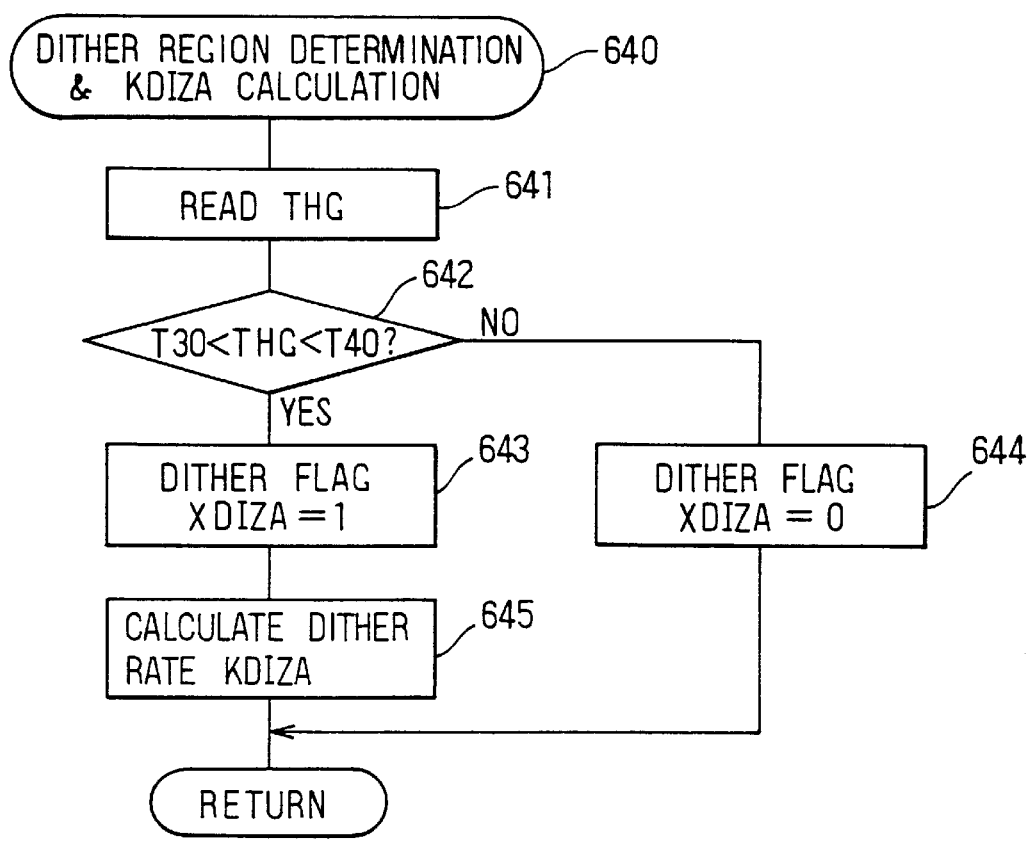
FIG. 30 is a flow chart showing a processing flow of an injection dither region determining and KDIZA calculating routine.
Figure 32:
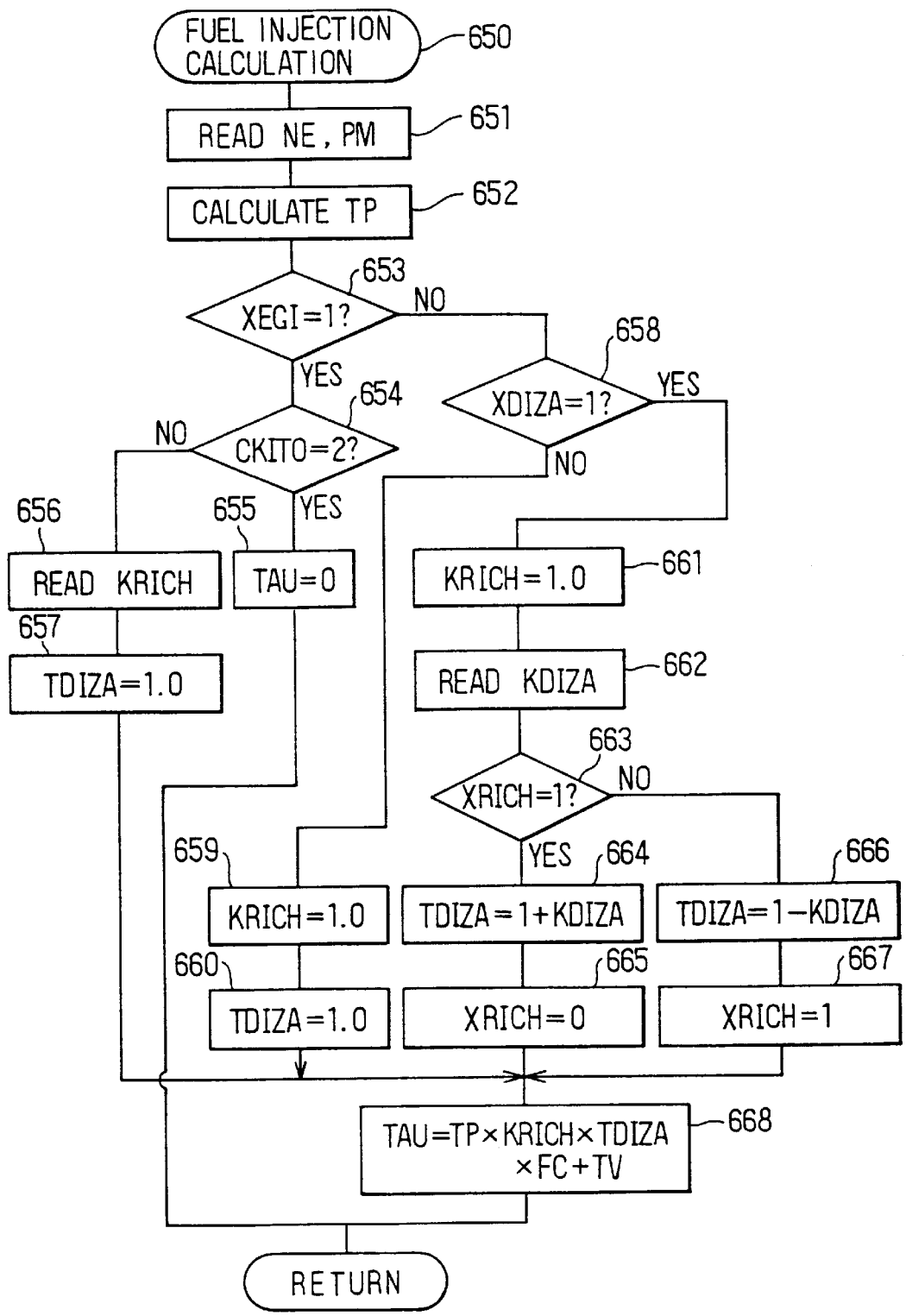
FIG. 32 is a flow chart showing a processing flow of a fuel injection rate calculating routine.

At next step 630, the later-described glow plug position selection routine of FIG. 28 is executed to select and energize such one of the three glow plugs 50a to 50c in accordance with the running state of the engine 11 as is located in the optimum position. At next step 640, the later-described injection dither control decision/KDIZA calculation routine of FIG. 30 is executed. If the temperature state of the catalyst 27 is in the injection dither control, an injection dither ratio KDIZA is calculated. After this, at step 650, the fuel injection calculation routine of FIG. 32 is executed to determine the fuel injection amount TAU finally. At last, at step 670, the injectors 20a to 20d are driven to realize the fuel injection amount TAU, as calculated at step 650, to execute the fuel injection.

Next, the processing flow of the afterburning region decision/KRICH calculation routine to be executed at step 620 will be described with reference to a flow chart of FIG. 26. In the present routine, at first Step 621, the engine cooling water temperature THW, as outputted from the water temperature sensor 38, is read in. At subsequent step 622, it is decided whether or not the engine cooling water temperature THW is higher than the predetermined temperature T10. Here, this predetermined temperature T10 is a temperature at which it can be decided that the engine is in the warm-up state. If this temperature T10 is exceeded, it is estimated that the catalyst temperature is over the afterburning region. If THW>T10, therefore, it is decided that the afterburning control is unnecessary. Then, the routine advances to step 626, at which an afterburning control flag XEGI is reset to "0" indicating the inhibition of the afterburning control, and the present routine is ended.

Figure 33:
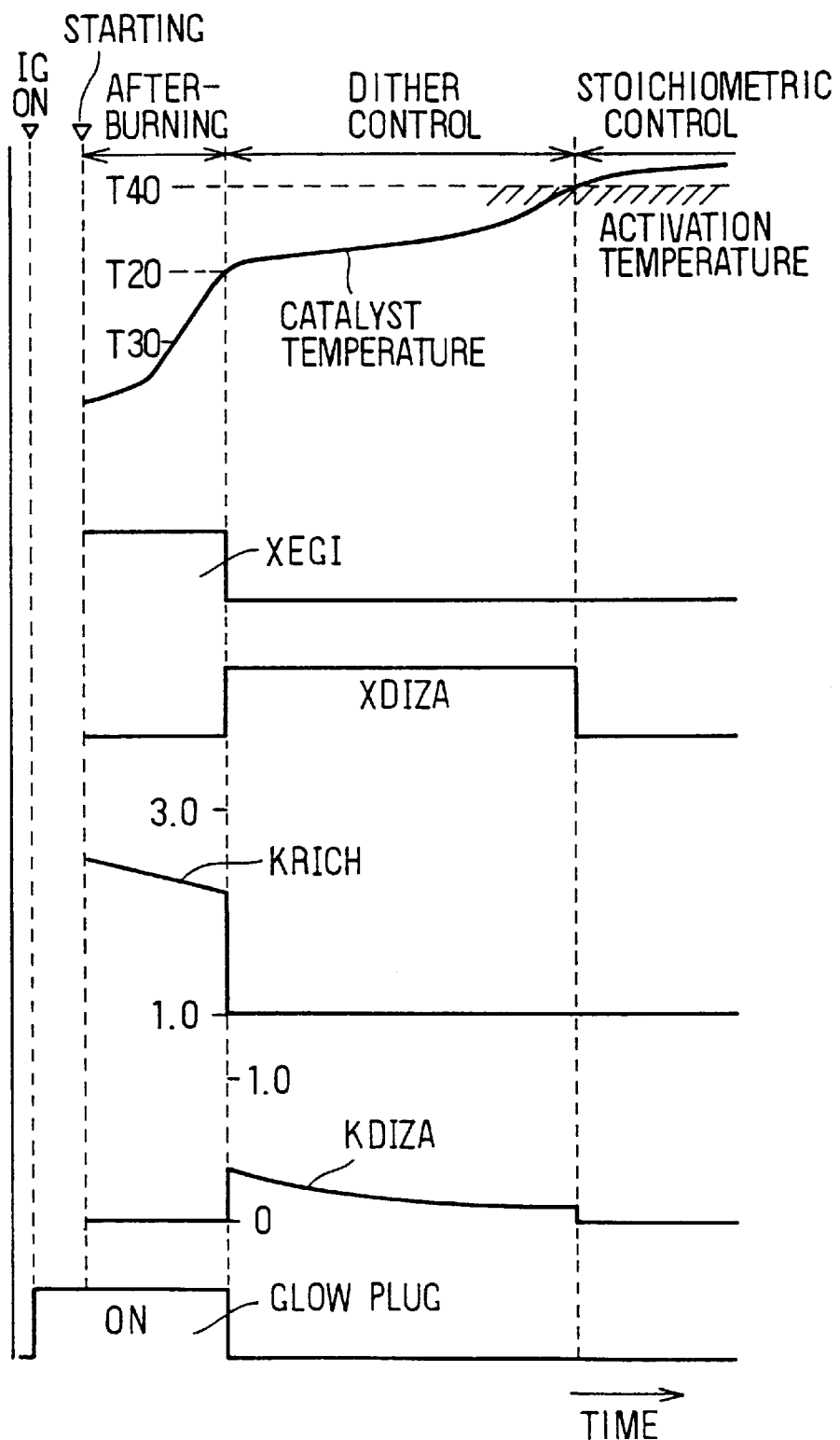
FIG. 33 is a time chart illustrating behaviors of a catalyst warm-up control.

If THW≦T10, on the other hand, the routine advances to step 623, at which the catalyst temperature THG outputted from the catalyst temperature sensor 40 is read in. At next step 624, it is decided whether or not the catalyst temperature THG is higher than a predetermined temperature T20. This predetermined temperature is a catalyst temperature at which the control is switched from the afterburning control to the injection dither control (as shown in FIG. 33). If THG>T20, therefore, the afterburning control is not required. Hence, the routine advances to step 626, at which the afterburning control flag XEGI is reset to "0" indicating the inhibition of the afterburning control, and the present routine is ended.

Figure 27:
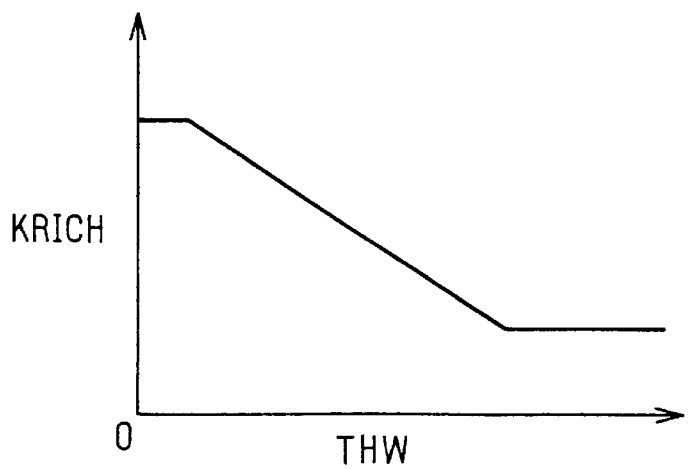
FIG. 27 is a characteristic graph illustrating a map for calculating the fuel increase ratio KRICH from a cooling water temperature THW.

If THG≦T20, on the other hand, the afterburning control is required, and the routine advances to step 625, at which the afterburning control flag XEGI is set to "1" indicating the execution of the afterburning control. After this, the routine advances to step 627, at which the fuel increasing ratio KRICH necessary for afterburning the exhaust gas is calculated from the map shown in FIG. 27 on the basis of the engine cooling water temperature THW, and the present routine is ended. Here, the catalyst 27 has to be the more heated as the engine cooling water temperature THW becomes the lower, so that the fuel increasing ratio KRICH is so set as to become the larger for the lower engine cooling water temperature THW.

Figure 29:
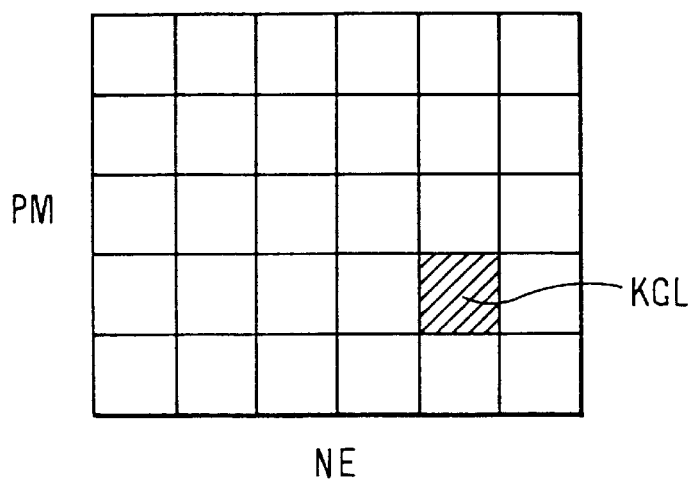
FIG. 29 is a characteristic diagram illustrating a map for determining a glow plug ON position from the engine rotation speed NE and the intake pressure PM.

Next, the processing flow of the glow plug position selection routine to be executed at step 630 of FIG. 25 will be described with reference to a flow chart of FIG. 28. In the present routine, at first step 631, the engine rotation speed NE and the intake pressure PM are read in. Since, in this case, the mixing ratio of the air and the fuel necessary for igniting the exhaust gas changes with the engine rotation speed NE and the intake pressure PM, a glow plug position KGL to be energized for the optimum mixing ratio of the air and the fuel according to the present NE and PM is selected (at step 632) from the map, as shown in FIG. 29.

After the optimum energization glow plug position KGL has thus been calculated, the glow plug to be energized is determined at steps 633 and 634 according to the value of the KGL. Specifically: if KGL=1, the routine advances to step 635, at which the first glow plug 50a is energized (while leaving the remaining glow plugs 50b and 50c deenergized); if KGL=2, the routine advances to step 636, at which the second glow plug 50b is energized (while leaving the remaining glow plugs 50a and 50c deenergized); and if KGL=0, the routine advances to step 637, at which the third glow plug 50c is energized (while leaving the remaining glow plugs 50a and 50b deenergized).

Next, the processing flow of the injection dither region determination/KDIZA calculation routine to be executed at step 640 of FIG. 25 will be described with reference to a flow chart of FIG. 30. In the present routine, at first step 641, the catalyst temperature THG outputted from the catalyst temperature sensor 40 is read in. At next step 642, it is decided whether or not the catalyst temperature THG is within a predetermined temperature range (T30<THG<T40). Here, if the catalyst temperature THG is below T3, the oxidations of CO and HC in the catalyst 27 are not promoted even with the injection dither control, but the catalyst temperature is not efficiently raised so that the injection dither control is not executed. If the catalyst temperature THG is over an activation temperature T40, the catalyst 27 is a completely warm-up state, and the injection dither control is not required. In these region requiring no injection dither control, the routine advances to step 644, at which an injection dither control flag XDIZA is reset to "0" indicating the inhibition of the injection dither control.

Figure 31:
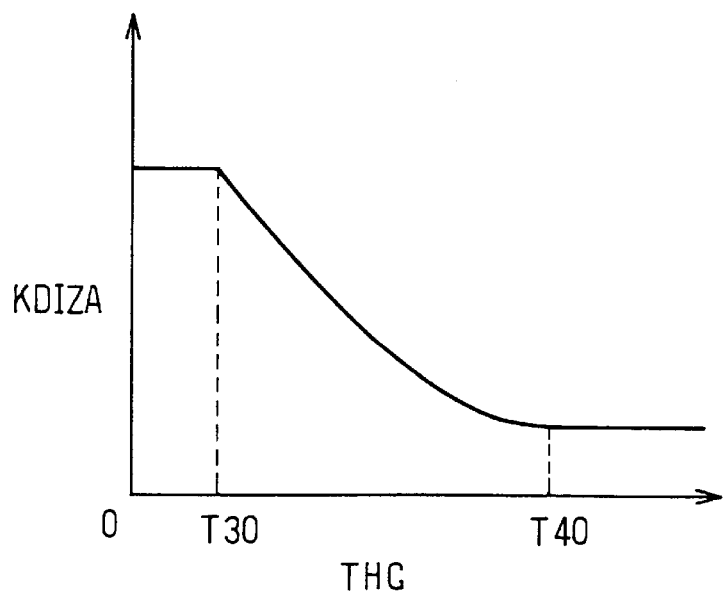
FIG. 31 is a characteristic diagram illustrating a map for calculating the injection dither ratio KDIZA from a catalyst temperature THG.

In the case of a region (T30<THG<T40) requiring the injection dither control, on the other hand, the routine advances to step 643, at which the injection dither control flag XDIZA is set to "1" indicating the execution of the injection dither control. After this, at step 645, the ratio KDIZA for increasing/decreasing the fuel injection amount at the time of the injection dither control is calculated from a map shown in FIG. 31. Here, for the lower catalyst temperature THG, the more temperature rise is required so that the injection dither control KDIZA is set to become the more. However, the injection dither ratio KDIZA takes the upper limit for THG=T30, a constant at the upper limit for less than T30, the lower limit for THG=T40, and a constant at the lower limit for more than T40.

Next, the processing flow of the fuel injection calculation routine to be executed at step 650 of FIG. 25 will be described with reference to a flow chart of FIG. 32. In the present routine, at first step 651, the engine rotation speed NE and the engine intake pressure PM are read in. At subsequent step 652, the basis injection amount TP is calculated on the basis of the NE and the PM. At next step 653, it is decided whether or not the afterburning control flag XEGI is at "1" indicating the execution of the afterburning control. If XEG=1 (indicating the execution of the afterburning control), the routine advances to step 654, at which it is decided whether or not the value of the cylinder discriminating counter CKITO is at a specified value (or "2" indicating the #4 cylinder in the present embodiment).

If CKITO=2 (for the #4 cylinder), the routine advances to step 655, at which the fuel injection amount TAU is set to 0 to cut the fuel to the #4 cylinder. If CKITO≠2 (for the #1 to #3 cylinders), on the other hand, the routine advances to step 656, at which the fuel increasing ratio KRICH determined at step 620 is read in. At next step 657, an injection coefficient TDIZA for the injection dither control is set to 1.0, and the injection dither is stopped in the after burning region.

If the afterburning control flag XEGI=0 (indicating the inhibition of the afterburning control) at step 653, on the other hand, the routine advances to step 658, at which it is decided whether or not the injection dither control flag XDIZA is at "1" indicating the execution of the injection dither control. If XDIZA=0 (indicating the inhibition of the injection dither control), the routine advances to step 659, at which the fuel increasing ratio KRICH is set to 1.0 to stop the fuel increase at the afterburning time. At subsequent step 660, the injection dither is stopped by setting the injection coefficient TDIZA to 1.0.

If the injection dither control flag XDIZA=1 (indicating the execution of the injection dither control) at step 658, the routine advances to step 661, at which the fuel increasing ratio KRICH is set to 1.0 to stop the fuel increase at the afterburning time. At subsequent step 662, the injection coefficient TDIZA is read in. In order to effect the fuel injection alternately at the rich and lean sides, at next step 663, it is decided whether or not a rich decision flag XRICH is at "1" indicating the preceding lean side. If XRICH=1 (indicating the preceding lean side), the routine advances to step 664, at which the injection coefficient TDIZA is calculated by adding the fuel increase ratio KRICH to 1.0 so that the present fuel injection may be enriched. After this, at step 665, the rich determination flag XRICH is inverted to "0" indicating the preceding rich side.

If XRICH=0 (indicating the preceding rich side) at step 663, on the other hand, the routine advances to step 666, at which the injection coefficient TDIZA is calculated by subtracting the fuel increasing ratio KRICH from 1.0 so that the present fuel injection may be lean. After this, at step 667, the rich determination flag XRICH is inverted to "1" indicating the preceding leans side.

At final step 668, the fuel injection amount TAU is calculated from the following formula by using the basic injection amount TP, the fuel increasing ratio KRICH and the injection coefficient TDIZA, as calculated at the foregoing individual steps:

$$TAU = TP \times KRICH \times TDIZA \times FC + TV,$$

wherein FC: various correction coefficients,
and TV: an ineffective injection time period.

One example of the case of the catalyst warm-up control thus far described will be described with reference to a time chart of FIG. 33. In the present embodiment, the catalyst 27 is warmed up after the engine start by the afterburning control. After the catalyst temperature reaches the predetermined temperature T2, the control is switched to the injection dither control to activate the catalyst 27 and after this activation to the stoichiometric control. Here will be detailed the individual controls.

First of all, prior to the start of the afterburning control, the energizations of the glow plugs 50a to 50c are started simultaneously with the ON of the ignition switch (IG) to preheat the glow plugs 50a to 50c. After this, when the starter switch (although not shown) is turned ON to start the engine 11, the afterburning control is started. In this afterburning control, the fuel injection to a specified cylinder (e.g., the #4 cylinder in the present embodiment) leading to the exhaust manifold 25a equipped with the glow plugs 50a to 50c is cut after the engine start and before the catalyst temperature reaches the predetermined temperature T20 (that is, while the afterburning control flag XEGI=1), so that the intake air is discharged as it is in the unburned state to the exhaust manifold 25a. In the remaining cylinders (i.e., the #1 to #3 cylinders in the present embodiment), the fuel injection is increased within the range of no misfire to effect the rich combustion (whose richness depends upon the KRICH) so that the exhaust gas (or rich gas) having high HC and CO concentrations may be discharged and mixed with the aforementioned unburned air for the afterburning. By this afterburning, the catalyst 27 at the downstream side is efficiently warmed up to raise the catalyst temperature rapidly.

As a result, when the catalyst temperature reaches the predetermined temperature T2, the afterburning control flag XEGI is reset to "0", and the injection dither control flag XDIZA is set to "1". After this, the energizations of the glow plugs 50a to 50c are ended, and the control is switched to the injection dither control to warm up the catalyst 27 further to the activation temperature T40. In this injection dither control, the rich combustion and the lean combustion (whose richness and leanness accord to the KDIZA) are alternately repeated by increasing/decreasing the fuel injection amount for each combustion to shift the air/fuel ratio to the rich side and to the lean side with respect stoichiometric (or theoretical) air/fuel ratio, so that the carbon monoxide (CO) is produced by the rich combustion whereas the oxygen ($O_2$) is produced by the lean combustion. Moreover, the carbon monoxide and oxygen thus produced are subjected to the oxidations, as defined by the following formula, to generate the calorie (Q) by the catalyzing action of the catalyst 27:

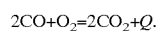

$$2CO + O_2 = 2CO_2 + Q.$$

The calorie (Q) thus generated by the oxidation raises the temperature of the exhaust gas passing the catalyst 27 thereby to promote the warm-up of the catalyst 27.

After this, when the catalyst temperature reaches the activation temperature T40, the injection dither control is ended to shift the control to the stoichiometric control. In this stoichiometric control, the richness and leanness of the combustion gas are decided from the outputs (or oxygen concentrations) of the oxygen sensors 28 and 29, as disposed upstream and downstream of the catalyst 27, so that the fuel injection amount is increased/decreased on the basis of the decision results to control the air/fuel ratio of the exhaust gas to the vicinity of the stoichiometric air/fuel ratio.

Figure 34:
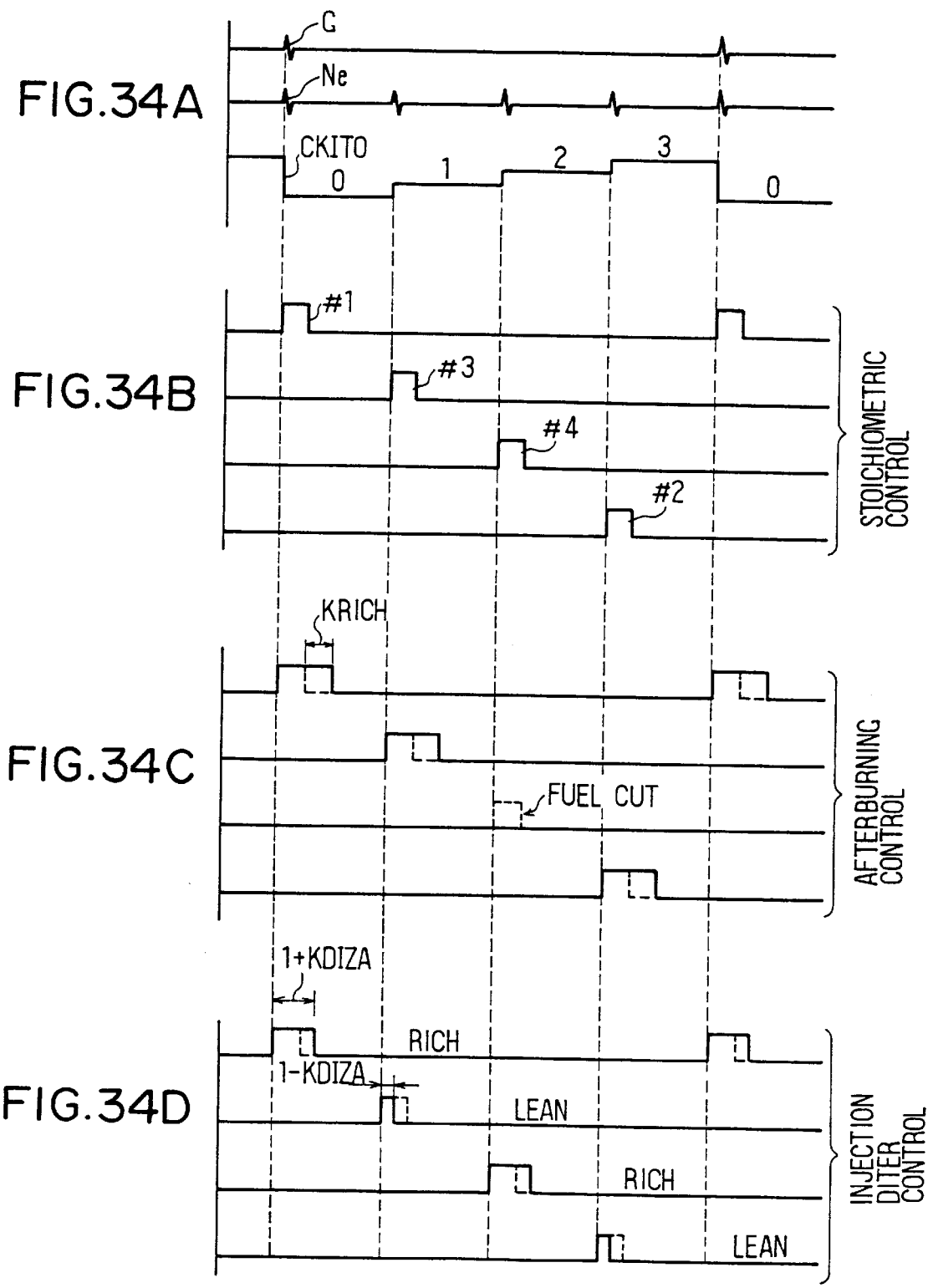
FIGS. 34A to 34D are time charts illustrating the changes in injection pulses of individual control regions.

Next, the change in the injection pulse (or fuel injection amount) at each control execution will be described with reference to FIGS. 34A to 34D. Usually, the injection pulse is outputted prior to the crank angle signal NE. In order to facilitate the illustration, each injection pulse is illustrated, as delayed from the top dead center. As shown in FIG. 34A, each time the crank angle signal Ne is outputted, a cylinder discriminating counter CKITO is counted up one by one and is reset each time a cylinder discrimination signal G is outputted. In the stoichiometric control, as shown in FIG. 34B, the cylinder, to which the fuel is injected, is discriminated from the counted value of the cylinder discriminating counter CKITO, and an injection pulse having a pulse width according to the fuel injection amount TAU calculated in the fuel injection calculation routine of FIG. 32 is outputted to execute the fuel injection for each cylinder.

At the time of executing the afterburning control, as shown in FIG. 34C, the fuel injection is cut for CKITO=2 (for the #4 cylinder), and the fuel injection is increased by increasing the injection pulse width by the KRICH for the remaining cylinders (i.e., the #1 to #3 cylinders), so that the rich combustion is executed to effect the afterburning in the exhaust system. By thus setting the fuel cut cylinder (e.g., the #4 cylinder) to which the fuel injection is cut, the intake air of the fuel cut cylinder is supplied as it is in the unburned state to the exhaust system so that it can be used as the secondary air. As a result, the secondary air introduction pipe, the electric air pump and the solenoid valve, which are necessary in the afterburning control of the prior art, can be dispensed with to simply the construction and reduce the number of part thereby to satisfy the demand for the cost reduction.

At the time of executing the injection dither control shown in FIG. 34D, on the other hand, there are alternately repeated the rich combustion of (1+KDIZA) and the lean combustion of (1−KDIZA).

In the sixth embodiment thus far described, it is noted that the mixing state between the rich gas discharged from the rich combustion cylinder and the unburned air discharged from the fuel cut cylinder changes with the engine running state so that the optimum ignition temperature of the exhaust gas changes with the engine running state. The three glow plugs 50a to 50c are arranged in the exhaust manifold 25a of the fuel cut cylinder so that the glow plug, as located at the optimum ignition temperature, is selected according to the engine running state (in terms of the NE and PM). As a result, the exhaust gas can be so reliably ignited as to receive no influence from the engine running state.

Incidentally, the number of the glow plugs 50a to 50c should not be limited to three but may be four or more or two or less. Even if the number of the glow plugs should be only one, the desired object of the present invention could be achieved. On the other hand, the glow plugs 50a to 50c are advantageous in that they can generate at all times in the afterburning control to afterburn the exhaust gas continuously. In place of the glow plugs, however, a spark ignition device such as an ignition plug may be used as the exhaust burning means.

On the other hand, the catalyst temperature is detected directly by the catalyst temperature sensor 40. However, the catalyst temperature may be detected indirectly on the basis of the temperature data reflecting the catalyst temperature, such as the output signals of the various temperature sensors (e.g., the water temperature sensor 38, the exhaust temperature sensor, the element temperature sensor or the heater temperature sensor) for detecting the engine water temperature, the exhaust temperature, or the element temperature or heater temperature of the air/fuel ratio sensor 28 or the oxygen sensor 29.

[SEVENTH EMBODIMENT]

Since the catalyst temperature rises with the lapse of the time after the engine start, the catalyst temperature can also be estimated from the lapse time after the engine start.

Figure 35:
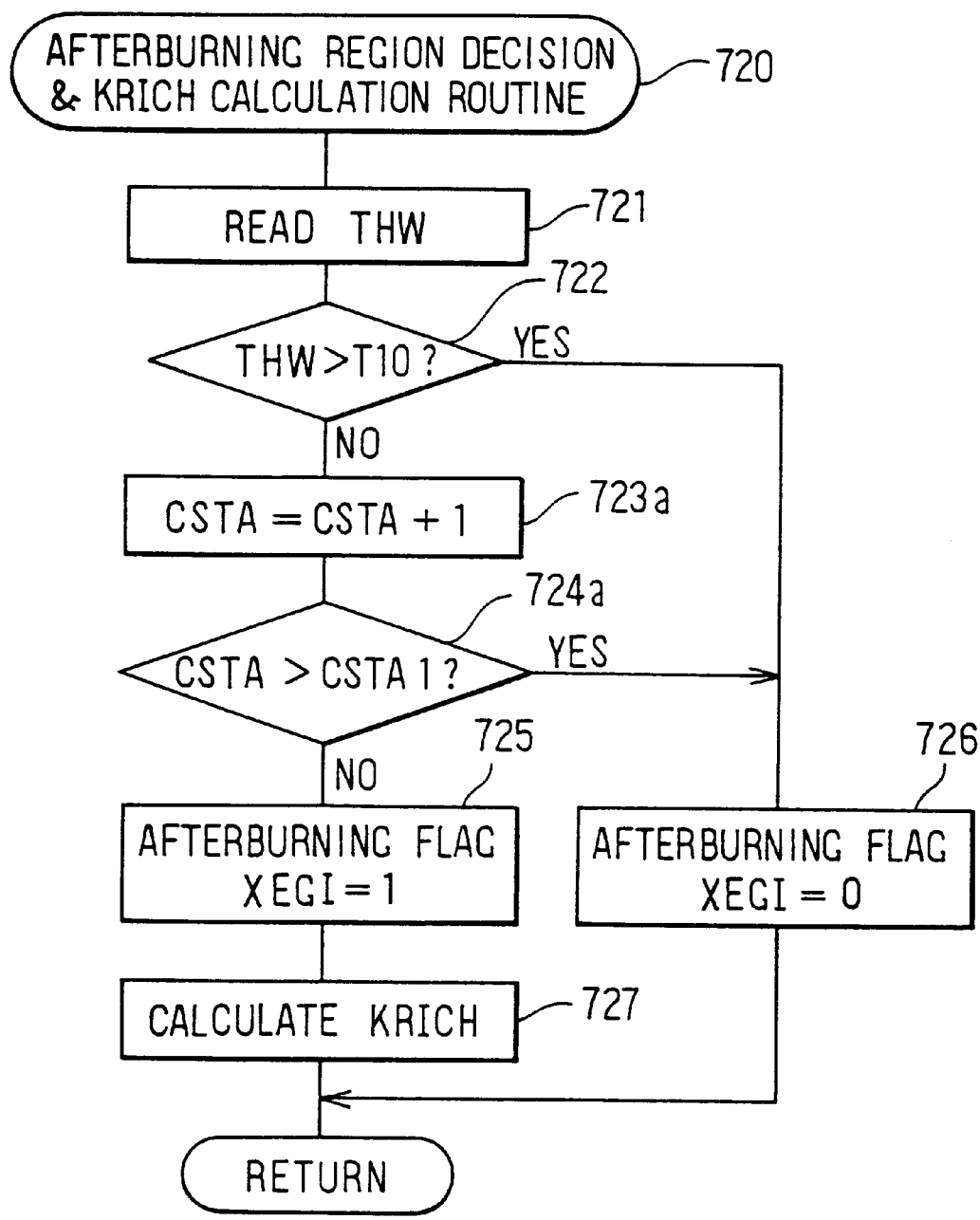
FIG. 35 is a flow chart showing a processing flow of a afterburning region deciding and KRICH calculating routine according to a seventh embodiment of the present invention.
Figure 36:
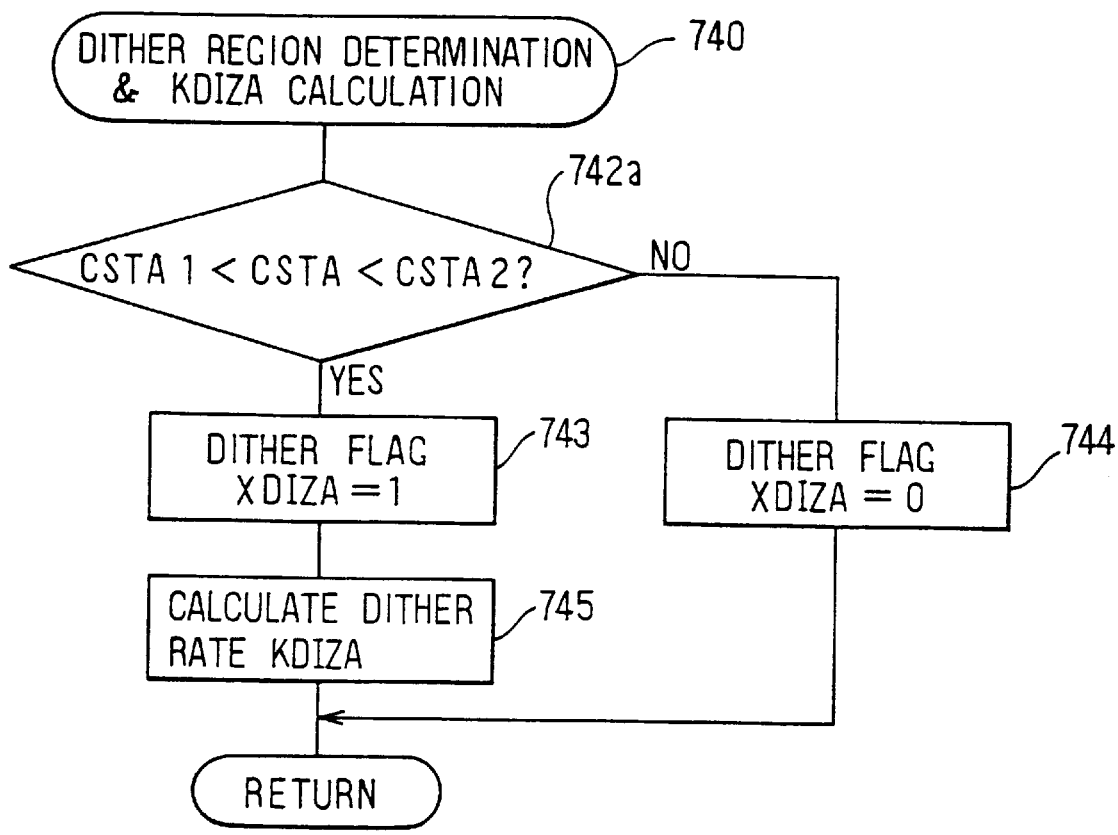
FIG. 36 is a flow chart showing a processing flow of an injection dither region deciding and KDIZA calculating routine of the seventh embodiment.

In the seventh embodiment of the present invention as shown in FIGS. 35 and 36, therefore, the catalyst temperature sensor 40 is omitted to set the timing for switching the control from the afterburning control to the injection dither control in terms of the lapse time after the engine start.

Specifically, the afterburning region decision/KRICH calculation routine shown in FIG. 35 is identical in its steps to that of FIG. 26 except that the operations of steps 623 and 624 of FIG. 26 are changed to the operations of steps 723a and 724a. However, steps 620 to 627 are shown as steps 720 to 727, respectively. In the present routine, if the engine cooling water temperature THW is below the predetermined temperature T1, in order to decide whether or not the catalyst temperature is in the afterburning region, the routine advances to step 723a at which the post-start elapsed time counter CSTA is counted up, and at the next step 724a, it is decided whether or not the value of the post-start elapsed time counter CSTA exceeds a predetermined time period CSTA1. Here, this predetermined time period CSTA1 is a time period which is predicted to be necessary for the warm-up to the catalyst temperature at the switching from the afterburning control to injection dither control. Hence, before the predetermined time period CSTA1 is elapsed, it is decided that the afterburning control is necessary, and the routine advances to step 725, at which the afterburning control flag XEGI is set to "1" indicating the execution of the afterburning control. If the predetermined time period CSTA1 is elapsed, it is decided that the afterburning control is unnecessary, and the routine advances to step 726, at which the afterburning control flag XEGI is reset to "0" indicating the inhibition of the afterburning control.

On the other hand, the injection dither region decision/KDIZA calculation routine shown in FIG. 36 is identical in its steps to that of FIG. 30 except that the operations of steps 641 and 642 of FIG. 30 are changed to the operation of Step 742a. However, steps 640 to 645 are shown as steps 740 to 745, respectively. In the present routine, at first step 742a, it is decided whether or not the value of the post-start elapsed time counter CSTA is CSTA1<CSTA<CSTA2. Here, the CSTA1 is a time period which is predicted to be necessary for the warm-up the catalyst to the temperature to start the injection dither control, as described hereinbefore, and the CSTA2 is a time period which is predicted to be necessary for raising the catalyst temperature to the activation temperature. If the decision of step 742a is "Yes", it is necessary to execute the injection dither control. Hence, the routine advances to step 743, at which the injection dither control flag XDIZA is set to "1" indicating the execution of the injection dither control. If the decision of step 742a is "No", on the other hand, the injection dither control is unnecessary, and the routine advances to step 744, at which the injection dither control flag XDIZA is reset to "0" indicating the inhibition of the injection dither control.

[EIGHTH EMBODIMENT]

Figure 37:
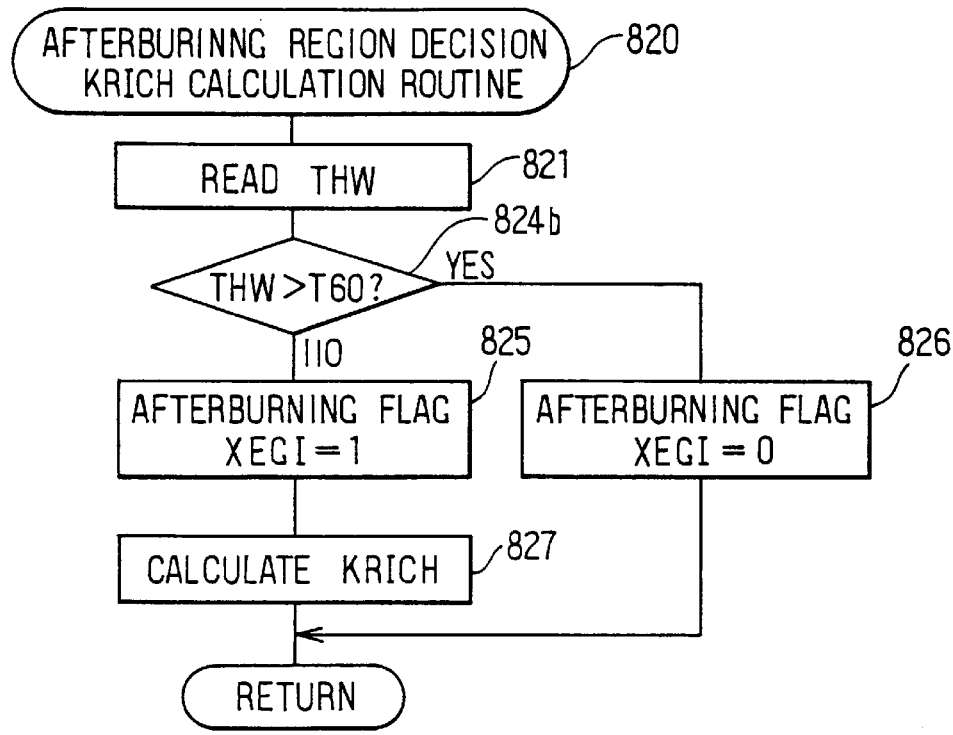
FIG. 37 is a flow chart showing a processing flow of an afterburning region deciding and KRICH calculating routine according to an eighth embodiment of the present invention.
Figure 38:
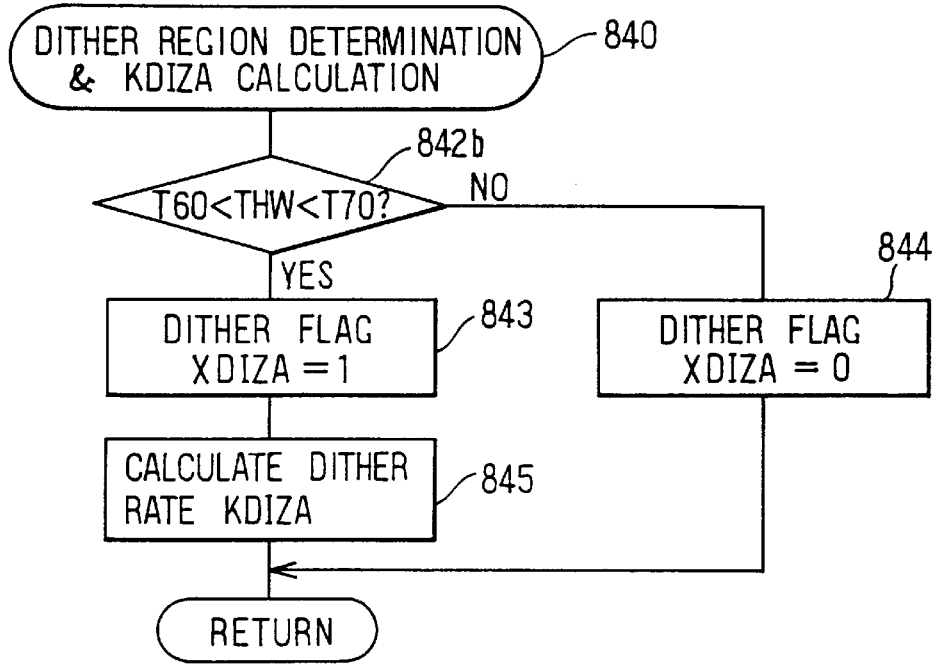
FIG. 38 is a flow chart showing a processing flow of an injection dither region deciding and KDIZA calculating routine of the eighth embodiment.

In an eighth embodiment of the present invention shown in FIGS. 37 and 38, on the other hand, the catalyst temperature is estimated from the engine cooling water temperature THW to switch the individual control regions.

Specifically, the afterburning region decision/KRICH calculation routine shown in FIG. 37 is similar to that of FIG. 26 except that the operations of steps 622, 623 and 624 of FIG. 26 are changed to the operation of step 824b. In the present routine, at step 821, the engine cooling water temperature THW is read in, and the routine advances to step 824b, at which it is decided whether or not the engine cooling water temperature THW is over a predetermined temperature T60. Here, this predetermined temperature T60 is an engine cooling water temperature at the time of switching from the afterburning control to the injection dither control, and it is estimated that the catalyst temperature=T20 (as shown in FIG. 33) when the engine cooling water temperature THW=T60. If the engine cooling water temperature THW is below the predetermined temperature T60, it is decided that the afterburning control is necessary, and the routine advances to step 825, at which the afterburning control flag XEGI is set to "1" indicating the execution of the afterburning control. If the engine cooling water temperature THW is over the predetermined temperature T60, on the other hand, it is decided that the afterburning control is unnecessary, and the routine advances to step 826, at which the afterburning control flag XEGI is reset to "0" indicating the inhibition of the afterburning control.

On the other hand, the injection dither region decision/ KDIZA calculation routine shown in FIG. 38 is similar to that of FIG. 30 except that the operations of steps 641 and 642 of FIG. 30 are changed to the operation of step 842b. In the present routine, at first step 842b, it is decided whether or not the engine cooling water temperature THW is within a predetermined temperature range (T60<THW<T70). Here, the T60 is the engine cooling water temperature at the start of the injection dither control, as described above, and a T70 is an engine cooling water temperature at which the catalyst temperature is estimated to rise to the activation temperature T40 (as shown in FIG. 33). If the decision of step 842b is "Yes", the injection dither control is necessary, and the routine advances to step 843, at which the injection dither control flag XDIZA is set to "1" indicating the execution of the injection dither control. If the decision of step 842b is "No", on the other hand, the injection dither control is unnecessary, and the routine advances to step 844, at which the injection dither control flag XDIZA is reset to "0" indicating the inhibition of the injection dither control.

In the individual sixth to eighth embodiments thus far described, the warm-up is switched to that by the injection dither control when the temperature of the catalyst 27 is raised to some level after the engine start by the afterburning control, so that the catalyst 27 may be efficiently warmed up from its inside by the calorie which is generated by the oxidations of HC and CO. Despite this fact, however, the catalyst 27 may be completely warmed up to the activation temperature T40 not by the injection dither control but only by the afterburning control.

[NINTH EMBODIMENT]

In the afterburning control, the rich gas, as discharged from the rich combustion cylinder, will spurt backward to the upstream of the intake manifold 25a of the fuel cut cylinder. This invites a tendency that the mixing position between the rich gas and the unburned air discharged from the fuel cut cylinder goes upstream far from the confluence of the exhaust gases flowing in the intake manifolds 25a to 25d for the individual cylinders. This relation invites another tendency that the position for the combustible mixing ratio between the rich gas and the unburned air goes upstream far from the confluence.

Figure 39:
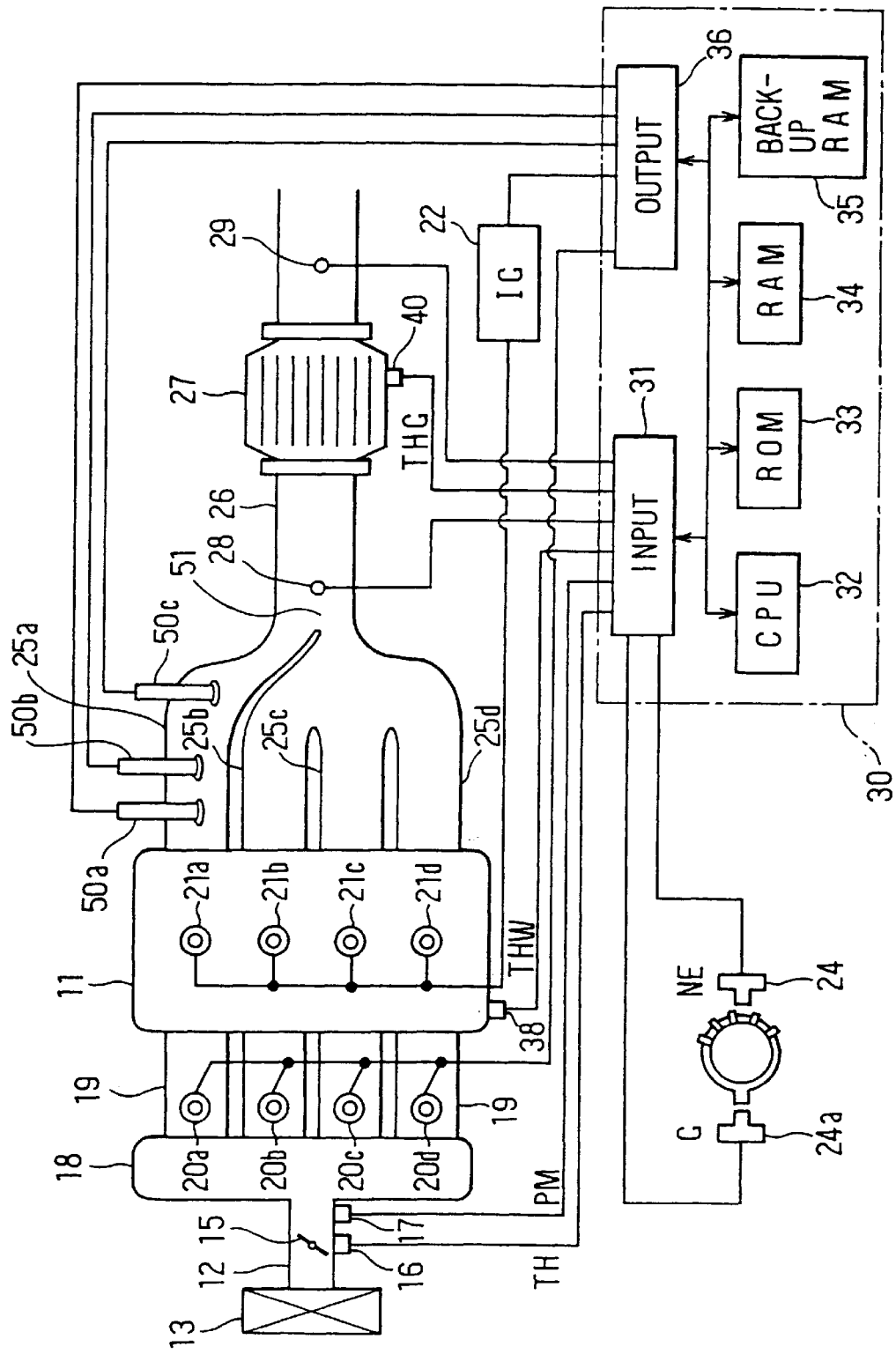
FIG. 39 is a schematic diagram showing a construction of an engine control system according to a ninth embodiment of the present invention.

According to the ninth embodiment of the present invention shown in FIG. 39, therefore, the exhaust manifold 25a of the fuel cut cylinder is made longer than the remaining exhaust manifolds 25b to 25d to bring the glow plugs 50a to 50c upstream from a confluence 51 so that the glow plugs 50a to 50c may be positioned to effect such a mixing ratio between the rich gas and the unburned gas as to improve the combustion. As a result, the combustibility of the exhaust gas can be further improved.

In the individual embodiments thus far described, the present invention is applied to the 4-cylinder engine but can be applied to a multi-cylinder engine such as a five or more cylinder engine or a three cylinder engine. In the five or more engine, the fuel cut cylinders may be two or more. In short, the fuel cut cylinders may be set within such a range as to keep the engine revolution away from any instability.

[TENTH EMBODIMENT]

Figure 40:
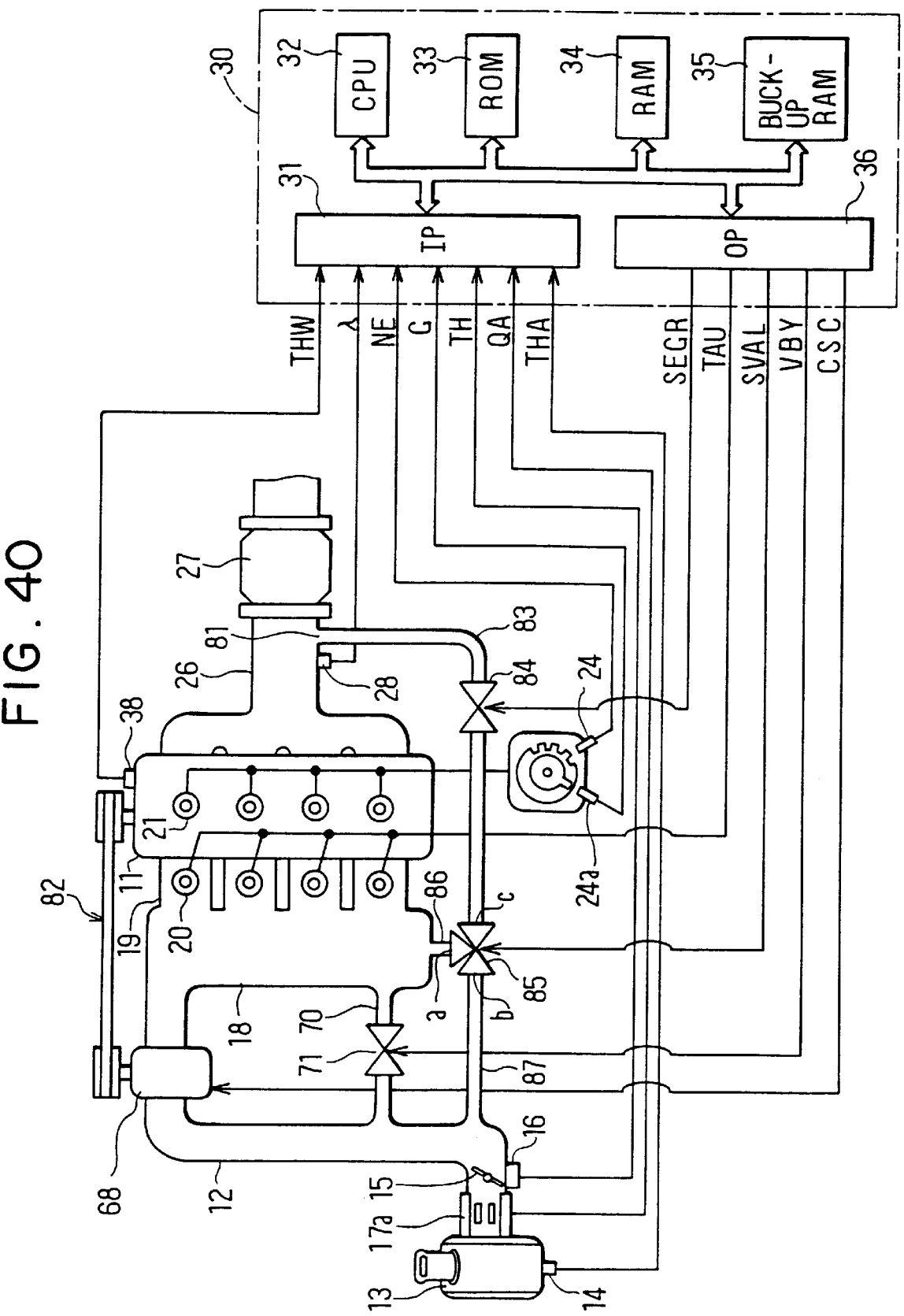
FIG. 40 is a schematic diagram showing a construction of an engine control system according to a tenth embodiment of the present invention.

A tenth embodiment of the present invention will be described with reference to FIG. 40.

Downstream of the intake pipe 12, there is disposed a mechanical type supercharger (S/C) 68 so that the compressed air to be discharged from the supercharger 68 at a supercharge time is supplied to the individual cylinders of the engine 11 through the surge tank 18 and the intake manifold 19. Usually, this supercharger 68 is driven by the engine power to be transmitted from the engine 11 through a belt transmission mechanism 82 such that it is driven/stopped according to the engine load by the solenoid clutch (as will be called "S/C clutch") in the supercharger 68. The supercharge region, in which the supercharger 68 is driven, has a predetermined or more engine load (in terms of the engine rotation speed NE or an intake air amount QA). At an idling time or at a light load time other than the non-supercharge region, the aforementioned S/C clutch is released to stop the drive of the supercharger 68. In order to retain the intake air in the non-supercharge region, moreover, there is disposed in parallel with the supercharger 68 a bypass intake passage 70 which is equipped midway thereof with a bypass ON/OFF valve 71 (or a solenoid valve) to be opened while the supercharger 68 is stopped.

Midway of the exhaust pipe 26 of the engine 11, on the other hand, there is disposed the catalyst 27 of ternary or three-way type or the like for reducing the noxious components (e.g., CO, HC or $NO_x$) in the exhaust gas. Upstream of this catalyst 27, there is disposed the air/fuel ratio sensor 28 for outputting the air/fuel ratio signal which linearly accords to the air/fuel ratio λ of the exhaust gas. Upstream of the catalyst 27, on the other hand, there is formed an exhaust gas recirculation port 81 which is connected to the engine intake system through an exhaust gas recirculation passage ("EGR passage") 83. Midway of this EGR passage 83, there is disposed an exhaust gas recirculation control valve (as will be called the "EGR valve") 84 made of a solenoid valve.

Moreover, the EGR passage 83 is equipped at the intake system side with a solenoid type three-way valve 85 acting as passage switching means. One port a of this three-way valve 85 is connected through a passage 86 to the surge tank 18, and another port b is connected through a passage 87 to the intake pipe 12 upstream of the supercharger 68. By switching the three-way valve 85, therefore, the leading end of the EGR passage 83 at the intake system side can be switched between the surge tank 18 (or the downstream of the supercharger 68) and the upstream of the supercharger 68.

The electronic control circuit 30 establishes three control regions of the supercharge region, the non-supercharge region and the catalyst warm-up control region, as will be described hereinafter, in accordance with the engine load and the warm-up of the catalyst 27 thereby to control the supercharger 68, the bypass ON/OFF valve 71, the three-way valve 85 and the EGR valve 84 in the following manners for the individual control regions.

(1) Supercharge Region (excepting Catalyst Warm-up Control Region)

The supercharge region is a running region in which the engine load (in terms of the engine rotation speed NE and the intake air amount QA to be detected by an air flow meter 17a) is over a predetermined level, and the supercharge region and the non-supercharge region are discriminated by a two-dimensional map using the engine rotation speed NE and the intake air amount QA as its parameters. In the supercharge region, the bypass ON/OFF valve 71 is closed whereas the supercharger 68 is driven to compress and supply the intake air to the individual cylinders, and the three-way valve 85 is switched to the upstream (as located at the side of the passage 87) of the supercharger 68 so that the intake vacuum of the supercharger 68 may act upon an EGR passage 87 to control the degree of opening of the EGR valve 84 thereby to effect the exhaust gas recirculation control. In this case, the exhaust gas, as discharged from the engine 11 into the exhaust pipe 26, is partially recirculated by way of a passage of the exhaust gas recirculation port 81→the EGR passage 83→the three-way valve 85→the passage 87→the intake pipe 12→the supercharger 68.

(2) Non-Supercharge Region

At an idling time or a light load time in the non-supercharge region, the engine torque is so low that the supercharger 68 is stopped whereas the bypass ON/OFF valve 71 is opened to introduce the suction air in the intake pipe 12 into the surge tank 18 via the bypass intake passage 70. At the same time, the three-way valve 85 is switched to the surge tank 18 (or to the downstream of the supercharger 68) so that the degree of opening of the EGR valve 84 is controlled while applying the intake vacuum of the surge tank 18 to the EGR passage 83, to effect the exhaust gas recirculation control. In this case, the exhaust gas is partially recirculated by way of a passage of the exhaust gas recirculation port 81→the EGR passage 83→the three-way valve 85→the passage 86→the surge tank 18.

(3) Catalyst warm-up Control Region

This catalyst warm-up control region is set in the supercharge region in the following manners. Until the lapse time after completion of the engine start reaches a predetermined time period, it is decided that the catalyst 27 is in the unwarm-up state. Even if this unwarm-up state is decided, however, the engine torque is low if in the non-supercharge region, and the catalyst warm-up control is awaited until the supercharge region comes. As a result, the time period in the supercharge region, for which the catalyst 27 is decided to be in the unwarm-up state, is the catalyst warm-up control region.

In this catalyst warm-up control region, the three-way valve 85 is switched to the surge tank 18 (or to the downstream of the supercharger 68) to open the EGR valve 84 while applying the supercharge pressure (or the discharge pressure of the supercharger 68) to the EGR passage 83. As a result, the pressure (or the supercharge pressure) of the EGR passage 83 at the intake system side exceeds the pressure (or the exhaust pressure) at the side of the exhaust pipe 26 so that the compressed air (or the supercharged air) to be introduced from the supercharger 68 to the surge tank 18 partially flows backward in the passage of the passage 86→the three-way valve 85→the EGR passage 83→the exhaust gas recirculation port 81 until it is supplied as the secondary air to the exhaust pipe 26 at the upstream side of the catalyst 27. Simultaneously with this, the fuel injection amount of each fuel injection valve 20 is increased and corrected to enrich the air/fuel ratio of the mixture gas to be supplied to each cylinder of the engine 11 so that the CO and HC in the exhaust gas is increased to react with the oxygen in the secondary air by the catalyst 27 thereby to warm up the catalyst 27 efficiently by the heat of reaction. In the following description, the supercharge region and the non-supercharge region excepting the catalyst warm-up control region will be called the "ordinary control region."

Figure 41:
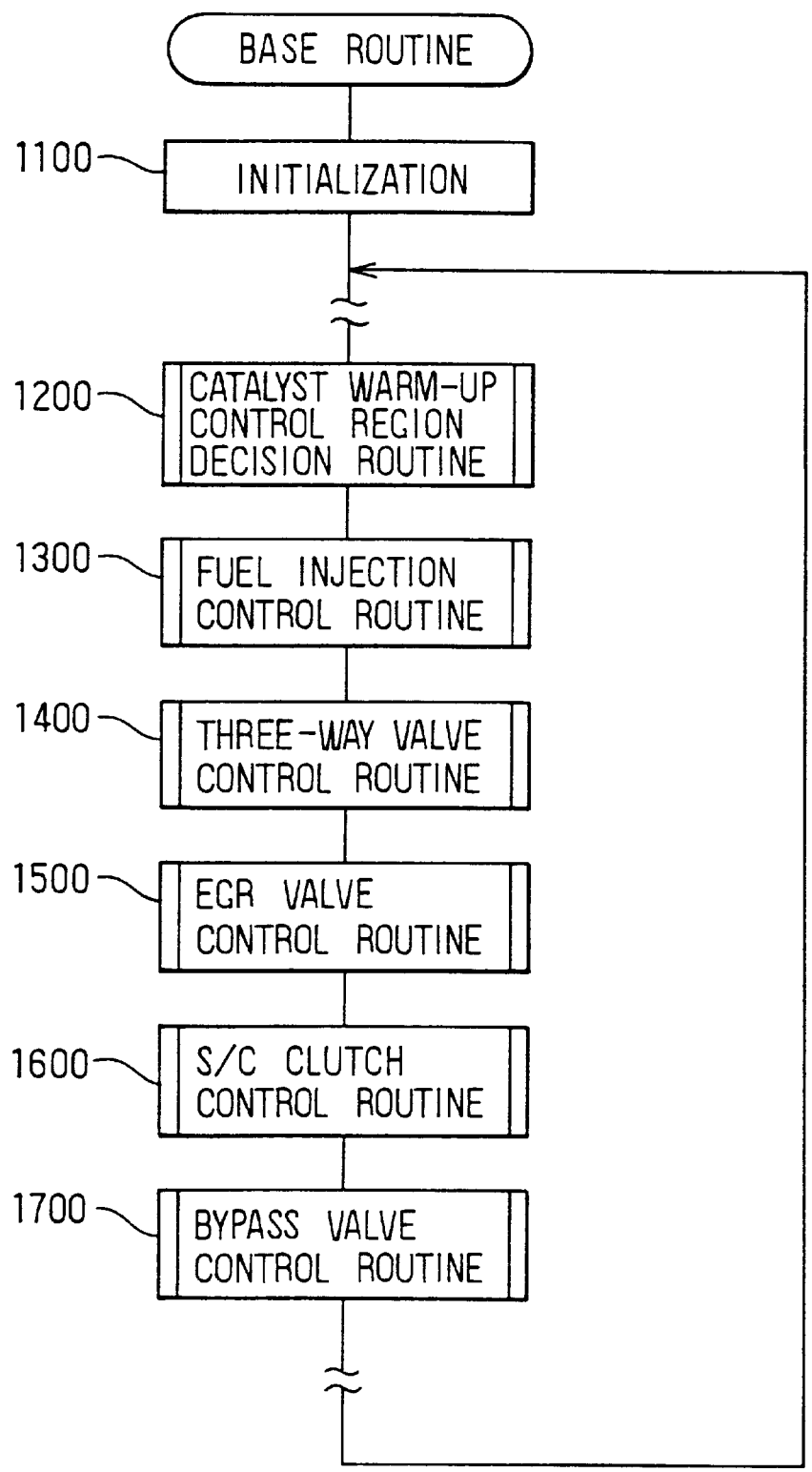
FIG. 41 is a flow chart showing a processing flow of a base routine.
Figure 44:
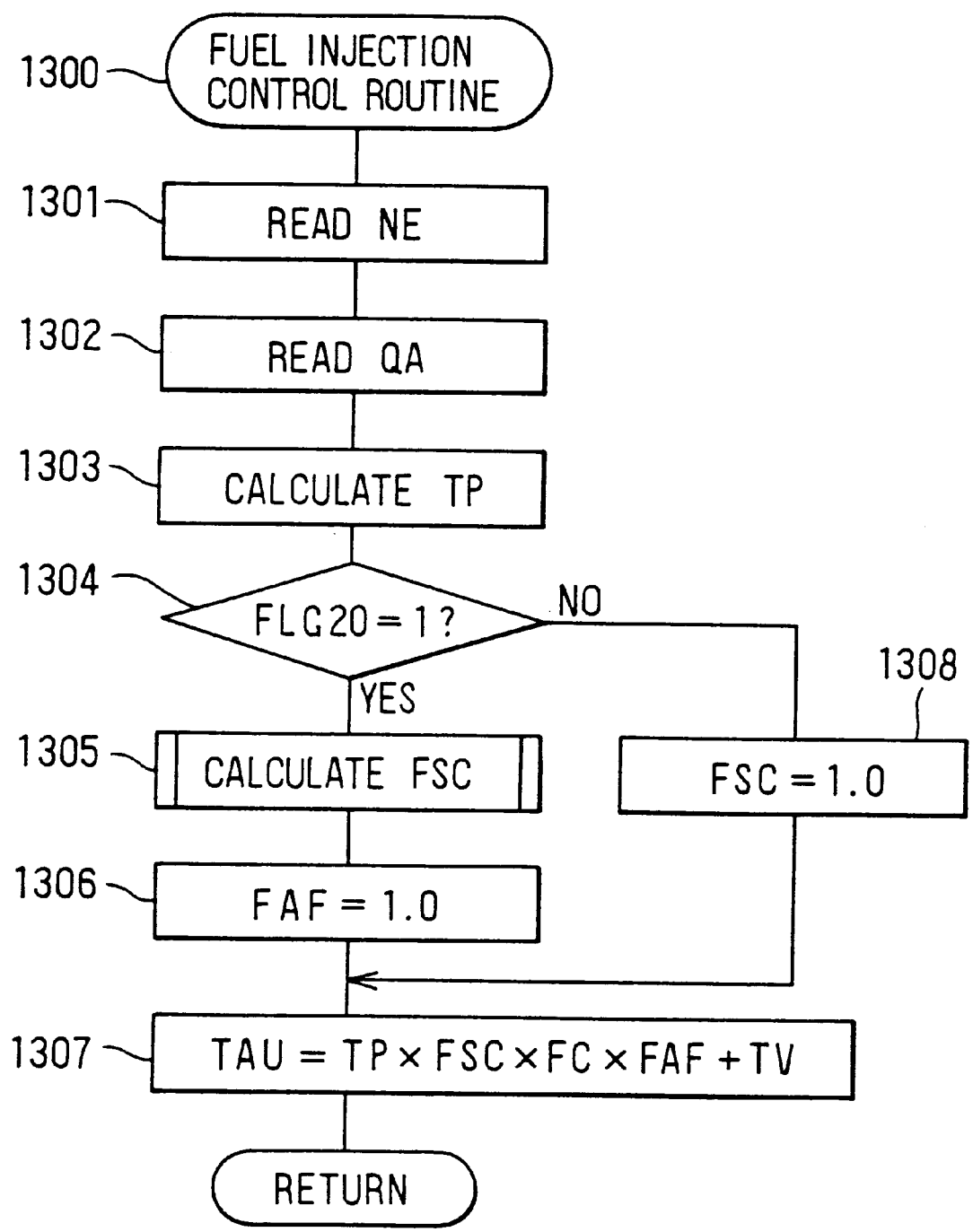
FIG. 44 is a flow chart showing a processing flow of a fuel injection control routine.

The controls of the individual regions thus far described are executed by the individual programs, as shown in FIGS. 41 and so on. A base routine shown in FIG. 41 is executed at every 4 ms, for example, by the interrupt processing. When the power is supplied to the electronic control circuit 30 to start the base routine, this routine is initialized at step 1100 to initialize the RAM 34. This initialization is executed only when the power is supplied. At next step 1200, moreover, the later-described catalyst warm-up control region decision routine is executed to decide whether or not the present running range is the catalyst warm-up control region or the ordinary control region. After this, at step 1300, the later-described fuel injection control routine of FIG. 44 is executed to calculate the fuel injection amount TAU. At this time, there is also calculated a fuel increasing coefficient FSC for the catalyst warm-up control.

Figure 46:
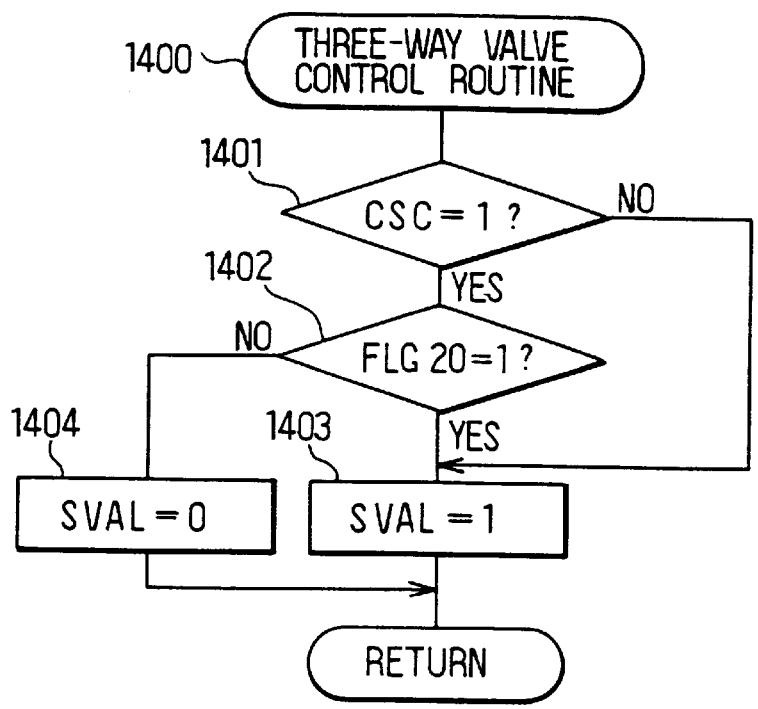
FIG. 46 is a flow chart showing a processing flow of a three-way valve control routine.
Figure 48:
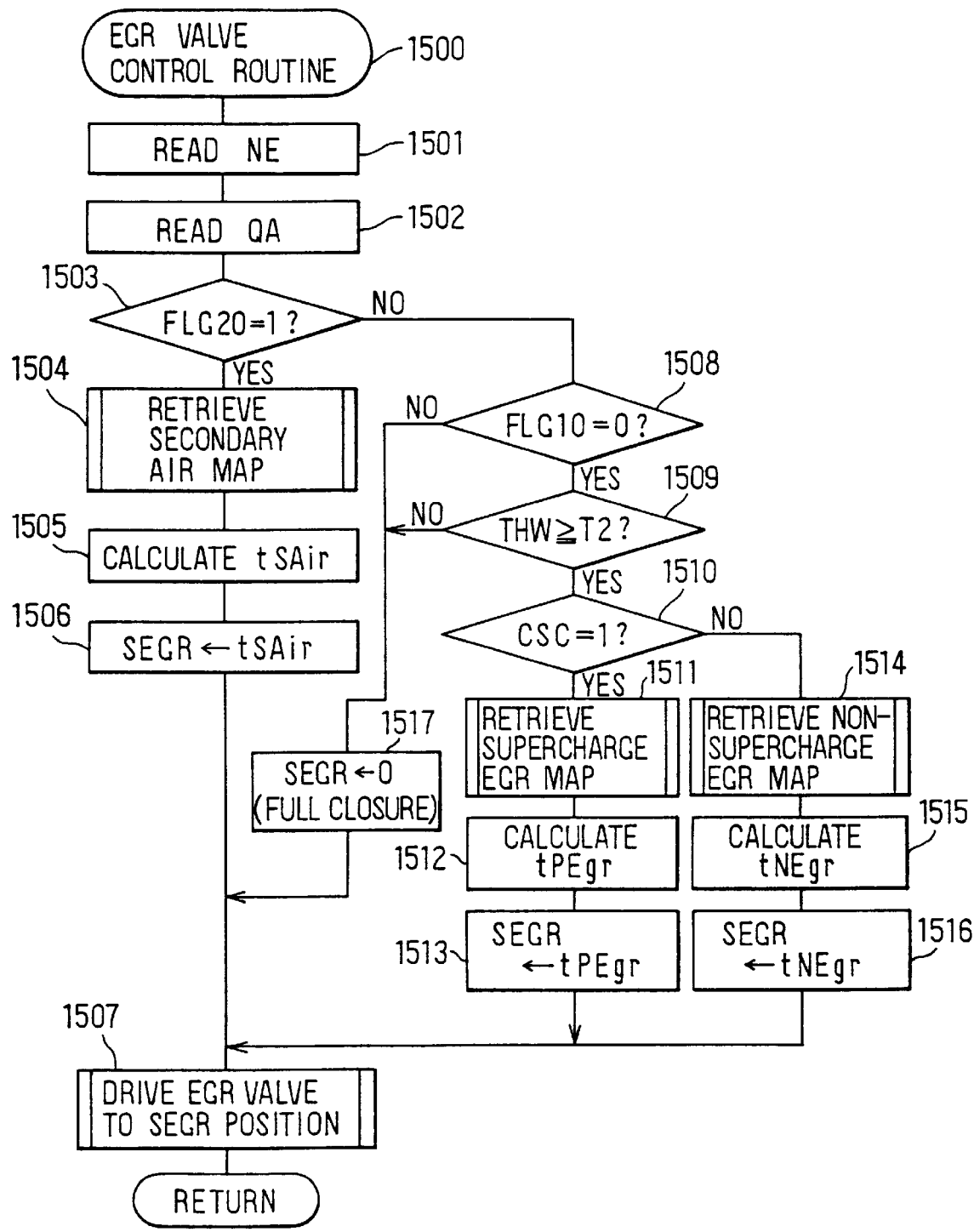
FIG. 48 is a flow chart showing a processing flow of an EGR valve control routine.
Figure 50:
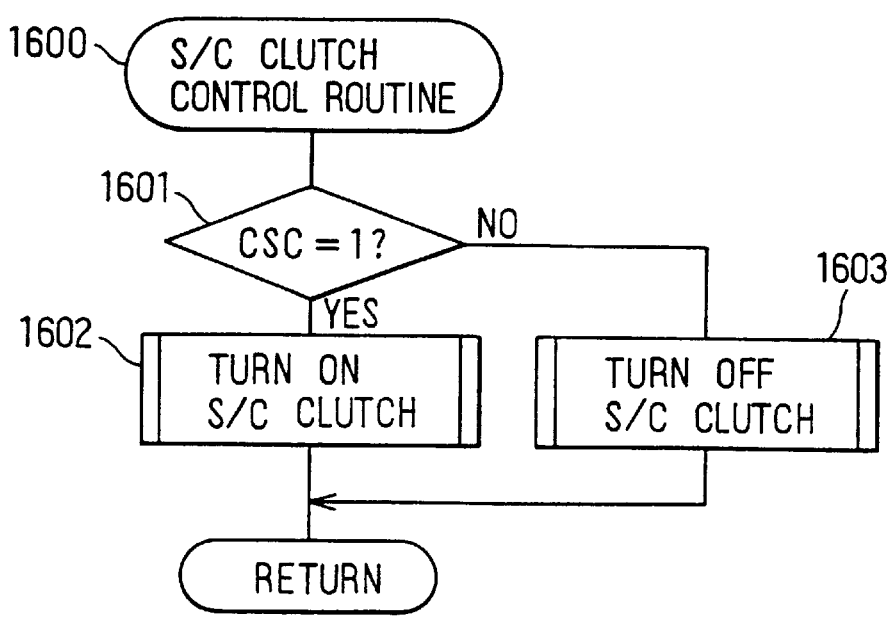
FIG. 50 is a flow chart showing a processing flow of an S/C clutch control routine.
Figure 51:
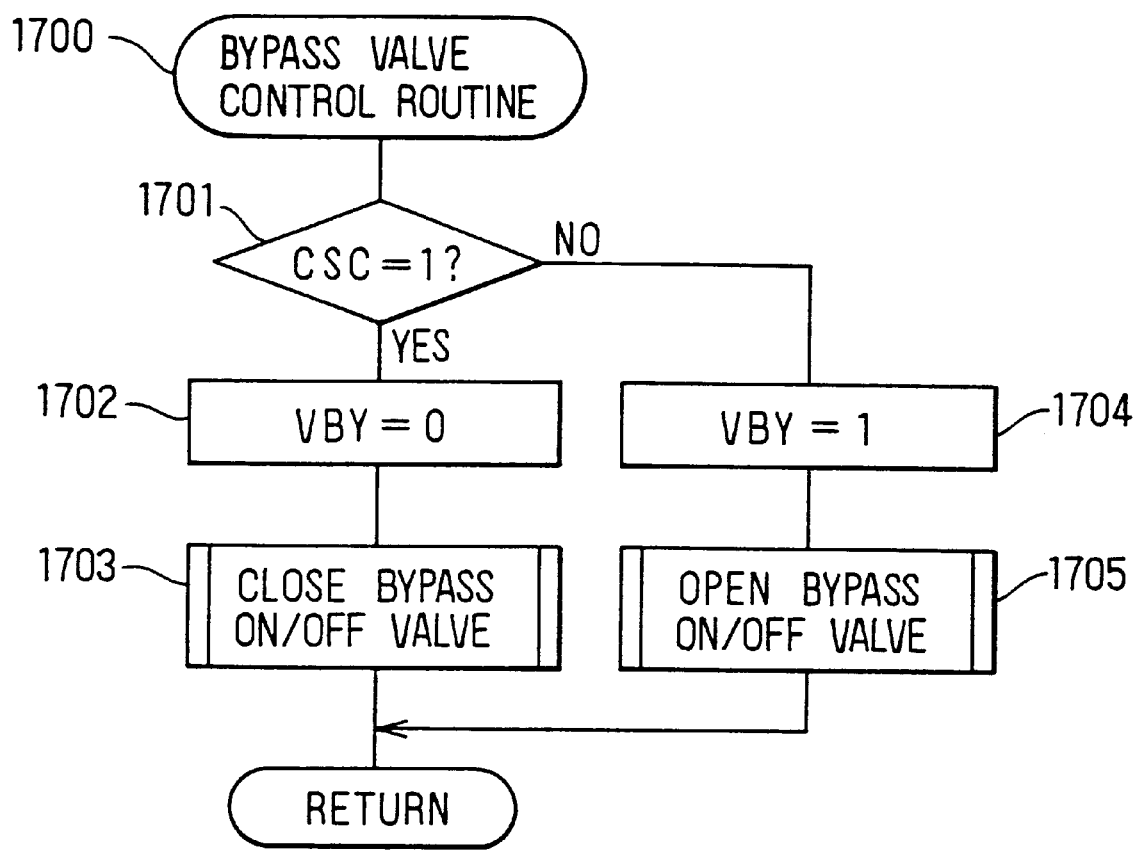
FIG. 51 is a flow chart showing a processing flow of a bypass ON/OFF valve control routine.

At subsequent step 1400, the later-described three-way valve control routine of FIG. 46 is executed to switch the three-way valve 85 in accordance with the supercharge region, the non-supercharge region and the catalyst warm-up control region. After this, at next step 1500, the later-described EGR valve control routine of FIG. 48 is executed to control the opening of the EGR valve 84 in the state of this time simultaneously with the three-way valve 85 being switched at step 1400, thereby to control the exhaust gas recirculation amount and the secondary air amount. At next step 1600, the later-described S/C clutch control routine of FIG. 50 is executed to control the ON/OFF of the solenoid clutch (or S/C clutch) of the supercharger 68. After this, at Step 1700, the bypass ON/OFF valve control routine of FIG. 51 is executed to control the ON/OFF of the bypass ON/OFF valve 71.

Figure 42:
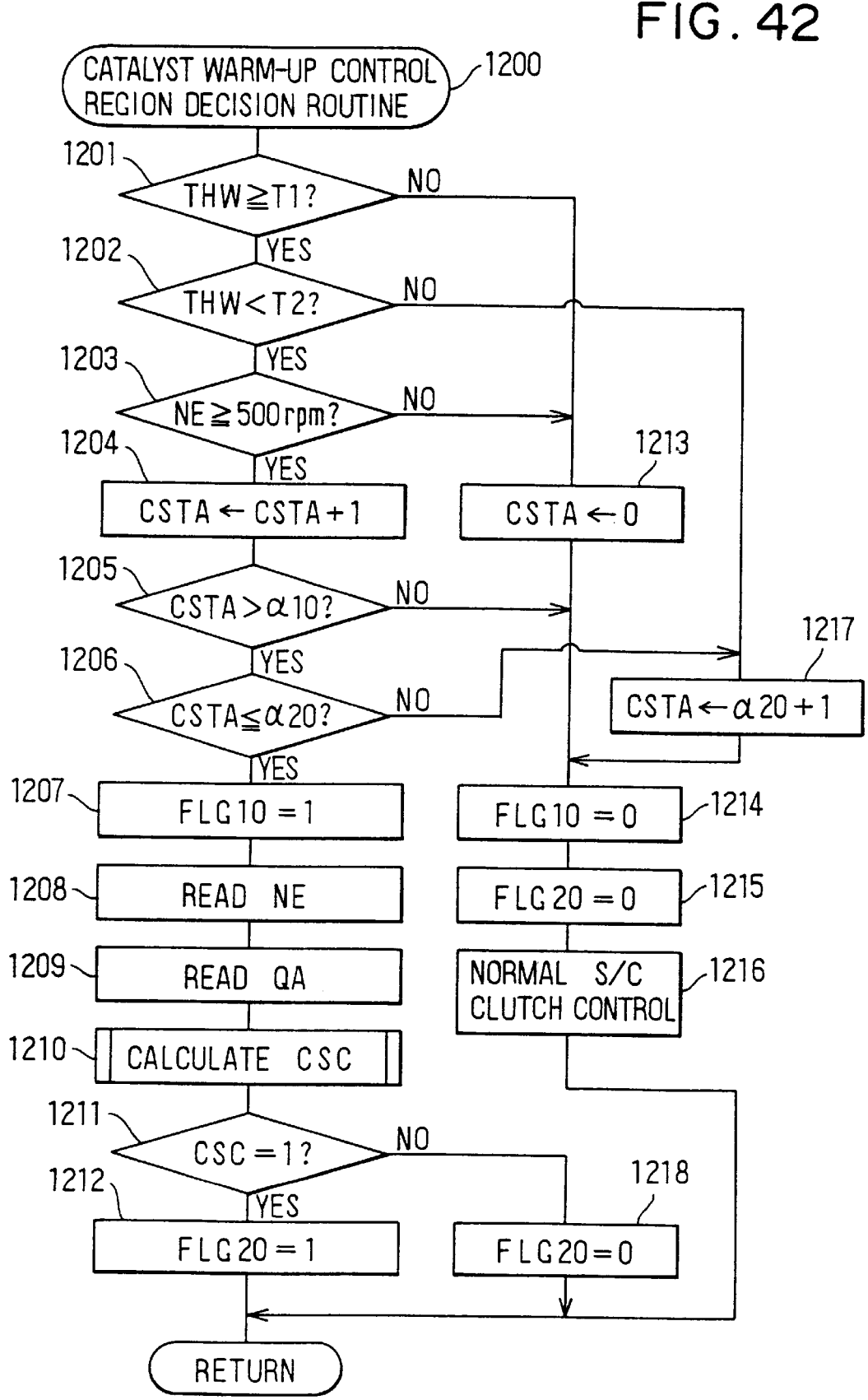
FIG. 42 is a flow chart showing a processing flow of a catalyst warm-up control region deciding routine.

Next, the processing flow of the catalyst warm-up control region decision routine to be executed at step 1200 of FIG. 41 will be described with reference to the flow chart of FIG. 42. The present routine is executed at every 40 ms, for example, by the interrupt processing. In the present routine, at first step 1201, it is decided whether or not the cooling water temperature THW detected by the water temperature sensor 38 is over the driving lower limit temperature T10 (e.g., 20° C.) of the supercharger 68. Here, this driving lower limit temperature T1 is a lower limit temperature, over which the drivability is not deteriorated even if the supercharger 68 is driven. If the cooling water temperature THW is over the driving lower limit temperature T1, the routine advances to step 1202, at which it is decided whether or not the cooling water temperature THW is below a warm-up completion temperature T2. Here, this warm-up completion temperature T2 is a temperature, at which it is decided that both the catalyst 27 and the engine 11 are in the complete warm-up state so that the catalyst 27 need not be warmed up any more over T2.

Only for T1≦THW<T2, therefore, in order to decide the catalyst warm-up control region, the routine advances to step 1203, at which the start completion is decided depending upon whether or not the engine rotation speed NE reaches 500 RPM. If the start is completed (e.g., NE≧500 RPM), at step 1204, the post-start elapsed time counter CSTA is incremented. At subsequent steps 1205 and 1206, it is decided whether or not the value of the post-start elapsed time counter CSTA is α10<CSTAS≦α20. Here, α

10 is a time period necessary for the catalyst temperature to rise to a lower limit temperature TG1 for promoting the reactions between the CO and HC in the exhaust gas and the oxygen in the secondary air by the heat of the exhaust gas, and α20 is a time period necessary for the catalyst temperature to rise to an activation temperature TG2 by the catalyst warm-up control.

Only when all the conditions of (i) T1≦THW<T2, (ii) NE≧500 RPM and (iii) α10<CSTA≦α 20 are satisfied by the foregoing processing, the routine advances to step 1207, at which a catalyst unwarm-up decision flag FLG10 is set to "1" indicating the catalyst unwarm-up section. If any of the above-specified conditions fails to hold, at step 1214, the catalyst unwarm-up decision flag FLG10 is reset to "0". Incidentally, in the case of THW<T1 or NE<500 RPM, at step 1213, the post-start elapsed time counter CSTA is reset to "0". In the case of THW≧T2 or CSTA>α20, on the other hand, at step 1217, the value of the post-start elapsed time counter CSTA is set to "α20+1" so as to prevent the overflow of the post-start elapsed time counter CSTA.

Figure 43:
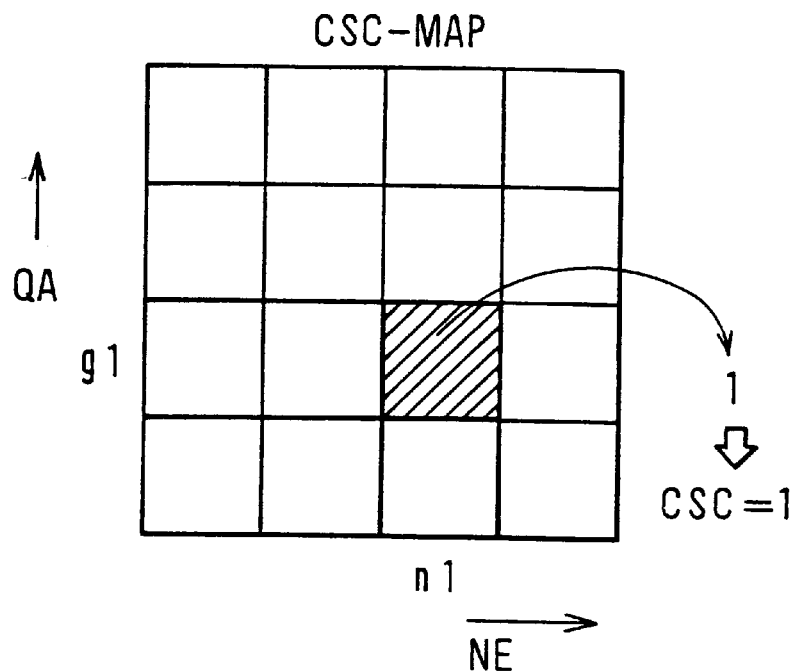
FIG. 43 is a characteristic diagram illustrating a CSC map at a catalyst unwarm-up time.

In the case of the catalyst unwarm-up decision flag FLG10=1 (or in the catalyst unwarm-up section), the routine advances to steps 1208 and 1209, the engine rotation speed NE and the intake air amount QA, as outputted from the angle sensor 24 and the air flow sensor 17a, respectively, are read in. At subsequent step 1210, an ON/OFF command CSC of the S/C clutch at the catalyst unwarm-up time is calculated on the basis of the aforementioned NE and QA data (that is, it is decided whether the running region is in the supercharge region or the non-supercharge region). Here, a CSC map (as shown in FIG. 43) especially for the catalyst unwarm-up time, as different from the CSC map of the ordinary control, is used. In this CSC map especially for the catalyst unwarm-up time, the supercharge region is extended to the low load side (or to the lower sides of the intake air amount and the engine rotation speed). Incidentally, the ON/OFF command CSC of the S/C clutch takes either the value "1" indicating the S/C clutch ON or the value "0" indicating the S/C clutch OFF.

At next step 1211, it is decided whether or not the CSC is at "1" indicating the S/C clutch ON. If CSC=1, it is decided that the region is the supercharge region. The routine advances to step 1212, at which a catalyst warm-up control execution flag FLG20 is set to "1" indicating the execution of the catalyst warm-up control, and the present routine is ended. If the CSC=0 (or the S/C clutch OFF) at step 1211, on the other hand, it is decided that the region is the non-supercharge region, and the present routine is ended by setting the catalyst warm-up control execution flag FLG20 to "0" indicating the inhibition of the catalyst warm-up control.

If the catalyst unwarm-up decision flag FLG10 is at "0", on the other hand, the routine advances to step 1215, at which the catalyst warm-up control execution flag FLG20 is set to "0" indicating the inhibition of the catalyst warm-up control. At subsequent step 1216, the ordinary S/C clutch control is executed to calculate the S/C clutch ON/OFF command CSC is calculated on the basis of the engine rotation speed NE and the intake air amount QA (that is, it is decided whether or not the running region is in the supercharge region or the non-supercharge region). The calculation of the CSC at this time uses the CSC map (although not shown) of the ordinary control.

Next, the processing flow of the fuel injection control routine to be executed at step 1300 of FIG. 41 will be described with reference to a flow chart of FIG. 44. The present routine is executed at every 180° CA, for example.

Figure 45:
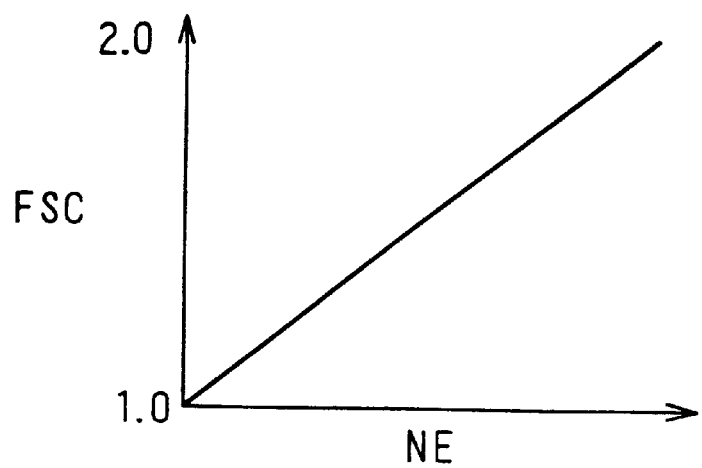
FIG. 45 is a characteristic diagram showing a table for calculating a catalyst warm-up increasing coefficient FSC from the engine rotation speed NE.

At first steps 1301 and 1302, the engine rotation speed NE and the intake air amount QA are read in. At next step 1303, the basic fuel injection amount TP is calculated on the basis of the aforementioned NE and QA. After this, at step 1304, it is decided whether or not the catalyst warm-up control execution flag FLG20 is set at "1" indicating the execution of the catalyst warm-up control. If FLG20=1 (for executing the catalyst warm-up control), the routine advances to step 1305, at which the catalyst warm-up increasing coefficient FSC is calculated. This catalyst warm-up increasing coefficient FSC is calculated from the FSC calculation table shown in FIG. 45 and takes the larger value for the larger engine rotation speed NE.

At next step 1306, a feedback correction coefficient FAF for feedback controlling the air/fuel ratio to the stoichiometric air/fuel ratio (i.e, the air excess ratio λ=1) in accordance with the signal coming from the air/fuel sensor 28 is set to "1.0". Then, the present routine is ended by calculating the final injection amount TAU at next step 1307 from the following formula:

$$TAU = TP \times FSC \times FC \times FAF + TV,$$

wherein: TP is a basic injection amount; FSC is a catalyst warm-up increasing coefficient; FC is a basic injection correction coefficient; FAF is a feedback correction coefficient; and TV is an ineffective injection time.

If the catalyst warm-up control execution flag FLG20=0 (for inhibiting the catalyst warm-up control) at step 1304, on the other hand, the routine advances to step 1308, at which the catalyst warm-up increasing coefficient FSC is set to "1.0", and the present routine is ended by calculating the final injection amount TAU from the above-specified formula.

Figure 47:
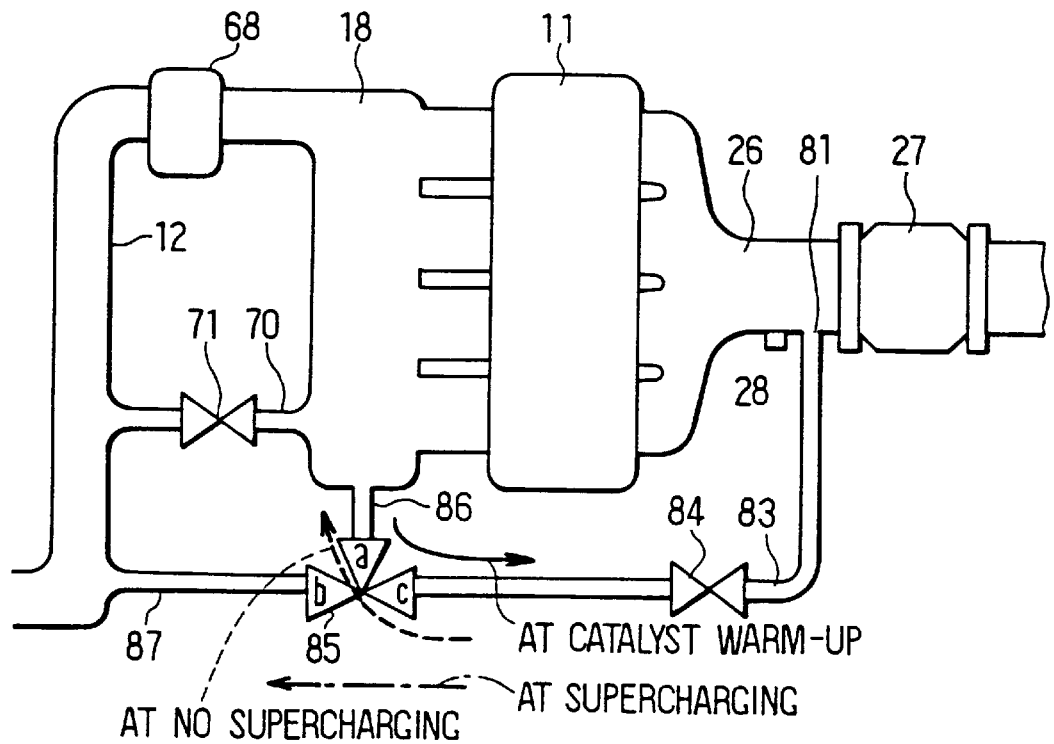
FIG. 47 is a diagram for explaining a flow of an EGR gas or secondary air in each control region.

Next, the processing flow of the three-way valve control routine to be executed at step 1400 of FIG. 41 will be described with reference to a flow chart of FIG. 46. The present routine is executed at every 40 ms, for example, by the interrupt processing. In the present routine, at first step 1401, it is decided whether or not the S/C clutch ON/OFF command CSC is at "1" indicating the S/C clutch ON. If CSC=1 (i.e., the supercharge region), the routine advances to step 1402, at which it is decided whether or not the catalyst warm-up control execution flag FLG20 is at "1" indicating the catalyst warm-up control. If FLG20=1 (for executing the catalyst warm-up control), the routine advances to step 1403, at which a three-way valve control flag SVAL is set to "1" so that the three-way valve 85 is switched to the side of the surge tank 18 (to provide the communications of the ports a and b) thereby to provide the communication between the downstream of the supercharger 68 and the exhaust pipe 26 via the EGR passage 83. As a result, the supercharged pressure (i.e., the discharge pressure of the supercharger 68) is applied from the surge tank 18 to the EGR passage 83 so that the pressure of the EGR passage 83 at the intake system side grows higher than the pressure (i.e., the exhaust pressure) at the side of the exhaust pipe 26. As a result, the supercharged air partially flows back in the EGR passage 83, as indicated by an arrow in FIG. 47, from the surge tank 18 via the passage 86 and the ports a and c of the three-way valve 85 so that it is supplied as the secondary air to the upstream of the catalyst 27 of the exhaust pipe 26.

If CSC=1 (i.e., the S/C clutch ON: the supercharge region) and if FLG20=0 (for inhibiting the catalyst warm-up control), on the other hand, the routine advances to step 1404, at which the three-way control flag SVAL is set to "0" so that the three-way valve 85 is switched to the upstream (to provide the ports b and c) of the supercharger 68 thereby to provide the communication between the upstream of the supercharger 68 and the exhaust pipe 26 via the EGR passage 83. As a result, the intake vacuum of the supercharger 68 is applied to the EGR passage 83 so that the exhaust recirculation gas (i.e., the EGR gas) is sucked, as indicated by a single-dotted arrow in FIG. 47, from the exhaust pipe 26 via the EGR passage 83 and the passage 87 into the supercharger 68.

If CSC=0 (i.e., the S/C clutch OFF: the non-supercharge region) at step 1401, on the other hand, the routine advances to step 1403, at which the three-way valve control flag SVAL is set to "1" so that the three-way valve 85 is switched to the surge tank 18 (to provide the communication between the ports a and c) to provide the communication between the surge tank 18 downstream of the supercharger 68 and the exhaust pipe 26 via the EGR passage 83. Since, in this non-supercharge time, the supercharger 68 is in the stop state so that the vacuum prevails in the surge tank 18, the pressure in the EGR passage 83 at the intake system side is lower than the pressure (or the exhaust pressure) at the side of the exhaust pipe 26. When the EGR valve 84 is opened, the EGR gas is introduced, as indicated by a dotted arrow in FIG. 47, from the exhaust pipe 26 via the EGR passage 83 and the passage 86 into the surge tank 18.

Figure 49:
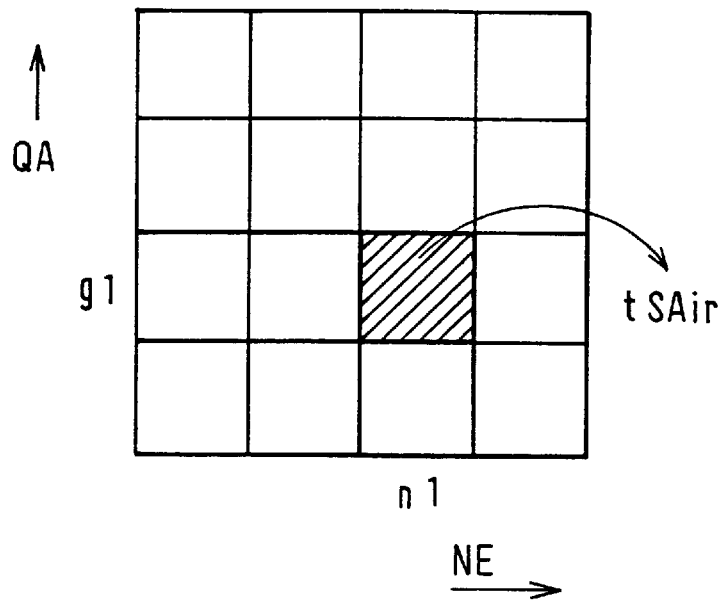
FIG. 49 is a characteristic diagram showing a map for calculating a secondary air flow tSAir from the engine rotation speed NE and an air intake QA.

Next, the processing flow of the EGR valve control routine to be executed at step 1500 of FIG. 41 will be described with reference to a flow chart of FIG. 48. The present routine is executed at every 4 ms, for example, by the interrupt processing. At first steps 1501 and 1502, the engine rotation speed NE and the intake air amount QA are read in. At subsequent step 1503, it is decided whether or not the catalyst warm-up control execution flag FLG20 is at "1" indicating the execution of the catalyst warm-up control. If FLG20=1, the routine advances to step 1504, at which the secondary air control map shown in FIG. 49 is retrieved to calculate the demanded secondary air amount tSAir (at step 1505) from the map on the basis of the engine rotation speed NE and the intake air amount QA.

Since, during the execution of the catalyst warm-up control, the fuel injection amount is increased to enrich the air/fuel ratio of the mixture gas thereby to increase the CO and HC in the exhaust gas, the secondary air amount tSAir, as containing the oxygen necessary for oxidizing the CO and HC in the catalyst 27, is calculated (at step 1505) in terms of the opening of the EGR valve 84 on the basis of the engine rotation speed NE and the intake air amount QA, and this EGR valve opening tSAir is stored (at step 1506) in the memory of a target EGR valve opening SEGR. After this, at step 1507, the signal of the target EGR valve opening SEGR is outputted to the EGR valve 84 so that the EGR valve 84 is driven to a position of the target EGR valve opening SEGR.

If FLG20=0 (for inhibiting the catalyst warm-up control) at step 1503, on the other hand, the routine advances to steps 1508 and 1509. If the catalyst unwarm-up decision flag FLG10=1 (in the catalyst unwarm-up section) or if FLG10=0 and the cooling water temperature THW<the complete warm-up temperature T2, the region is decided to deteriorate the drivability if the EGR control is executed. Thus, the routine advances to step 1517, at which the value "0" is stored in the memory of the target EGR valve opening SEGR to close the EGR valve 84 fully (at step 1517), thus inhibiting the EGR control.

If the FLG10=0 and the cooling water temperature THW≧the complete warm-up temperature T2, on the other hand, the routine advances to step 1510, at which the supercharge region is decided depending upon whether or not CSC=1 (i.e., the S/C clutch ON). If in the supercharge region, the routine advances to step 1511, at which the supercharge EGR map (although not shown) is retrieved as in FIG. 49. From this map, an EGR valve opening tPEgr for controlling the supercharge EGR amount to the optimum EGR value (for maximizing the effect for reducing the $NO_x$ without deteriorating the drivability and the emission) is calculated (at step 1512). This EGR valve opening tPEgr is stored (at step 1513) in the memory of the target EGR valve opening SEGR.

If CSC=0 (i.e., the S/C clutch OFF: the non-supercharge region) at step 1510, on the other hand, the routine advances to step 1514, at which the non-supercharge EGR map (although not shown) is retrieved as in FIG. 49. From this map, an EGR valve opening tNEgr for controlling the non-supercharge EGR amount to the optimum EGR amount is calculated (at step 1515). This EGR valve opening tNEgr is stored (at step 1516) in the memory of the target EGR valve opening SEGR.

After the target EGR valve opening SEGR is thus stored for each control region, the signal of the target EGR valve opening SEGR is outputted to drive the EGR valve 84 to the position of the target EGR opening SEGR (at step 1507), and the present routine is ended.

Next, the processing flow of the S/C clutch control routine to be executed at step 1600 of FIG. 41 will be described with reference to a flow chart of FIG. 50. The present routine is executed at every 40 ms, for example, by the interrupt processing. In the present routine, at first step 1601, the supercharge region is decided depending upon whether or not CSC=1 (i.e., the S/C clutch ON). If in the supercharge region, the routine advances to step 1602, at which the S/C clutch is turned ON to drive the supercharger 68. If CSC=0 (i.e., the S/C clutch OFF: in the non-supercharge region), on the other hand, the routine advances to step 1603, at which the SIC clutch is turned OFF to stop the supercharger 68.

Next, the processing flow of the bypass ON/OFF vaLve control routine to be executed at step 1700 of FIG. 41 will be described with reference to a flow chart of FIG. 51. The present routine is executed at every 40 ms, for example, by the interrupt processing. At first step 1701, the supercharge region is decided depending upon whether or not CSC=1 (i.e., the S/C clutch ON). If in the supercharge region, the routine advances to step 1702, at which a bypass ON/OFF valve control signal VBY is set to "0" indicating the OFF. At subsequent step 1703, the bypass On/OFF valve 71 is closed. If CSC=0 (i.e., the S/C clutch OFF: in the non-supercharge region), on the other hand, the routine advances to step 1704, at which the bypass ON/OFF valve control signal VBY is set to "1" indicating the ON. At subsequent step 1705, the bypass ON/OFF valve 71 is opened.

One example of the case of the control thus far described will be described with reference to the time charts of FIGS. 52 and 53.

Figure 52:
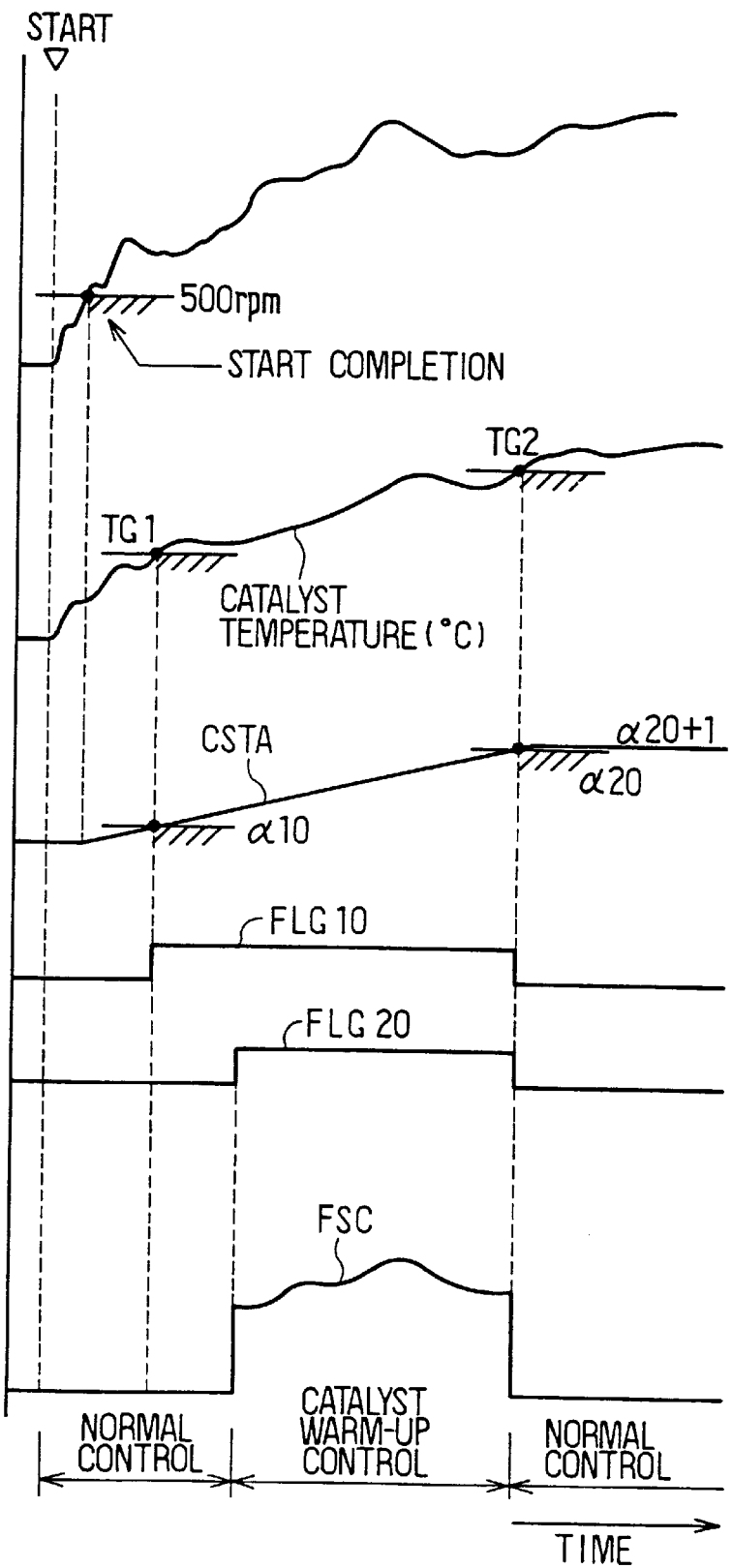
FIG. 52 is a time chart illustrating behaviors of a catalyst warm-up control.

First of all, FIG. 52 is a time chart illustrating the operations from the engine start to the end of the catalyst warm-up control. When the engine rotation speed NE reaches 500 RPM after the engine start, it is decided that the start is completed, and the post-start elapsed time counter CSTA is then incremented. For the time period ($\alpha 10 < CSTA \geq \alpha 20$) from the time $\alpha 10$, at which it is estimated that the catalyst temperature reaches the fist predetermined temperature TG1, to the time $\alpha 20$ at which it is estimated that the second predetermined temperature TG2 is reached, moreover, it is decided that the catalyst is not warmed up, and the catalyst unwarm-up decision flag FLG10 is set to "1". Here, the temperature TG1 is a catalyst warm-up control lower limit temperature for effecting the catalyst warm-up control, and the temperature TG2 is an activation completion temperature for the catalyst 27.

Next, it is decided whether or not the region is the supercharge region, in which the drivability or emission is not deteriorated even the supercharger 68 is operated in the catalyst unwarm-up state (i.e., FLG10=1). If in the supercharge region, the catalyst warm-up control execution flag FLG20 is set to "1". Thus, the bypass ON/OFF valve 71 is closed to drive the supercharger 68, and the three-way valve 85 is switched to the surge tank 18 to execute the catalyst warm-up control. In this catalyst warm-up control, the supercharged air partially flows backward in the EGR passage 83 from the surge tank 18 via the passage 86 so that it is supplied as the secondary air to the exhaust pipe 26 upstream of the catalyst 27. Simultaneously with this, the catalyst warm-up increasing coefficient FSC is set to a value larger than 1.0 to enrich the fuel injection amount so that the CO and HC in the exhaust gas are increased to react with the oxygen in the secondary air by the catalyst 27 thereby to warm the catalyst efficiently by the heat of reaction. In this catalyst warm-up control, the secondary air amount is so calculated that the air/fuel ratio in the exhaust gas may be $\lambda=1$ to control the opening of the EGR valve 84.

When the value of the post-start elapsed time counter CSTA then reaches the value $\alpha 20$, it is decided that the catalyst warm-up is completed, and both the FLG10 and FLG10 are reset to "0". From now on, the ordinary control is executed.

Figure 53:
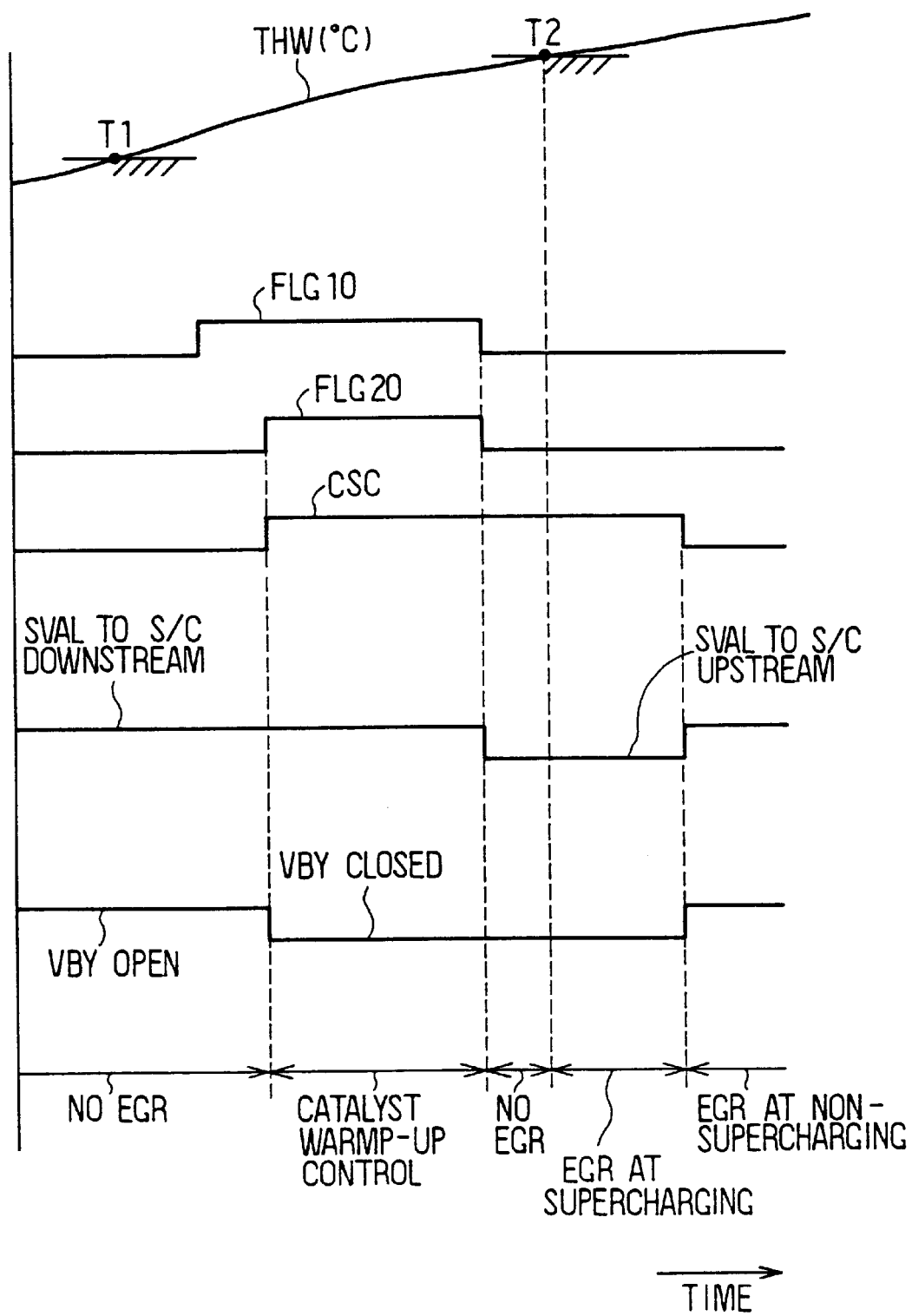
FIG. 53 is a time chart illustrating behaviors of a three-way valve, a bypass ON/OFF valve and an EGR valve.

On the other hand, FIG. 53 is a time chart illustrating the operations of the three-way valve 85, the bypass ON/OFF valve 71 and the EGR valve 84 at the catalyst warm-up control time and at the supercharge/non-supercharge time, as will be described in the following.

Immediately after the engine start, the supercharger 68 is not driven, but the bypass ON/OFF valve 71 is opened, and the three-way valve 85 is switched to the downstream (as located at the side of the surge tank 18) of the supercharger 68. However, the EGR valve 84 is fully closed to shut the EGR passage 83. After this, when the catalyst warm-up control execution flag FLG20 is set to "1", the bypass ON/OFF valve 71 is closed to drive the supercharger 68 thereby to start the catalyst warm-up control, and the EGR valve 84 is opened so that the secondary air amount to be supplied to the exhaust pipe 26 is controlled by controlling the opening of the EGR valve 84.

After this, when the catalyst warm-up is completed so that both the FLG10 and FLG20 are reset to "0", the control transfers to the ordinary control. Since the S/C clutch is ON (i.e., CSC=1) so that the supercharger 68 is driven, the three-way valve 85 is switched to the upstream of the supercharger 68 (i.e., to the passage 87). At this instant, however, the cooling water temperature THW is below the complete warm-up temperature T2 so that the EGR valve 84 is fully closed. This is because the EGR control is inhibited for THW$\leq$T2 so that the drivability and the emission may not be deteriorated. After this, when the cooling water temperature THW becomes lower than the complete warm-up temperature T2, the EGR control is allowed to control the opening of the EGR valve 84 on the basis of the EGR control at the supercharge time. At this time, the EGR gas is introduced to the upstream of the supercharger 68.

After this, when the S/C clutch is turned OFF (i.e., CSC=0) so that the supercharger 68 is stopped, the control becomes identical to that of a natural intake engine to open the bypass ON/OFF valve 71 so that the intake air flowing in the intake pipe 12 is introduced via the bypass intake passage 70 into the surge tank 18. Simultaneously with this, the three-way valve 85 is switched to the downstream of the supercharger 68 so that the EGR gas is recirculated by way of the passage of the EGR passage 83→the three-way valve 85→the passage 86→the surge tank 18. According to the tenth embodiment thus far described, at the catalyst warm-up control time, the supercharged air can be partially caused to flow backward in the EGR passage 83 and supplied as the secondary air to the exhaust pipe 26 by making use of the supercharge pressure of the supercharger 68 and the EGR passage 83, so that the dedicated secondary air supply device can be eliminated to effect the catalyst warm-up efficiently without complicating the construction. Moreover, when it is decided that the catalyst is in the unwarm-up state, the supercharge region is extended so that the catalyst warm-up control region is extended to improve the catalyst warm-up capacity.

At the time of extending the supercharge region, the engine rotation speed may be increased against the drive load of the supercharge 68, as applied to the engine 11. When the catalyst is in the unwarm-up state, for example, the supercharge region (or the catalyst warm-up control region) may be established at the idling time, too, by raising the idling rotation speed. However, the present invention may also be constructed not to change the supercharge region. In this modification, too, the desired object of the present invention can be sufficiently achieved.

On the other hand, the catalyst warm-up control region is decided in terms of the lapse time after the start, as measured by the post-start elapsed time counter CSTA. As a result, it is impossible to avoid the fact that the catalyst temperature at the end of the catalyst warm-up control is changed more or less according to the catalyst temperature at the engine start. Thus, a catalyst temperature sensor may be attached to the catalyst 27 to detect the catalyst temperature directly so that the catalyst unwarm-up state may be decided on the basis of the detected temperature.

Other than that the catalyst temperature is detected directly by the catalyst temperature sensor, the catalyst temperature may be detected indirectly on the basis of the temperature data reflecting the catalyst temperature, such as the output signals of the various temperature sensors (e.g., the water temperature sensor 38, the exhaust temperature sensor, the element temperature sensor or the heater temperature sensor) for detecting the engine water temperature, the exhaust temperature, or the element temperature or heater temperature of the air/fuel ratio sensor 28.

On the other hand, the predetermined time periods $\alpha 10$ and $\alpha 20$ for determining the catalyst unwarm-up section may be corrected according to the cooling water temperature at the engine start. Then, it is possible to estimate the catalyst temperature on the basis of the lapse time after the start.

[ELEVENTH EMBODIMENT]

Figure 54:
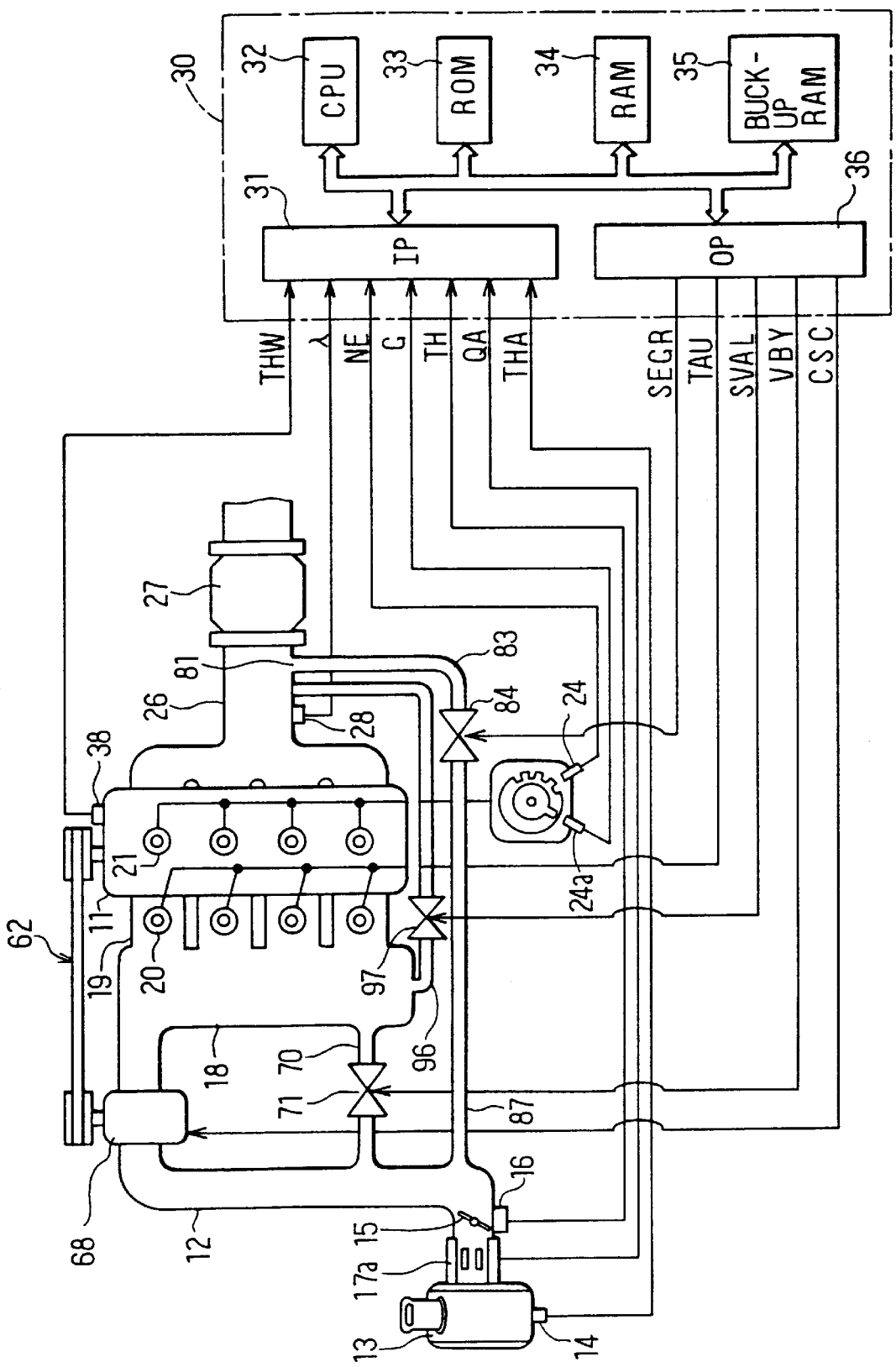
FIG. 54 is a schematic diagram showing a construction of an engine control system according to an eleventh embodiment of the present invention.

According to an eleventh embodiment of the present invention, the supercharged air is partially supplied at the catalyst unwarm-up time to the catalyst 27 by way of a communication passage 96 for providing communication between the downstream of the supercharger 68 and the upstream of the catalyst 27, as shown in FIG. 54.

Here will be described the operations of a flow control valve 97 and the bypass ON/OFF valve 71 in the three running regions of the supercharge region (excepting that at the catalyst warm-up control time), the non-supercharge region and the catalyst warm-up control region.

First of all, in the supercharge region other than that at the catalyst warm-up control time, the bypass ON/OFF valve 71 and the flow control valve 97 are closed, and the supercharger 68 is driven to compress and supply the intake air into the individual cylinders. Next, in the non-supercharge region, the drive of the supercharger 68 is stopped, and the bypass ON/OFF valve 71 is opened whereas the flow control valve 97 is closed. At this time, the intake air flows through the bypass ON/OFF valve 71 into the surge tank 18.

Finally, in the catalyst warm-up control region, the supercharger 68 is driven, and the bypass ON/OFF valve 71 is closed whereas the flow control valve 97 is opened. As a result, the supercharged air is partially supplied as the secondary air via the communication passage 96 to the upstream of the catalyst 27 to promote the warm-up of the catalyst 27. At this time, the fuel injection amount is increased as in the foregoing individual embodiments in accordance with the air amounts, as supplied via the communication passage 96. This catalyst warm-up control is executed as in the preceding embodiment until the warm-up state of the catalyst 27 once rises to the lower limit temperature for promoting the exhaust gas purification and then to the activation temperature.

Thus, the passage for supplying the supercharged air partially as the secondary air need not be the EGR passage 87. With the communication passage 96 for providing the communication between the downstream of the supercharger and the upstream of the catalyst and the flow control valve 97, however, the control similar to that of the tenth embodiment can be executed to achieve similar effects.

On the other hand, the flow control valve 97 may be either an ON/OFF valve for opening/closing the communication passage 96 or a valve for controlling the opening linearly.

In the present embodiment, the catalyst warm-up control is executed after the catalyst is naturally warmed up to some extent to reach the predetermined temperature. Despite this description, however, the catalyst warm-up control may be combined with the ignition delay angle control or the EGI control as in the first and sixth embodiments.

The present invention having been described should not be limited to the foregoing embodiments but such embodiments may be modified in various other ways without departing from the spirit of the invention.

What is claimed is:

1. A catalyst warm-up system for an internal combustion engine, comprising:

an exhaust gas purifying catalyst disposed in an exhaust system;

an exhaust gas recirculation passage for recirculating an exhaust gas partially from upstream of said catalyst to an intake system;

an exhaust gas recirculation control valve for regulating an amount of the exhaust gas to flow via said exhaust gas recirculation passage;

a supercharger disposed in said intake system;

supercharger control means for controlling a drive/stop of said supercharger by deciding whether a running state of said internal combustion engine is in a supercharge region;

catalyst warm-up decision means for deciding the warm-up degree of said catalyst; and catalyst warm-up means for opening said exhaust gas recirculation control valve during the drive of said supercharger, if it is decided by said catalyst warm-up decision means that said catalyst is in an unwarmed-up state, to supply the supecharged air partially into the exhaust system via said exhaust gas recirculating passage and for controlling the amount of the fuel injection into said internal combustion engine to a rich side.

2. A catalyst warm-up system for an internal combustion engine according to claim 1, wherein:

said supercharger control means includes means for extending said supercharge region if it is decided by said catalyst warm-up decision means that said catalyst is in the unwarmed-up state.

3. A catalyst warm-up system for an internal combustion engine according to claim 1, further comprising:

passage switch means for switching said exhaust gas recirculation passage to an upstream and a downstream of said supercharger; and switch means for causing said passage switch means to switch to the upstream of said supercharger at the catalyst warm-up time and at the non-supercharge time.

4. A catalyst warm-up system for an internal combustion engine according to claim 1, further comprising:

cold warm-up control inhibition means for inhibiting the control by said catalyst warm-up means, if it is decided by said catalyst warm-up decision means that the warm-up degree of said catalyst is below a lower limit temperature for promoting the exhaust gas purification.

5. A catalyst warm-up system for an internal combustion engine, comprising:

an exhaust gas purifying catalyst disposed in an exhaust system;

an exhaust gas recirculation passage for recirculating the exhaust gas partially from an upstream of said catalyst to an intake system;

an exhaust gas recirculation control valve disposed in said exhaust gas recirculation passage;

a supercharger disposed in the intake system;

a bypass intake passage disposed in parallel with said supercharger;

a bypass ON/OFF valve disposed in said bypass intake passage for opening said bypass intake passage, while said supercharger is stopped, to supply an intake air via said bypass passage to said internal combustion engine; and passage switch means for switching said exhaust gas recirculation passage between an upstream and a downstream of said supercharger, wherein at the catalyst warm-up time, said bypass ON/OFF valve is closed to drive said supercharger, and said passage switch means is switched to the downstream of said supercharger to open said exhaust gas recirculation control valve thereby to supply the supercharged air partially via said exhaust gas recirculation passage to said exhaust system and to control the amount of fuel injection into said internal combustion engine to a rich side, wherein at the supercharge time other than the catalyst warm-up time, said bypass ON/OFF valve is closed to drive said supercharger, and said passage switch means is switched to the upstream of said supercharger to effect the exhaust gas recirculation control, and wherein at the non-supercharge time, said supercharger is stopped to open said bypass ON/OFF valve, and said passage switch means is switched to the downstream of said supercharger to effect the exhaust gas recirculation control.

6. A catalyst warm-up system for an internal combustion engine, comprising:

an exhaust gas purifying catalyst disposed in an exhaust system;

a supercharger disposed in an intake system;

a communication passage for providing communication between a downstream of said supercharger and an upstream of said catalyst;

a flow control valve for controlling a flow rate of said communication passage;

supercharger control means for controlling the drive/stop of said supercharger by deciding whether a running state of said internal combustion engine is in the supercharge region;

catalyst warm-up decision means for deciding a warm-up degree of said catalyst; and catalyst warm-up means for opening said flow control valve during the drive of said supercharger, if it is decided by said catalyst warm-up decision means that said catalyst is in an unwarmed-up state, to supply the supercharged air partially via said communication passage to upstream of said catalyst and for controlling the rate of fuel injection into said internal combustion engine to a rich side.

* * * * *